(12) United States Patent
Lu et al.

(10) Patent No.: US 8,811,480 B2
(45) Date of Patent: Aug. 19, 2014

(54) ENCODING APPARATUS, ENCODING METHOD, DECODING APPARATUS, AND DECODING METHOD

(71) Applicant: Sony Corporation, Tokyo (JP)

(72) Inventors: Shuo Lu, Tokyo (JP); Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/932,709

(22) Filed: Jul. 1, 2013

(65) Prior Publication Data

US 2014/0003510 A1    Jan. 2, 2014

(30) Foreign Application Priority Data

Jun. 29, 2012 (JP) ................................. 2012-147883
Sep. 28, 2012 (JP) ................................. 2012-218097

(51) Int. Cl.
*H04N 7/12* (2006.01)
*G06K 9/36* (2006.01)

(52) U.S. Cl.
USPC ...................................... 375/240.12; 382/232

(58) Field of Classification Search
USPC ................. 375/240.01–240.29; 382/232–236
See application file for complete search history.

(56) References Cited

U.S. PATENT DOCUMENTS

| 2013/0101038 A1* | 4/2013 | Shimizu et al. | 375/240.12 |
| 2013/0188738 A1* | 7/2013 | Hannuksela et al. | 375/240.25 |
| 2013/0188881 A1* | 7/2013 | Zhao et al. | 382/232 |
| 2013/0259393 A1* | 10/2013 | Deshpande | 382/232 |

OTHER PUBLICATIONS

International Search Report issued Sep. 24, 2013 in PCT/JP2013/067111.
International Search Report issued Sep. 24, 2013 in PCT/JP2013/067112.
Tan et al., "AHG21: Inter reference picture set prediction syntax and semantics," Joint Collaborative Team on Video Coding (JCT-VC) of ITU-T SG16 WP3 and ISO/IEC JTC1/SC29/WG11 JCTVC-G198r2, ITU-T, pp. 1-10, Nov. 24, 2011.
Joshi et al, "On reference picture set definition and signaling," Joint Collaborative Team on Video Coding (JCT-VC) of ITU-T SG16 WP3 and ISO/IEC JTC1/SC29/WG11 JCTVC-10344, ITU-T, pp. 1-7, Apr. 17, 2012.
Wahadaniah et al., "AHG21: Construction and modification of predefined reference picture sets and reference picture lists," Joint Collaborative Team on Video Coding (JCT-VC) of ITU-T SG16 WP3 and ISO/IEC JTC1/SC29/WG11 JCTVC-G548, ITU-T, pp. 1-21, Nov. 23, 2011.
Sjöberg et al., "Absolute signaling of reference pictures," Joint Collaborative Team on Video Coding (JCT-VC) of ITU-T SG16 WP3 and ISO/IEC JTC1/SC29/WG11 JCTVC-F493, ITU-T, pp. 1-15, Jul. 22, 2011.
Bross et al., "High efficiency video coding (HEVC) text specification draft 7," Joint Collaborative Team on Video Coding (JCT-VC) of ITU-T SG16 WP3 and ISO/IEC JTCI/SC29/WG11, $9^{th}$ Meeting: Geneva, CH, Apr. 27-May 7, 2012, issued Jun. 29, 2012, 279 pp.

* cited by examiner

*Primary Examiner* — Gims Philippe
(74) *Attorney, Agent, or Firm* — Oblon, Spivak, McClelland, Maier & Neustadt, L.L.P.

(57) ABSTRACT

An encoding apparatus includes the following elements. A prediction picture generation unit is configured to generate a prediction picture using a reference picture. A transmission unit is configured to transmit reference disablement information indicating, for all pictures, whether reference picture specification information for a preceding picture that precedes each of the pictures in encoding order is not to be used as the reference picture specification information for the picture, the reference picture specification information being information specifying the reference picture.

30 Claims, 69 Drawing Sheets

FIG. 1

| | | Descriptor |
|---|---|---|
| 1 | short_term_ref_pic_set(idx) { | |
| 2 |   inter_ref_pic_set_prediction_flag | u(1) |
| 3 |   if(inter_ref_pic_set_prediction_flag) { | |
| 4 |     delta_idx_minus1 | ue(v) |
| 5 |     delta_rps_sign | u(1) |
| 6 |     abs_delta_rps_minus1 | ue(v) |
| 7 |     for(j = 0; j <= NumDeltaPocs[RIdx]; j++) { | |
| 8 |       used_by_curr_pic_flag[j] | u(1) |
| 9 |       if(!used_by_curr_pic_flag[j]) | |
| 10 |         use_delta_flag[j] | u(1) |
| 11 |     } | |
| 12 |   } | |
| 13 |   else { | |
| 14 |     num_negative_pics | ue(v) |
| 15 |     num_positive_pics | ue(v) |
| 16 |     for(i = 0; i < num_negative_pics; i++) { | |
| 17 |       delta_poc_s0_minus1[i] | ue(v) |
| 18 |       used_by_curr_pic_s0_flag[i] | u(1) |
| 19 |     } | |
| 20 |     for(i = 0; i < num_positive_pics; i++) { | |
| 21 |       delta_poc_s1_minus1[i] | ue(v) |
| 22 |       used_by_curr_pic_s1_flag[i] | u(1) |
| 23 |     } | |
| 24 |   } | |
| 25 | } | |

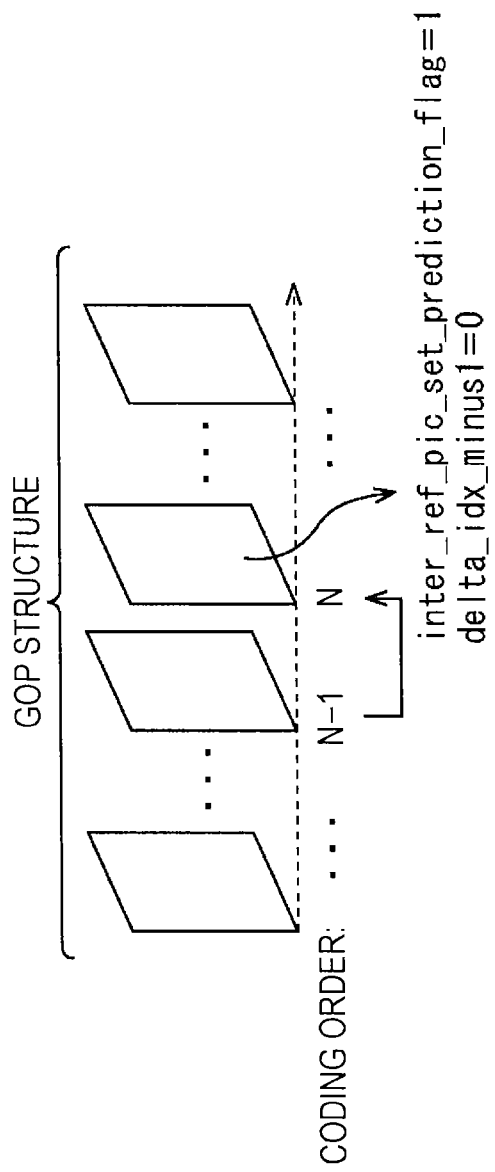

FIG. 5

| | | Descriptor |
|---|---|---|
| 1 | seq_parameter_set_rbsp( ) { | |
| 2 | ... | |
| 3 | seq_loop_filter_across_slices_enabled_flag | u(1) |
| 4 | asymmetric_motion_partitions_enabled_flag | u(1) |
| 5 | nsrqt_enabled_flag | u(1) |
| 6 | sample_adaptive_offset_enabled_flag | u(1) |
| 7 | adaptive_loop_filter_enabled_flag | u(1) |
| 8 | if(adaptive_loop_filter_enabled_flag) | |
| 9 |    alf_coef_in_slice_flag | u(1) |
| 10 | if(pcm_enabled_flag) | |
| 11 |    pcm_loop_filter_disable_flag | u(1) |
| 12 | sps_temporal_id_nesting_flag | u(1) |
| 13 | [Ed. (BB): xy padding syntax missing here, present in HM software] | |
| 14 | if(log2_min_coding_block_size_minus3 == 0) | |
| 15 |    inter_4x4_enabled_flag | u(1) |
| 16 | num_short_term_ref_pic_sets | ue(v) |
| 17 | for(i = 0; i < num_short_term_ref_pic_sets; i++) | |
| 18 |    short_term_ref_pic_set(i) | |
| 19 | long_term_ref_pics_present_flag | u(1) |
| 20 | sps_temporal_mvp_enable_flag | u(1) |
| 21 | ... | |
| 22 | } | |

FIG. 6

|   | | Descriptor |
|---|---|---|
| 1 | short_term_ref_pic_set(idx) { | |
| 2 | if(idx == 0) | |
| 3 | inter_ref_pic_set_prediction_flag = 0 | |
| 4 | else | |
| 5 | inter_ref_pic_set_prediction_flag | u(1) |
| 6 | if(inter_ref_pic_set_prediction_flag) { | |
| 7 | ... | |
| 8 | } | |
| 9 | ... | |
| 10 | } | |

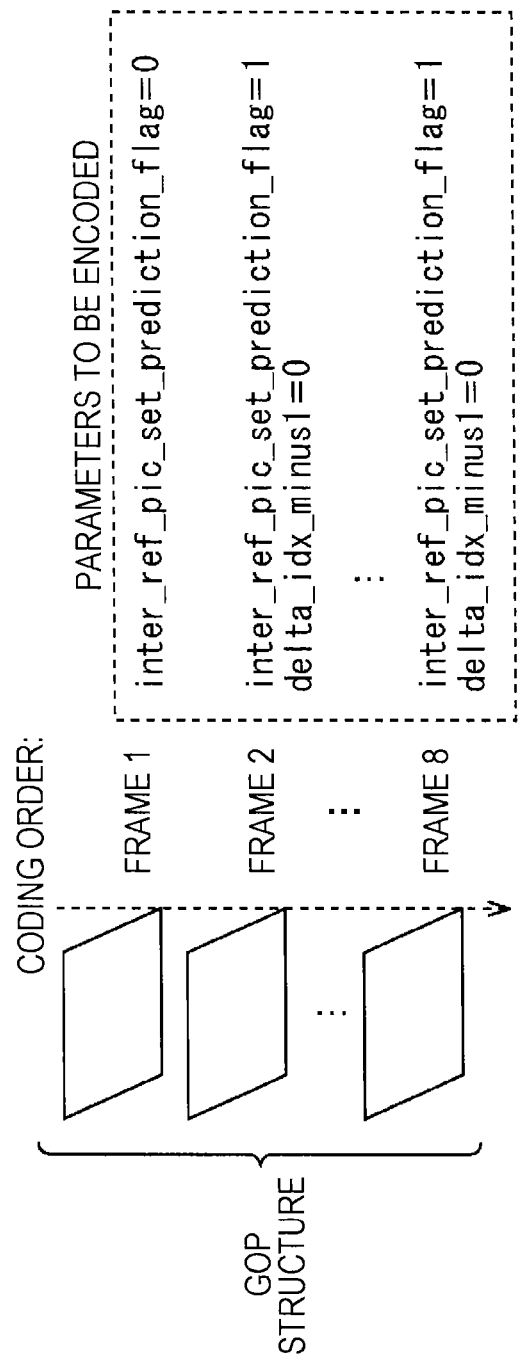

FIG. 9

| | | Descriptor |
|---|---|---|
| 1 | slice_header() { | |
| 2 | ... | |
| 3 | if(!IdrPicFlag) { | |
| 4 | pic_order_cnt_lsb | u(v) |
| 5 | short_term_ref_pic_set_sps_flag | u(1) |
| 6 | if(!short_term_ref_pic_set_sps_flag) | |
| 7 | short_term_ref_pic_set(num_short_term_ref_pic_sets) | |
| 8 | else | |
| 9 | short_term_ref_pic_set_idx | u(v) |
| 10 | if(long_term_ref_pics_present_flag) { | |
| 11 | num_long_term_pics | ue(v) |
| 12 | for(i = 0; i < num_long_term_pics; i++) { | |
| 13 | poc_lsb_lt[i] | u(v) |
| 14 | delta_poc_msb_present_flag[i] | u(1) |
| 15 | if(delta_poc_msb_present_flag[i]) | |
| 16 | delta_poc_msb_cycle_lt[i] | ue(v) |
| 17 | used_by_curr_pic_lt_flag[i] | u(1) |
| 18 | } | |
| 19 | } | |
| 20 | } | |
| 21 | ... | |
| 22 | } | |

FIG. 21

| | | Descriptor |
|---|---|---|
| 1 | seq_parameter_set_rbsp( ) { | |
| 2 | ... | |
| 3 | num_short_term_ref_pic_sets | ue(v) |
| 4 | disable_rps_prediction_flag | u(1) |
| 5 | if(! disable_rps_present_flag) { | |
| 6 | unified_rps_prediction_control_present_flag | u(1) |
| 7 | if(unified_rps_prediction_control_present_flag) | |
| 8 | unified_delta_idx_minus1 | ue(v) |
| 9 | } | |
| 10 | for(i = 0;i < num_short_term_ref_pic_sets;i++) | |
| 11 | short_term_ref_pic_set(i) | |
| 12 | ... | |
| 13 | } | |

FIG. 22

| | | Descriptor |
|---|---|---|
| 1 | short_term_ref_pic_set(idx){ | |
| 2 | if(disable_rps_prediction_flag) | |
| 3 | inter_ref_pic_set_prediction_flag = 0 | |
| 4 | else | |
| 5 | inter_ref_pic_set_prediction_flag | u(1) |
| 6 | if(inter_ref_pic_set_prediction_flag){ | |
| 7 | if(unified_rps_prediction_control_present_flag){ | |
| 8 | delta_idx_minus1 = unified_delta_idx_minus1 | |
| 9 | else | |
| 10 | delta_idx_minus1 | ue(v) |
| 11 | ... | |
| 12 | } | |
| 13 | else { | |
| 14 | ... } | |
| 15 | } | |

FIG. 30

| | | Descriptor |
|---|---|---|
| 1 | seq_parameter_set_rbsp() { | |
| 2 | ... | |
| 3 | num_short_term_ref_pic_sets | ue(v) |
| 4 | disable_rps_prediction_flag | u(1) |
| 5 | if(! disable_rps_present_flag) { | |
| 6 | unified_rps_prediction_control_present_flag | u(1) |
| 7 | if(unified_rps_prediction_control_present_flag) | |
| 8 | unified_delta_idx_minus1 | ue(v) |
| 9 | } | |
| 10 | for(i = 0;i < num_short_term_ref_pic_sets;i++) | |
| 11 | short_term_ref_pic_set(i) | |
| 12 | ... | |
| 13 | } | |

FIG. 31

| | | Descriptor |
|---|---|---|
| 1 | short_term_ref_pic_set(idx) { | |
| 2 |   if ( idx == 0 \|\| disable_rps_prediction_flag) | |
| 3 |     inter_ref_pic_set_prediction_flag = 0 | |
| 4 |   else | |
| 5 |     inter_ref_pic_set_prediction_flag | u(1) |
| 6 |   if(inter_ref_pic_set_prediction_flag) { | |
| 7 |     if(unified_rps_prediction_control_present_flag) | |
| 8 |       delta_idx_minus1 = unified_delta_idx_minus1 | |
| 9 |     else | |
| 10 |       delta_idx_minus1 | ue(v) |
| 11 |     ... | |
| 12 |   } | |
| 13 |   else{...} | |
| 14 | } | |

FIG. 38

| 1  | pic_parameter_set_rbsp( ) { | Descriptor |
|---|---|---|
| 2  |   pic_parameter_set_id | ue(v) |
| 3  |   seq_parameter_set_id | ue(v) |
| 4  |   sign_data_hiding_flag | u(1) |
| 5  |   cabac_init_present_flag | u(1) |
| 6  |   unified_slice_type_flag | u(1) |
| 7  |   if(unified_slice_type_flag) | |
| 8  |     all_intra_slice_flag | u(1) |
| 9  |   if(!(unified_slice_type_flag && all_intra_slice_flag)) | |
| 10 |     no_b_slice_flag | u(1) |
| 11 |   if(!(unified_slice_type_flag && all_intra_slice_flag)) { | |
| 12 |     num_ref_idx_l0_default_active_minus1 | ue(v) |
| 13 |     if(!no_b_slice_flag) | |
| 14 |       num_ref_idx_l1_default_active_minus1 | ue(v) |
| 15 |   } | |
| 16 |   pic_init_qp_minus26 | se(v) |
| 17 |   constrained_intra_pred_flag | u(1) |
| 18 |   transform_skip_enabled_flag | u(1) |
| 19 |   cu_qp_delta_enabled_flag | u(1) |
| 20 |   if(cu_qp_delta_enabled_flag) | |
| 21 |     diff_cu_qp_delta_depth | ue(v) |
| 22 |   pic_cb_qp_offset | se(v) |
| 23 |   pic_cr_qp_offset | se(v) |
| 24 |   pic_slice_level_chroma_qp_offsets_present_flag | u(1) |
| 25 |   if(!(unified_slice_type_flag && all_intra_slice_flag)) { | |
| 26 |     weighted_pred_flag | u(1) |
| 27 |     if(!no_b_slice_flag) | |
| 28 |       weighted_bipred_flag | u(1) |
| 29 |   } | |
| 30 |   output_flag_present_flag | u(1) |
| 31 |   transquant_bypass_enable_flag | u(1) |
| 32 |   dependent_slice_enabled_flag | u(1) |
| 33 |   tiles_enabled_flag | u(1) |
| 34 |   entropy_coding_sync_enabled_flag | u(1) |
| 35 |   entropy_slice_enabled_flag | u(1) |
| 36 |   if(tiles_enabled_flag) { | |
| 37 |     num_tile_columns_minus1 | ue(v) |
| 38 |     num_tile_rows_minus1 | ue(v) |
| 39 |     uniform_spacing_flag | u(1) |
| 40 |     if(!uniform_spacing_flag) { | |
| 41 |       for(i=0; i<num_tile_columns_minus1; i++) | |
| 42 |         column_width_minus1[i] | ue(v) |

FIG. 39

| 1 | for(i=0;i< num_tile_rows_minus1;i++) | |
|---|---|---|
| 2 | row_height_minus1[i] | ue(v) |
| 3 | } | |
| 4 | loop_filter_across_tiles_enabled_flag | u(1) |
| 5 | } | |
| 6 | loop_filter_across_slices_enabled_flag | u(1) |
| 7 | deblocking_filter_control_present_flag | u(1) |
| 8 | if(deblocking_filter_control_present_flag) { | |
| 9 | deblocking_filter_override_enabled_flag | u(1) |
| 10 | pps_disable_deblocking_filter_flag | u(1) |
| 11 | if(!pps_disable_deblocking_filter_flag) { | |
| 12 | beta_offset_div2 | se(v) |
| 13 | tc_offset_div2 | se(v) |
| 14 | } | |
| 15 | } | |
| 16 | pps_scaling_list_data_present_flag | u(1) |
| 17 | if( pps_scaling_list_data_present_flag) | |
| 18 | scaling_list_data( ) | |
| 19 | log2_parallel_merge_level_minus2 | ue(v) |
| 20 | slice_header_extension_present_flag | u(1) |
| 21 | slice_extension_present_flag | u(1) |
| 22 | pps_extension_flag | u(1) |
| 23 | if(pps_extension_flag) | |
| 24 | while(more_rbsp_data( )) | |
| 25 | pps_extension_data_flag | u(1) |
| 26 | rbsp_trailing_bits( ) | |
| 27 | } | |

FIG. 40

| 1 | pic_parameter_set_rbsp( ) { | Descriptor |
|---|---|---|
| 2 |   pic_parameter_set_id | ue(v) |
| 3 |   seq_parameter_set_id | ue(v) |
| 4 |   sign_data_hiding_flag | u(1) |
| 5 |   cabac_init_present_flag | u(1) |
| 6 |   num_ref_idx_l0_default_active_minus1 | ue(v) |
| 7 |   num_ref_idx_l1_default_active_minus1 | ue(v) |
| 8 |   pic_init_qp_minus26 | se(v) |
| 9 |   constrained_intra_pred_flag | u(1) |
| 10 |   transform_skip_enabled_flag | u(1) |
| 11 |   cu_qp_delta_enabled_flag | u(1) |
| 12 |   if(cu_qp_delta_enabled_flag) | |
| 13 |     diff_cu_qp_delta_depth | ue(v) |
| 14 |   pic_cb_qp_offset | se(v) |
| 15 |   pic_cr_qp_offset | se(v) |
| 16 |   pic_slice_level_chroma_qp_offsets_present_flag | u(1) |
| 17 |   weighted_pred_flag | u(1) |
| 18 |   weighted_bipred_flag | u(1) |
| 19 |   output_flag_present_flag | u(1) |
| 20 |   transquant_bypass_enable_flag | u(1) |
| 21 |   dependent_slice_enabled_flag | u(1) |
| 22 |   tiles_enabled_flag | u(1) |
| 23 |   entropy_coding_sync_enabled_flag | u(1) |
| 24 |   entropy_slice_enabled_flag | u(1) |
| 25 |   if(tiles_enabled_flag) { | |
| 26 |     num_tile_columns_minus1 | ue(v) |
| 27 |     num_tile_rows_minus1 | ue(v) |
| 28 |     uniform_spacing_flag | u(1) |
| 29 |     if(!uniform_spacing_flag) { | |
| 30 |       for(i=0; i<num_tile_columns_minus1; i++) | |
| 31 |         column_width_minus1[i] | ue(v) |
| 32 |       for(i=0; i<num_tile_rows_minus1; i++) | |
| 33 |         row_height_minus1[i] | ue(v) |
| 34 |     } | |
| 35 |     loop_filter_across_tiles_enabled_flag | u(1) |
| 36 |   } | |
| 37 |   loop_filter_across_slices_enabled_flag | u(1) |
| 38 |   deblocking_filter_control_present_flag | u(1) |
| 39 |   if(deblocking_filter_control_present_flag) { | |
| 40 |     deblocking_filter_override_enabled_flag | u(1) |
| 41 |     pps_disable_deblocking_filter_flag | u(1) |
| 42 |     if(!pps_disable_deblocking_filter_flag) { | |
| 43 |       beta_offset_div2 | se(v) |

FIG. 41

| 1 | tc_offset_div2 | se(v) |
|---|---|---|
| 2 | } | |
| 3 | } | |
| 4 | pps_scaling_list_data_present_flag | u(1) |
| 5 | if(pps_scaling_list_data_present_flag) | |
| 6 | scaling_list_data( ) | |
| 7 | log2_parallel_merge_level_minus2 | ue(v) |
| 8 | slice_header_extension_present_flag | u(1) |
| 9 | slice_extension_present_flag | u(1) |
| 10 | pps_extension_flag | u(1) |
| 11 | if(pps_extension_flag) | |
| 12 | while(more_rbsp_data( )) | |
| 13 | pps_extension_data_flag | u(1) |
| 14 | rbsp_trailing_bits( ) | |
| 15 | } | |

FIG. 42

| 1 | slice_header() { | Descriptor |
|---|---|---|
| 2 |   first_slice_in_pic_flag | u(1) |
| 3 |   if(RapPicFlag) | |
| 4 |     no_output_of_prior_pics_flag | u(1) |
| 5 |   pic_parameter_set_id | ue(v) |
| 6 |   if(!first_slice_in_pic_flag) | |
| 7 |     slice_address | u(v) |
| 8 |   if(dependent_slice_enabled_flag && !first_slice_in_pic_flag) | |
| 9 |     dependent_slice_flag | u(1) |
| 10 |   if(!dependent_slice_flag) { | |
| 11 |     if((!unified_slice_type_flag)||(unified_slice_type_flag && first_slice_in_pic_flag)) | |
| 12 |       slice_type | ue(v) |
| 13 |     if(output_flag_present_flag) | |
| 14 |       pic_output_flag | u(1) |
| 15 |     if(separate_colour_plane_flag == 1) | |
| 16 |       colour_plane_id | u(2) |
| 17 |     if(!IdrPicFlag) { | |
| 18 |       pic_order_cnt_lsb | u(v) |
| 19 |       short_term_ref_pic_set_sps_flag | u(1) |
| 20 |       if(!short_term_ref_pic_set_sps_flag) | |
| 21 |         short_term_ref_pic_set(num_short_term_ref_pic_sets) | |
| 22 |       else | |
| 23 |         short_term_ref_pic_set_idx | u(v) |
| 24 |       if(long_term_ref_pics_present_flag) { | |
| 25 |         if(num_long_term_ref_pics_sps>0) | |
| 26 |           num_long_term_sps | ue(v) |
| 27 |         num_long_term_pics | ue(v) |
| 28 |         for(i=0; i<num_long_term_sps+num_long_term_pics; i++) { | |
| 29 |           if(i<num_long_term_sps) | |
| 30 |             lt_idx_sps[i] | u(v) |
| 31 |           else{ | |
| 32 |             poc_lsb_lt[i] | u(v) |
| 33 |             used_by_curr_pic_lt_flag[i] | u(1) |
| 34 |           } | |
| 35 |           delta_poc_msb_present_flag[i] | u(1) |
| 36 |           if( delta_poc_msb_present_flag[i]) | |
| 37 |             delta_poc_msb_cycle_lt[i] | ue(v) |
| 38 |         } | |
| 39 |       } | |
| 40 |     } | |
| 41 |     if(sample_adaptive_offset_enabled_flag) { | |
| 42 |       slice_sao_luma_flag | u(1) |
| 43 |       slice_sao_chroma_flag | u(1) |

FIG. 43

| | | |
|---|---|---|
| 1 | } | |
| 2 | if(slice_type == P \|\| slice_type == B) { | |
| 3 | if(sps_temporal_mvp_enable_flag) | |
| 4 | slice_temporal_mvp_enable_flag | u(1) |
| 5 | num_ref_idx_active_override_flag | u(1) |
| 6 | if(num_ref_idx_active_override_flag) { | |
| 7 | num_ref_idx_l0_active_minus1 | ue(v) |
| 8 | if(slice_type == B) | |
| 9 | num_ref_idx_l1_active_minus1 | ue(v) |
| 10 | } | |
| 11 | if(lists_modification_present_flag) | |
| 12 | ref_pic_list_modification( ) | |
| 13 | if(slice_type == B) | |
| 14 | mvd_l1_zero_flag | u(1) |
| 15 | if(cabac_init_present_flag) | |
| 16 | cabac_init_flag | u(1) |
| 17 | if(slice_temporal_mvp_enable_flag) { | |
| 18 | if( slice_type == B) | |
| 19 | collocated_from_l0_flag | u(1) |
| 20 | if((collocated_from_l0_flag && num_ref_idx_l0_active_minus1>0) \|\| (!collocated_from_l0_flag && num_ref_idx_l1_active_minus1>0)) | |
| 21 | collocated_ref_idx | ue(v) |
| 22 | } | |
| 23 | if((weighted_pred_flag && slice_type == P) \|\| (weighted_bipred_flag && slice_type == B)) | |
| 24 | pred_weight_table( ) | |
| 25 | five_minus_max_num_merge_cand | ue(v) |
| 26 | } | |
| 27 | slice_qp_delta | se(v) |
| 28 | if(pic_slice_level_chroma_qp_offsets_present_flag) { | |
| 29 | slice_cb_qp_offset | se(v) |
| 30 | slice_cr_qp_offset | se(v) |
| 31 | } | |
| 32 | if(deblocking_filter_control_present_flag) { | |
| 33 | if(deblocking_filter_override_enabled_flag) | |
| 34 | deblocking_filter_override_flag | u(1) |
| 35 | if(deblocking_filter_override_flag) { | |
| 36 | slice_header_disable_deblocking_filter_flag | u(1) |
| 37 | if(!slice_header_disable_deblocking_filter_flag) { | |
| 38 | beta_offset_div2 | se(v) |
| 39 | tc_offset_div2 | se(v) |
| 40 | } | |
| 41 | } | |

FIG. 44

| 1 | } | |
|---|---|---|
| 2 | if( loop_filter_across_slices_enabled_flag &&<br>(slice_sao_luma_flag \|\| slice_sao_chroma_flag \|\|<br>!disable_deblocking_filter_flag)) | |
| 3 | slice_loop_filter_across_slices_enabled_flag | u(1) |
| 4 | } | |
| 5 | if(tiles_enabled_flag \|\| entropy_coding_sync_enabled_flag) { | |
| 6 | num_entry_point_offsets | ue(v) |
| 7 | if(num_entry_point_offsets>0) { | |
| 8 | offset_len_minus1 | ue(v) |
| 9 | for(i=0; i<num_entry_point_offsets; i++) | |
| 10 | entry_point_offset[i] | u(v) |
| 11 | } | |
| 12 | } | |
| 13 | if(slice_header_extension_present_flag) { | |
| 14 | slice_header_extension_length | ue(v) |
| 15 | for(i=0; i<slice_header_extension_length; i++) | |
| 16 | slice_header_extension_data_byte[i] | u(8) |
| 17 | } | |
| 18 | byte_alignment( ) | |
| 19 | } | |

FIG. 45

| 1 | slice_header ( ) { | Descriptor |
|---|---|---|
| 2 |   first_slice_in_pic_flag | u(1) |
| 3 |   if(RapPicFlag) | |
| 4 |     no_output_of_prior_pics_flag | u(1) |
| 5 |   pic_parameter_set_id | ue(v) |
| 6 |   if(!first_slice_in_pic_flag) | |
| 7 |     slice_address | u(v) |
| 8 |   if(dependent_slice_enabled_flag && !first_slice_in_pic_flag) | |
| 9 |     dependent_slice_flag | u(1) |
| 10 |   if(!dependent_slice_flag) { | |
| 11 |     slice_type | ue(v) |
| 12 |     if(output_flag_present_flag) | |
| 13 |       pic_output_flag | u(1) |
| 14 |     if(separate_colour_plane_flag == 1) | |
| 15 |       colour_plane_id | u(2) |
| 16 |     if(!IdrPicFlag) { | |
| 17 |       pic_order_cnt_lsb | u(v) |
| 18 |       short_term_ref_pic_set_sps_flag | u(1) |
| 19 |       if(!short_term_ref_pic_set_sps_flag) | |
| 20 |         short_term_ref_pic_set(num_short_term_ref_pic_sets) | |
| 21 |       else | |
| 22 |         short_term_ref_pic_set_idx | u(v) |
| 23 |       if(long_term_ref_pics_present_flag) { | |
| 24 |         if( num_long_term_ref_pics_sps>0) | |
| 25 |         num_long_term_sps | ue(v) |
| 26 |         num_long_term_pics | ue(v) |
| 27 |         for (i=0; i<num_long_term_sps + num_long_term_pics; i++) { | |
| 28 |           if(i<num_long_term_sps) | |
| 29 |             lt_idx_sps[i] | u(v) |
| 30 |           else{ | |
| 31 |             poc_lsb_lt[i] | u(v) |
| 32 |             used_by_curr_pic_lt_flag[i] | u(1) |
| 33 |           } | |
| 34 |           delta_poc_msb_present_flag[i] | u(1) |
| 35 |           if( delta_poc_msb_present_flag[i]) | |
| 36 |             delta_poc_msb_cycle_lt[i] | ue(v) |
| 37 |         } | |
| 38 |       } | |
| 39 |     } | |
| 40 |     if(sample_adaptive_offset_enabled_flag){ | |
| 41 |       slice_sao_luma_flag | u(1) |
| 42 |       slice_sao_chroma_flag | u(1) |
| 43 |     } | |

FIG. 46

| 1 | if(slice_type == P \|\| slice_type == B) { | |
|---|---|---|
| 2 | if(sps_temporal_mvp_enable_flag) | |
| 3 | slice_temporal_mvp_enable_flag | u(1) |
| 4 | num_ref_idx_active_override_flag | u(1) |
| 5 | if( num_ref_idx_active_override_flag) { | |
| 6 | num_ref_idx_l0_active_minus1 | ue(v) |
| 7 | if(slice_type == B) | |
| 8 | num_ref_idx_l1_active_minus1 | ue(v) |
| 9 | } | |
| 10 | if(lists_modification_present_flag) | |
| 11 | ref_pic_list_modification( ) | |
| 12 | if(slice_type == B) | |
| 13 | mvd_l1_zero_flag | u(1) |
| 14 | if(cabac_init_present_flag) | |
| 15 | cabac_init_flag | u(1) |
| 16 | if(slice_temporal_mvp_enable_flag) { | |
| 17 | if(slice_type == B) | |
| 18 | collocated_from_l0_flag | u(1) |
| 19 | if((collocated_from_l0_flag && num_ref_idx_l0_active_minus1>0) \|\| (!collocated_from_l0_flag && num_ref_idx_l1_active_minus1>0)) | |
| 20 | collocated_ref_idx | ue(v) |
| 21 | } | |
| 22 | if((weighted_pred_flag && slice_type == P) \|\| (weighted_bipred_flag && slice_type == B)) | |
| 23 | pred_weight_table( ) | |
| 24 | five_minus_max_num_merge_cand | ue(v) |
| 25 | } | |
| 26 | slice_qp_delta | se(v) |
| 27 | if(pic_slice_level_chroma_qp_offsets_present_flag) { | |
| 28 | slice_cb_qp_offset | se(v) |
| 29 | slice_cr_qp_offset | se(v) |
| 30 | } | |
| 31 | if(deblocking_filter_control_present_flag) { | |
| 32 | if(deblocking_filter_override_enabled_flag) | |
| 33 | deblocking_filter_override_flag | u(1) |
| 34 | if(deblocking_filter_override_flag) { | |
| 35 | slice_header_disable_deblocking_filter_flag | u(1) |
| 36 | if(!slice_header_disable_deblocking_filter_flag) { | |
| 37 | beta_offset_div2 | se(v) |
| 38 | tc_offset_div2 | se(v) |
| 39 | } | |
| 40 | } | |
| 41 | } | |

FIG. 47

| | | |
|---|---|---|
| 1 | if(loop_filter_across_slices_enabled_flag && (slice_sao_luma_flag \|\| slice_sao_chroma_flag \|\| !disable_deblocking_filter_flag)) | |
| 2 | slice_loop_filter_across_slices_enabled_flag | u(1) |
| 3 | } | |
| 4 | if(tiles_enabled_flag \|\| entropy_coding_sync_enabled_flag) { | |
| 5 | num_entry_point_offsets | ue(v) |
| 6 | if(num_entry_point_offsets>0) { | |
| 7 | offset_len_minus1 | ue(v) |
| 8 | for(i=0; i<num_entry_point_offsets; i++) | |
| 9 | entry_point_offset[i] | u(v) |
| 10 | } | |
| 11 | } | |
| 12 | if(slice_header_extension_present_flag) { | |
| 13 | slice_header_extension_length | ue(v) |
| 14 | for(i=0; i<slice_header_extension_length; i++) | |
| 15 | slice_header_extension_data_byte[i] | u(8) |
| 16 | } | |
| 17 | byte_alignment( ) | |
| 18 | } | |

US 8,811,480 B2

ENCODING APPARATUS, ENCODING METHOD, DECODING APPARATUS, AND DECODING METHOD

CROSS-REFERENCE TO RELATED APPLICATIONS

This application is based upon and claims the benefit of priority from prior Japanese Patent Application Nos. 2012-218097, filed Sep. 28, 2012, and 2012-147883, filed Jun. 29, 2012, the entire contents of each of which are incorporated herein by reference.

BACKGROUND

The present technology relates to an encoding apparatus, an encoding method, a decoding apparatus, and a decoding method, and more specifically to an encoding apparatus, an encoding method, a decoding apparatus, and a decoding method, which are configured to reduce the amount of information concerning information specifying a reference picture.

In recent years, apparatuses that digitally handle image information and that comply with Moving Picture Experts Group phase (MPEG) or a similar scheme for compressing the image information using an orthogonal transform such as a discrete cosine transform (DCT) and motion compensation by utilizing redundancy specific to the image information for the purpose of efficient transmission and accumulation of the information have become increasingly prevalent for use in distributing information from broadcast stations and the like and receiving information in general households.

Particularly, MPEG-2 (International Organization for Standardization (ISO)/International Electrotechnical Commission (IEC) 13818-2) is defined as a general-purpose image coding scheme, and is a standard that covers not only interlaced scanned images and progressive scanned images but also standard-definition images and high-definition images as well. MPEG-2 is currently widely used in a wide range of applications for both professional and consumer uses. The MPEG-2 scheme allows a high compression ratio and satisfactory image quality by, for example, allocating a code amount (bit rate) of 4 to 8 Mbps to a standard-resolution interlaced scanned image having 720×480 pixels or 18 to 22 Mbps to a high-resolution interlaced scanned image having 1920×1088 pixels.

MPEG-2, which is mainly used for high-quality coding suitable for broadcasting, does not support coding schemes with a lower code amount (bit rate), or a higher compression ratio, than MPEG-1. With the widespread use of mobile terminals, the demand for such coding schemes is expected to increase, and the standardization of the MPEG-4 coding scheme has been initiated accordingly. The MPEG-4 image coding scheme standard, ISO/IEC 14496-2, was accepted as an international standard in December 1998.

In addition, standardization of H.26L (International Telecommunication Union Telecommunication Standardization Sector (ITU-T) Q6/16 Video Coding Expert Group (VCEG)), initially for the purpose of image coding for videoconferences, has progressed in recent years. In general, H.26L provides a higher coding efficiency than existing coding schemes such as MPEG-2 and MPEG-4 although it involves a large amount of computation for encoding and decoding.

Additionally, a standard based on H.26L, which incorporates functionality not supported by H.26L and provides a higher coding efficiency, called Joint Model of Enhanced-Compression Video Coding, is currently being developed as part of the MPEG-4 standardization activity. This standard was internationally standardized in March 2003 under the name H.264 and MPEG-4 Part 10 (Advanced Video Coding (AVC)).

In addition, standardization of an extension of the standard described above, named Fidelity Range Extension (FRExt), which includes coding tools for business use, such as RGB, 4:2:2, and 4:4:4, and 8×8 DCT and quantization matrices, which are defined by MPEG-2, was completed in February 2005. Accordingly, AVC can be used as a coding scheme that allows even film noise included in movies to be well displayed, and has come to be used in a wide range of applications such as Blu-Ray Disc (registered trademark).

However, there has recently been an increasing demand for a further increase in the compression ratio used in coding, such as a demand for compression of images having 4000×2000 pixels, which is four times as high as the number of pixels of high-definition images, or a demand for distribution of high-definition images in an environment with limited transmission capacity, such as the Internet. To this end, the VCEG under ITU-T is continuing to study enhancement of coding efficiency.

In the High Efficiency Video Coding (HEVC) scheme, a sequence parameter set (SPS) includes a short-term reference picture set (hereinafter referred to as an "RPS"), which is used by a decoding apparatus to identify reference picture specification information specifying a reference picture (see, for example, Benjamin Bross, Woo-Jin Han, Jens-Rainer Ohm, Gary J. Sullivan, Thomas Wiegand, "High efficiency video coding (HEVC) text specification draft 7", JCTVC-I1003_d4, 2012.4.27-5.7).

FIG. 1 is a diagram illustrating an example of the syntax of an RPS.

As given in the second line in FIG. 1, an RPS includes inter_ref_pic_set_prediction_flag. The inter_ref_pic_set_prediction_flag is reference information for a picture being encoded, indicating whether reference picture specification information specifying a reference picture of a preceding picture that is a picture preceding the picture being encoded in a group of pictures (GOP) in encoding order is to be used as reference picture specification information specifying a reference picture of the picture being encoded.

The inter_ref_pic_set_prediction_flag is equal to 1 if the reference picture specification information specifying the reference picture of the preceding picture is to be used as the reference picture specification information specifying the reference picture of the picture being encoded. The inter_ref_pic_set_prediction_flag is equal to 0 if the reference picture specification information specifying the reference picture of the preceding picture is not to be used as the reference picture specification information specifying the reference picture of the picture being encoded.

As given in the third and fourth lines in FIG. 1, if the inter_ref_pic_set_prediction_flag is equal to 1, the RPS includes delta_idx_minus1, which is preceding picture specification information specifying a preceding picture. The delta_idx_minus1 is specifically a value obtained by subtracting 1 from a value obtained by subtracting the coding number of the preceding picture from the coding number (coding order) of the picture being encoded. The term "coding number", as used herein, refers to a number assigned to each of pictures in the GOP in encoding order, starting from the smallest value.

Further, as given in the thirteenth to twenty-third lines in FIG. 1, if the inter_ref_pic_set_prediction_flag is equal to 0, the RPS includes reference picture specification information.

FIG. 2 is a diagram illustrating an example of inter_ref_pic_set_prediction_flag and delta_idx_minus1.

In the example in FIG. 2, the reference picture specification information for the picture being encoded that is assigned the coding number N is identical to the reference picture specification information for the preceding picture that is assigned the coding number N−1 and immediately precedes the picture being encoded in encoding order.

In this case, the inter_ref_pic_set_prediction_flag is set to 1, which indicates that the reference picture specification information for the preceding picture is to be used as the reference picture specification information for the picture being encoded. Further, the delta_idx_minus1 is set to 0, which is a value obtained by subtracting the coding number N−1 of the preceding picture from the coding number N of the picture being encoded to obtain the value 1 and further subtracting 1 from the obtained value 1.

SUMMARY

However, the amount of information concerning reference picture specification information, such as an RPS, is not sufficiently reduced.

Accordingly, it is desirable to reduce the amount of information concerning information specifying a reference picture.

An encoding apparatus according to a first embodiment of the present technology includes the following elements. A prediction picture generation unit is configured to generate a prediction picture using a reference picture. A transmission unit is configured to transmit reference disablement information indicating, for all pictures, whether reference picture specification information for a preceding picture that precedes each of the pictures in encoding order is not to be used as the reference picture specification information for the picture, the reference picture specification information being information specifying the reference picture.

An encoding method according to the first embodiment of the present technology corresponds to the encoding apparatus according to the first embodiment of the present technology.

In the first embodiment of the present technology, a prediction picture is generated using a reference picture, and reference disablement information indicating, for all pictures, whether reference picture specification information for a preceding picture that precedes each of the pictures in encoding order is not to be used as the reference picture specification information for the picture is transmitted, the reference picture specification information being information specifying the reference picture.

A decoding apparatus according to a second embodiment of the present technology includes the following elements. A receiving unit is configured to receive reference disablement information indicating, for all pictures, whether reference picture specification information for a preceding picture that precedes each of the pictures in encoding order is not to be used as the reference picture specification information for the picture, the reference picture specification information being information specifying a reference picture used to generate a prediction picture. A reference picture setting unit is configured to generate the reference picture specification information for a picture being decoded in accordance with the reference disablement information received by the receiving unit. A prediction picture generation unit is configured to generate a prediction picture using the reference picture specified by the reference picture specification information for the picture being decoded which is generated by the reference picture setting unit.

A decoding method according to the second embodiment of the present technology corresponds to the decoding apparatus according to the second embodiment of the present technology.

In the second embodiment of the present technology, reference disablement information indicating, for all pictures, whether reference picture specification information for a preceding picture that precedes each of the pictures in encoding order is not to be used as the reference picture specification information for the picture is received, the reference picture specification information being information specifying a reference picture used to generate a prediction picture; the reference picture specification information for a picture being decoded is generated in accordance with the received reference disablement information; and a prediction picture is generated using the reference picture specified by the generated reference picture specification information for the picture being decoded.

An encoding apparatus according to a third embodiment of the present technology includes the following elements. A prediction picture generation unit is configured to generate a prediction picture using a reference picture. A transmission unit is configured to transmit reference information in a case where a picture being encoded is a picture other than an initial picture in a group of pictures, the reference information being information indicating whether reference picture specification information for a preceding picture that precedes the picture being encoded in encoding order is to be used as the reference picture specification information for the picture being encoded, the reference picture specification information being information specifying the reference picture.

An encoding method according to the third embodiment of the present technology corresponds to the encoding apparatus according to the third embodiment of the present technology.

In the third embodiment of the present technology, a prediction picture is generated using a reference picture; and reference information is transmitted in a case where a picture being encoded is a picture other than an initial picture in a group of pictures, the reference information being information indicating whether reference picture specification information for a preceding picture that precedes the picture being encoded in encoding order is to be used as the reference picture specification information for the picture being encoded, the reference picture specification information being information specifying the reference picture.

A decoding apparatus according to a fourth embodiment of the present technology includes the following elements. A receiving unit is configured to receive reference information indicating whether reference picture specification information for a preceding picture that precedes a picture being encoded in encoding order is to be used as the reference picture specification information for the picture being encoded, the reference picture specification information being information specifying a reference picture used to generate a prediction picture, the reference information being transmitted in a case where the picture being encoded is a picture other than an initial picture in a group of pictures. A reference picture setting unit is configured to, in a case where the reference information is received by the receiving unit, generate the reference picture specification information for a picture being decoded in accordance with the reference information, and, in a case where the reference information is not received by the receiving unit, generate the reference picture specification information for the picture being decoded in accordance with reference information indicating that the reference picture specification information for the preceding picture is not to be used as the reference picture specification information for the picture being encoded. A prediction picture generation unit is configured to generate a prediction picture using the reference picture specified by the reference picture specification information generated by the reference picture setting unit.

A decoding method according to the fourth embodiment of the present technology corresponds to the decoding apparatus according to the fourth embodiment of the present technology.

In the fourth embodiment of the present technology, reference information indicating whether reference picture specification information specifying a reference picture of a preceding picture that precedes a picture being encoded in encoding order is to be used as reference picture specification information specifying a reference picture of the picture being encoded is received, the reference picture specification information being information specifying a reference picture used to generate a prediction picture, the reference information being transmitted in a case where the picture being encoded is a picture other than an initial picture in a group of pictures; in a case where the reference information is received, the reference picture specification information for a picture being decoded is generated in accordance with the reference information, and, in a case where the reference information is not received, the reference picture specification information for the picture being decoded is generated in accordance with reference information indicating that the reference picture specification information for the preceding picture is not to be used as the reference picture specification information for the picture being encoded; and a prediction picture is generated using the reference picture specified by the generated reference picture specification information.

The encoding apparatuses according to the first and third embodiments and the decoding apparatuses according to the second and fourth embodiments may be implemented by causing a computer to execute a program.

Furthermore, the program executed by a computer to implement the encoding apparatuses according to the first and third embodiments and the decoding apparatuses according to the second and fourth embodiments may be provided by being transmitted via a transmission medium or by being recorded on a recording medium.

According to the first and third embodiments of the present technology, the amount of information concerning information specifying a reference picture may be reduced.

In addition, according to the second and fourth embodiments of the present technology, an encoded stream with a reduced amount of information concerning information specifying a reference picture may be decoded.

BRIEF DESCRIPTION OF THE DRAWINGS

FIG. 1 is a diagram illustrating an example of the syntax of an RPS;

FIG. 2 is a diagram illustrating an example of inter_ref_pic_set_prediction_flag and delta_idx_minus1;

FIG. 5 is a diagram illustrating an example of the syntax of an SPS set by a setting unit illustrated in FIG. 3;

FIG. 6 is a diagram illustrating an example of the syntax of an RPS;

FIG. 8 is a diagram illustrating the amount of information of an RPS in the related art;

FIG. 9 is a diagram illustrating an example of the syntax of a slice header;

FIG. 21 is a diagram illustrating an example of the syntax of an SPS set by a setting unit illustrated in FIG. 20;

FIG. 22 is a diagram illustrating an example of the syntax of an RPS illustrated in FIG. 21;

FIG. 30 is a diagram illustrating an example of the syntax of an SPS set by a setting unit illustrated in FIG. 29;

FIG. 31 is a diagram illustrating an example of the syntax of the RPS illustrated in FIG. 30;

FIG. 38 is a diagram illustrating an example of the syntax of a PPS set by a setting unit illustrated in FIG. 36;

FIG. 39 is a diagram illustrating an example of the syntax of a PPS set by the setting unit illustrated in FIG. 36;

FIG. 40 is a diagram illustrating an example of the syntax of a PPS according to the HEVC scheme in the related art;

FIG. 41 is a diagram illustrating an example of the syntax of the PPS according to the HEVC scheme in the related art;

FIG. 42 is a diagram illustrating an example of the syntax of a slice header to be added by a lossless encoding unit illustrated in FIG. 37;

FIG. 43 is a diagram illustrating an example of the syntax of the slice header to be added by the lossless encoding unit illustrated in FIG. 37;

FIG. 44 is a diagram illustrating an example of the syntax of the slice header to be added by the lossless encoding unit illustrated in FIG. 37;

FIG. 45 is a diagram illustrating an example of the syntax of a slice header according to the HEVC scheme in the related art;

FIG. 46 is a diagram illustrating an example of the syntax of the slice header according to the HEVC scheme in the related art;

FIG. 47 is a diagram illustrating an example of the syntax of the slice header according to the HEVC scheme in the related art;

DETAILED DESCRIPTION OF EMBODIMENTS

Figure 3:
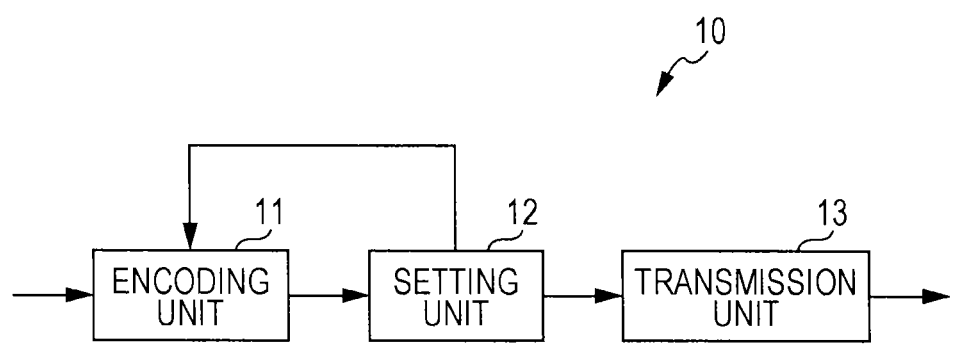
FIG. 3 is a block diagram illustrating an example configuration of an encoding apparatus according to a first embodiment of the present technology.

First Embodiment
Example Configuration of Encoding Apparatus According to First Embodiment FIG. 3 is a block diagram illustrating an example configuration of an encoding apparatus 10 according to a first embodiment of the present technology.

The encoding apparatus 10 illustrated in FIG. 3 includes an encoding unit 11, a setting unit 12, and a transmission unit 13, and is configured to encode an image using the HEVC scheme.

Specifically, pictures are input to the encoding unit 11 of the encoding apparatus 10 frame-by-frame as input signals. The encoding unit 11 encodes the input signals using the HEVC scheme while referring to the RPSs supplied from the setting unit 12 to obtain encoded data, and supplies the encoded data to the setting unit 12.

The setting unit 12 sets an RPS not including inter_ref_pic_set_prediction_flag but including reference picture specification information, and an RPS including both inter_ref_pic_set_prediction_flag and reference picture specification information or delta_idx_minus1. The setting unit 12 assigns an index to each of the RPSs as reference picture information specification information specifying the associated RPS (reference picture information). Here, by way of example, the RPS not including inter_ref_pic_set_prediction_flag but including reference picture specification information is assigned the index 0.

The setting unit 12 supplies the RPSs that are assigned the indices to the encoding unit 11. The setting unit 12 sets an SPS including the RPSs, a picture parameter set (PPS), and so forth.

The setting unit 12 generates an encoded stream using the set SPS and PPS and the encoded data supplied from the encoding unit 11. The setting unit 12 supplies the encoded stream to the transmission unit 13.

The transmission unit 13 transmits the encoded stream supplied from the setting unit 12 to a decoding apparatus described below.

Example Configuration of Encoding Unit

Figure 4:
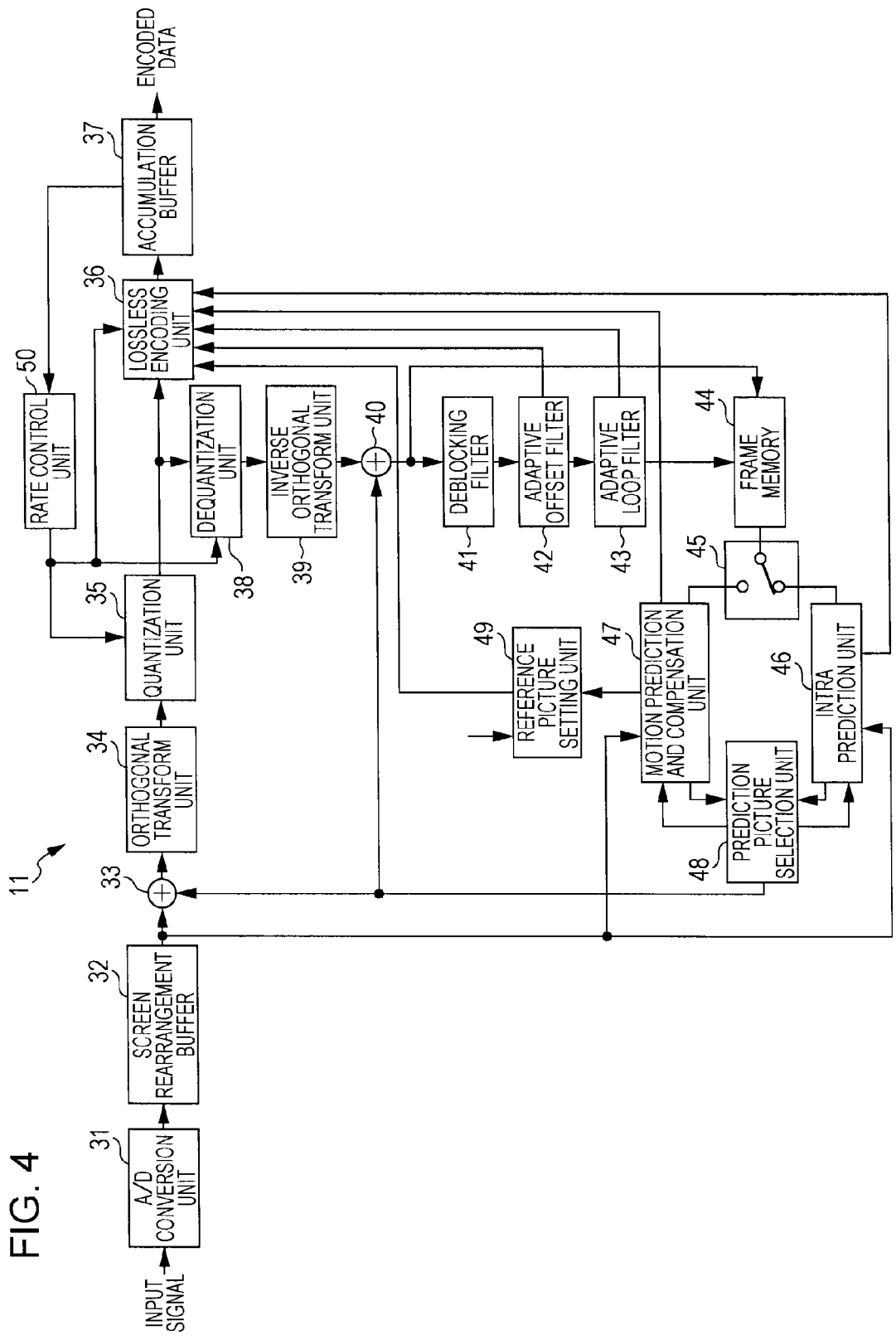
FIG. 4 is a block diagram illustrating an example configuration of an encoding unit illustrated in FIG. 3.

FIG. 4 is a block diagram illustrating an example configuration of the encoding unit 11 illustrated in FIG. 3.

Referring to FIG. 4, the encoding unit 11 includes an analog-to-digital (A/D) conversion unit 31, a screen rearrangement buffer 32, a computation unit 33, an orthogonal transform unit 34, a quantization unit 35, a lossless encoding unit 36, an accumulation buffer 37, a dequantization unit 38, an inverse orthogonal transform unit 39, an adder unit 40, a deblocking filter 41, an adaptive offset filter 42, an adaptive loop filter 43, a frame memory 44, a switch 45, an intra prediction unit 46, a motion prediction and compensation unit 47, a prediction picture selection unit 48, a reference picture setting unit 49, and a rate control unit 50.

Specifically, the A/D conversion unit 31 of the encoding unit 11 performs A/D conversion on frame-by-frame pictures input as input signals, and outputs the resulting pictures to the screen rearrangement buffer 32 for storage. The screen rearrangement buffer 32 rearranges the stored frame-by-frame pictures, which are arranged in display order, to the encoding order in accordance with the GOP structure, and outputs the rearranged pictures to the computation unit 33, the intra prediction unit 46, and the motion prediction and compensation unit 47.

The computation unit 33 functions as an encoding unit, and performs encoding by computing a difference between a prediction picture supplied from the prediction picture selection unit 48 and the picture being encoded which is output from the screen rearrangement buffer 32. Specifically, the computation unit 33 performs encoding by subtracting the prediction picture supplied from the prediction picture selection unit 48 from the picture being encoded output from the screen rearrangement buffer 32. The computation unit 33 outputs the picture obtained as a result of the subtraction to the orthogonal transform unit 34 as residual information. If no prediction picture is supplied from the prediction picture selection unit 48, the computation unit 33 outputs a picture read from the screen rearrangement buffer 32 to the orthogonal transform unit 34 as residual information as it is.

The orthogonal transform unit 34 performs an orthogonal transform on the residual information supplied from the computation unit 33 to generate an orthogonal transform coefficient. The orthogonal transform unit 34 supplies the generated orthogonal transform coefficient to the quantization unit 35.

The quantization unit 35 quantizes the orthogonal transform coefficient supplied from the orthogonal transform unit 34 using a quantization parameter supplied from the rate control unit 50. The quantization unit 35 inputs the quantized coefficient to the lossless encoding unit 36.

The lossless encoding unit 36 acquires information (hereinafter referred to as "intra-prediction mode information") indicating an optimum intra-prediction mode from the intra prediction unit 46. The lossless encoding unit 36 also acquires information (hereinafter referred to as "inter-prediction mode information") indicating an optimum inter-prediction mode, motion vectors, and any other suitable data from the motion prediction and compensation unit 47. The lossless encoding unit 36 further acquires the indices of the RPSs or the RPSs and any other suitable data from the reference picture setting unit 49, and acquires a quantization parameter from the rate control unit 50.

Further, the lossless encoding unit 36 acquires offset filter information including a storage flag, indices or offsets, and type information from the adaptive offset filter 42, and acquires a filter coefficient from the adaptive loop filter 43.

The lossless encoding unit 36 losslessly encodes the quantized coefficient supplied from the quantization unit 35 using variable-length coding (such as context-adaptive variable length coding (CAVLC)), arithmetic coding (such as context-adaptive binary arithmetic coding (CABAC)), or the like.

The lossless encoding unit 36 further losslessly encodes coding information concerning encoding. The coding information includes the intra-prediction mode information or the inter-prediction mode information and the motion vectors, the indices of the RPSs or the RPSs and any other suitable data, the quantization parameter, the offset filter information, and the filter coefficient. The lossless encoding unit 36 supplies the losslessly encoded coding information and coefficients to the accumulation buffer 37 as encoded data for accumulation. The losslessly encoded coding information may be header information (slice header) on the losslessly encoded coefficients.

The accumulation buffer 37 temporarily stores the encoded data supplied from the lossless encoding unit 36. Further, the accumulation buffer 37 supplies the stored encoded data to the setting unit 12 illustrated in FIG. 3.

The quantized coefficient output from the quantization unit 35 is also input to the dequantization unit 38. The dequantization unit 38 dequantizes the coefficient quantized by the quantization unit 35 using the quantization parameter supplied from the rate control unit 50 to obtain an orthogonal transform coefficient, and supplies the obtained orthogonal transform coefficient to the inverse orthogonal transform unit 39.

The inverse orthogonal transform unit 39 performs an inverse orthogonal transform on the orthogonal transform coefficient supplied from the dequantization unit 38. The inverse orthogonal transform unit 39 supplies residual information obtained as a result of the inverse orthogonal transform to the adder unit 40.

The adder unit 40 adds the residual information supplied from the inverse orthogonal transform unit 39 and the prediction picture supplied from the prediction picture selection unit 48 to obtain a locally decoded picture. If no prediction picture is supplied from the prediction picture selection unit 48, the adder unit 40 uses the residual information supplied from the inverse orthogonal transform unit 39 as a locally decoded picture. The adder unit 40 supplies the locally decoded picture to the deblocking filter 41, and also supplies the locally decoded picture to the frame memory 44 for accumulation.

The deblocking filter 41 performs an adaptive deblocking filtering process on the locally decoded picture supplied from the adder unit 40 to remove block distortion, and supplies the resultant picture to the adaptive offset filter 42.

The adaptive offset filter 42 performs an adaptive offset filtering (sample adaptive offset (SAO)) process on the picture subjected to the adaptive deblocking filtering process by the deblocking filter 41 to mainly remove ringing artifacts.

Specifically, the adaptive offset filter 42 determines the type of adaptive offset filtering process for each largest coding unit (LCU), and determines offsets to be used in the adaptive offset filtering process. The adaptive offset filter 42 performs the determined type of adaptive offset filtering process on the picture subjected to the adaptive deblocking filtering process, using the determined offsets. The adaptive offset filter 42 supplies the picture subjected to the adaptive offset filtering process to the adaptive loop filter 43.

Further, the adaptive offset filter 42 has a buffer for storing offsets. The adaptive offset filter 42 determines on an LCU-by-LCU basis whether or not the offsets used in the adaptive deblocking filtering process have been stored in the buffer.

If it is determined that the offsets used in the adaptive deblocking filtering process have been stored in the buffer, the adaptive offset filter 42 sets a storage flag indicating whether the offsets have been stored in the buffer to a value (here, 1) indicating that the offsets have been stored in the buffer.

The adaptive offset filter 42 supplies the storage flag set to 1, indices indicating the positions at which the offsets are stored in the buffer, and type information indicating the type of adaptive offset filtering process which has been performed to the lossless encoding unit 36 on an LCU-by-LCU basis.

If it is determined that the offsets used in the adaptive deblocking filtering process have not yet been stored in the buffer, the adaptive offset filter 42 stores the offsets in the buffer in order. The adaptive offset filter 42 further sets the storage flag to a value (here, 0) indicating that the offsets have not yet been stored in the buffer. The adaptive offset filter 42 supplies the storage flag set to 0, the offsets, and type information to the lossless encoding unit 36 on an LCU-by-LCU basis.

The adaptive loop filter 43 performs an adaptive loop filtering (adaptive loop filtering (ALF)) process on the picture subjected to the adaptive offset filtering process, which is supplied from the adaptive offset filter 42, on an LCU-by-LCU basis, for example. For example, a process based on a two-dimensional Wiener filter may be used as an adaptive loop filtering process. Filters other than a Wiener filter may be used.

Specifically, the adaptive loop filter 43 calculates, on an LCU-by-LCU basis, a filter coefficient to be used in the adaptive loop filtering process so that the residual between the original picture, which is a picture output from the screen rearrangement buffer 32, and the picture subjected to the adaptive loop filtering process becomes minimum. The adaptive loop filter 43 performs an adaptive loop filtering process on the picture subjected to the adaptive offset filtering process using the calculated filter coefficient on an LCU-by-LCU basis.

The adaptive loop filter 43 supplies the picture subjected to the adaptive loop filtering process to the frame memory 44. The adaptive loop filter 43 further supplies the filter coefficient to the lossless encoding unit 36.

In the foregoing description, the adaptive loop filtering process is performed on an LCU-by-LCU basis. However, the unit of the adaptive loop filtering process is not limited to an LCU. Note that making the units of processing of the adaptive offset filter 42 and the adaptive loop filter 43 match may provide efficient processing.

The frame memory 44 accumulates the picture supplied from the adaptive loop filter 43 and the picture supplied from the adder unit 40. The pictures accumulated in the frame memory 44 are output as reference pictures to the intra prediction unit 46 or the motion prediction and compensation unit 47 via the switch 45.

The intra prediction unit 46 performs an intra prediction process for all the possible intra prediction modes using a reference picture read from the frame memory 44 via the switch 45.

Further, the intra prediction unit 46 calculates cost function values (the details will be described below) for all the possible intra prediction modes in accordance with the pictures read from the screen rearrangement buffer 32 and a prediction picture generated as a result of the intra prediction process. The intra prediction unit 46 determines the intra prediction mode for which the cost function value is minimum to be an optimum intra-prediction mode.

The intra prediction unit 46 supplies a prediction picture generated in the optimum intra-prediction mode and the corresponding cost function value to the prediction picture selection unit 48. Upon being informed by the prediction picture selection unit 48 of the selection of the prediction picture generated in the optimum intra-prediction mode, the intra prediction unit 46 supplies intra-prediction mode information to the lossless encoding unit 36.

The cost function value is also called a rate distortion (RD) cost, and is calculated using one of the high complexity mode or low complexity mode decision method as defined in, for example, Joint Model (JM), which is H.264/AVC reference software.

Specifically, in a case where cost function values are calculated using the high complexity mode decision method, processes up to decoding are provisionally performed for all possible prediction modes, and the cost function value expressed in Formula (1) below is calculated for each prediction mode:

$$\text{Cost(Mode)} = D + \lambda \cdot R, \tag{1}$$

where D denotes the difference (or distortion) between the original picture and the decoded picture, R denotes the generated code amount that also includes the orthogonal transform coefficient, and λ denotes the Lagrange multiplier given as a function of a quantization parameter QP.

In a case where cost function values are calculated using the low complexity mode decision method, the generation of prediction pictures and the calculation of the code amount of the coding information are performed for all possible prediction modes, and the cost function expressed in Formula (2) below is calculated for each prediction mode:

$$\text{Cost(Mode)} = D + Q P \text{toQuant}(QP) \cdot \text{Header\_Bit}, \tag{2}$$

where D denotes the difference (or distortion) between the original picture and the prediction picture, Header_Bit represents the code amount of the coding information, and QPtoQuant represents the function given as a function of a quantization parameter QP.

The low complexity mode decision method involves the generation of prediction pictures for all prediction modes but does not involve the generation of a decoded picture, resulting in a reduced amount of computation.

The motion prediction and compensation unit 47 performs a motion prediction and compensation process for all the possible inter prediction modes. Specifically, the motion prediction and compensation unit 47 detects motion vectors for all the possible inter prediction modes in accordance with the pictures supplied from the screen rearrangement buffer 32 and the reference picture read from the frame memory 44 via the switch 45. The motion prediction and compensation unit 47 functions as a prediction picture generation unit, and performs a compensation process on the reference picture in accordance with the motion vectors to generate a prediction picture.

In this case, the motion prediction and compensation unit 47 calculates cost function values for all the possible inter prediction modes in accordance with the pictures supplied from the screen rearrangement buffer 32 and the prediction picture, and determines the inter prediction mode for which the cost function value is minimum to be an optimum inter prediction mode. Then, the motion prediction and compensation unit 47 supplies a prediction picture generated in the optimum inter-prediction mode and the corresponding cost function value to the prediction picture selection unit 48. Upon being informed by the prediction picture selection unit 48 of the selection of the prediction picture generated in the optimum inter-prediction mode, the motion prediction and compensation unit 47 outputs the inter-prediction mode information, the corresponding motion vectors, and any other suitable data to the lossless encoding unit 36, and outputs the reference picture specification information to the reference picture setting unit 49.

The prediction picture selection unit 48 determines one of the optimum intra-prediction mode and the optimum inter-prediction mode having a smaller cost function value to be an optimum prediction mode in accordance with the cost function values supplied from the intra prediction unit 46 and the motion prediction and compensation unit 47. The prediction picture selection unit 48 supplies the prediction picture in the optimum prediction mode to the computation unit 33 and the adder unit 40. Further, the prediction picture selection unit 48 informs the intra prediction unit 46 or the motion prediction and compensation unit 47 of the selection of the prediction picture in the optimum prediction mode.

The reference picture setting unit 49 holds the reference picture specification information supplied from the motion prediction and compensation unit 47, the amount of which corresponds to the GOP. If the picture being encoded is the initial picture in the GOP, the reference picture setting unit 49 supplies the index 0 of the RPS and an RPS flag indicating that the RPS of the picture being encoded is an RPS included in the SPS to the lossless encoding unit 36.

If the picture being encoded is a picture other than the initial picture in the GOP, the reference picture setting unit 49 compares the held reference picture specification information for the preceding picture with the reference picture specification information for the picture being encoded, and determines inter_ref_pic_set_prediction_flag and delta_idx_minus1 in accordance with the comparison result. The reference picture setting unit 49 uses an RPS including the determined inter_ref_pic_set_prediction_flag and the reference picture specification information for the picture being encoded or delta_idx_minus1 as the RPS of the picture being encoded.

In a case where the same RPS as the RPS of the picture being encoded has been supplied from the setting unit 12, the reference picture setting unit 49 supplies the index of the RPS and an RPS flag indicating that the RPS of the picture being encoded is an RPS included in the SPS to the lossless encoding unit 36. In a case where the same RPS as the RPS of the picture being encoded has not been supplied from the setting unit 12, the reference picture setting unit 49 supplies the RPS of the picture being encoded and an RPS flag indicating that the RPS of the picture being encoded is not an RPS included in the SPS to the lossless encoding unit 36.

The rate control unit 50 determines a quantization parameter to be used by the quantization unit 35 in accordance with the encoded data accumulated in the accumulation buffer 37 so that no overflow or underflow occurs. The rate control unit 50 supplies the determined quantization parameter to the quantization unit 35, the lossless encoding unit 36, and the dequantization unit 38.

Example of Syntax of SPS

FIG. 5 is a diagram illustrating an example of the syntax of the SPS set by the setting unit 12 illustrated in FIG. 3.

As given in the eighteenth line in FIG. 5, the SPS includes an RPS having an individual index (i).

Example of Syntax of RPS

FIG. 6 is a diagram illustrating an example of the syntax of the RPS.

Although not illustrated in FIG. 6, the description of the lines after the sixth line is similar to the description of the lines after the third line in FIG. 1.

As given in the second and third lines in FIG. 6, an RPS for which the index (idx) is equal to 0 does not include inter_ref_pic_set_prediction_flag, but includes reference picture specification information which is included when inter_ref_pic_set_prediction_flag is equal to 0.

In contrast, as given in the fourth and fifth lines, an RPS for which the index (idx) is equal to a value other than 0 includes inter_ref_pic_set_prediction_flag. The RPS further includes reference picture specification information when the inter_ref_pic_set_prediction_flag is equal to 0, or includes delta_idx_minus1 when the inter_ref_pic_set_prediction_flag is equal to 1.

Advantages of Embodiment of Present Technology

Figure 7:
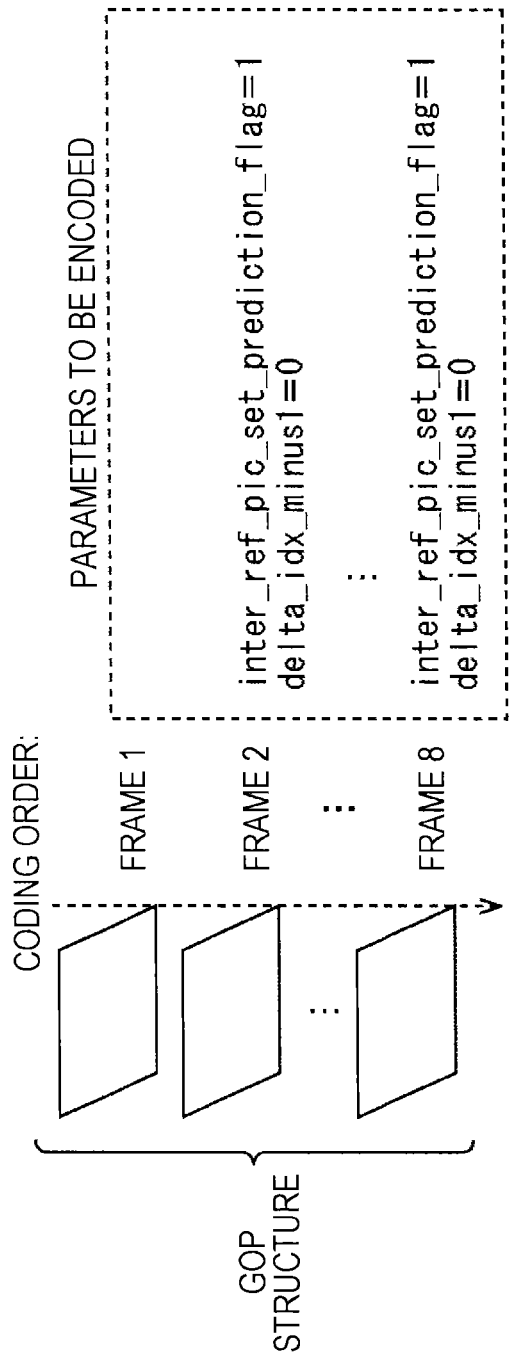
FIG. 7 is a diagram illustrating an example of the amount of information of an RPS set by the setting unit illustrated in FIG. 3.

FIG. 7 is a diagram illustrating the amount of information of the RPS set by the setting unit 12 illustrated in FIG. 3, and FIG. 8 is a diagram illustrating the amount of information of an RPS in the related art.

In the examples in FIGS. 7 and 8, the reference picture specification information for the second and eighth pictures from the beginning of the GOP is identical to the reference picture specification information for the immediately preceding pictures in encoding order.

In this case, as illustrated in FIG. 7, the setting unit 12 sets, as an RPS for which the index is equal to 0, reference picture specification information for the initial picture in the GOP. The setting unit 12 also sets, for example, as an RPS for which the index is equal to 1, the value 1 for inter_ref_pic_set_prediction_flag and the value 0 for delta_idx_minus1. Then, the index of the RPS of the initial picture in the GOP is set to 0, and the indices of the RPSs of the second picture and the eighth picture are set to 1.

In contrast, as illustrated in FIG. 8, in the related art, the value 0 for inter_ref_pic_set_prediction_flag and the reference picture specification information for the initial picture in the GOP are set as, for example, an RPS for which the index is equal to 0. Further, as with the setting unit 12, an RPS for which the index is equal to 1 is set. Further, the index of the initial picture in the GOP is set to 0, and the indices of the RPSs of the second picture and the eighth picture are set to 1.

Accordingly, the setting unit 12 does not set inter_ref_pic_set_prediction_flag as an RPS for which the index is equal to 0, which is used as the RPS of the initial picture. That is, there are no pictures preceding the initial picture in the GOP in encoding order. Thus, the inter_ref_pic_set_prediction_flag is equal to 0 with certainty. Therefore, the setting unit 12 does not set inter_ref_pic_set_prediction_flag as an RPS for which the index is equal to 0, which is used as the RPS of the initial picture, but sets only reference picture specification information, where the inter_ref_pic_set_prediction_flag is equal to 0. As a result, the amount of information of the RPS can be reduced compared to that in the related art by an amount corresponding to the inter_ref_pic_set_prediction_flag of the initial picture.

Example of Syntax of Slice Header

FIG. 9 is a diagram illustrating an example of the syntax of a slice header.

As given in the fifth line in FIG. 9, the slice header includes an RPS flag (short_term_ref_pic_set_sps_flag) of the corresponding coefficient. Further, as given in the sixth and seventh lines in FIG. 9, if the RPS flag is equal to 0, which indicates that the RPS of the picture being encoded is not an RPS included in the SPS, the slice header includes the RPS of the corresponding coefficient as short_term_ref_pic_set (num_short_term_ref_pic_sets).

As given in the eighth and ninth lines in FIG. 9, if the RPS flag is equal to 1, which indicates that the RPS of the picture being encoded is an RPS included in the SPS, the slice header includes the index of the RPS of the corresponding coefficient as short_term_ref_pic_set_idx.

Process of Encoding Apparatus

Figure 10:
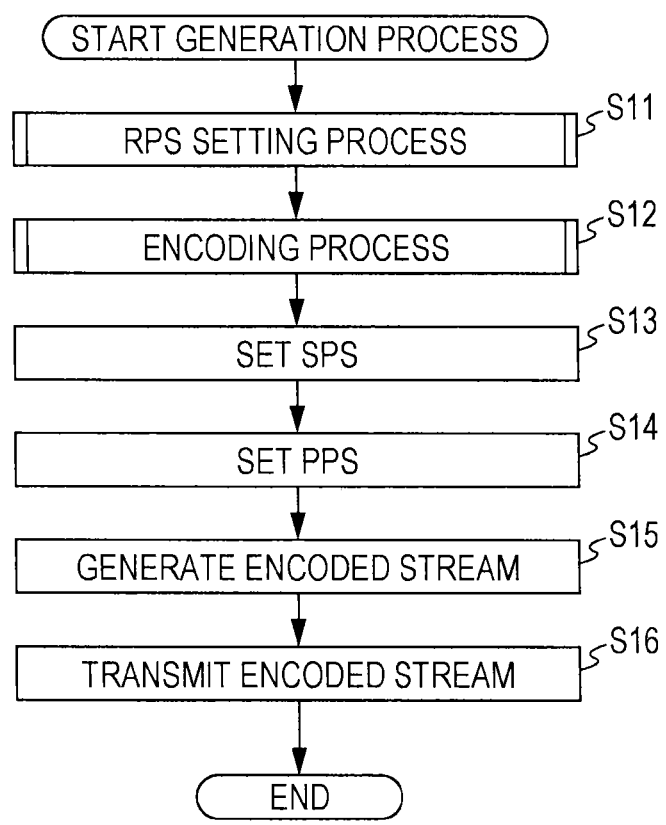
FIG. 10 is a flowchart depicting a generation process performed by the encoding apparatus illustrated in FIG. 3.

FIG. 10 is a flowchart depicting a generation process performed by the encoding apparatus 10 illustrated in FIG. 3.

Referring to FIG. 10, in step S11, the setting unit 12 of the encoding apparatus 10 performs an RPS setting process for setting an RPS. The details of the RPS setting process will be described below with reference to FIG. 11 described below. In step S12, the encoding unit 11 performs an encoding process for encoding frame-by-frame pictures input from outside as input signals using the HEVC scheme. The details of the encoding process will be described with reference to FIGS. 12 and 13 described below.

In step S13, the setting unit 12 sets an SPS including an RPS assigned an index. In step S14, the setting unit 12 sets a PPS. In step S15, the setting unit 12 generates an encoded stream using the set SPS and PPS and the encoded data supplied from the encoding unit 11. The setting unit 12 supplies the encoded stream to the transmission unit 13.

In step S16, the transmission unit 13 transmits the encoded stream supplied from the setting unit 12 to a decoding apparatus described below. Then, the process ends.

Figure 11:
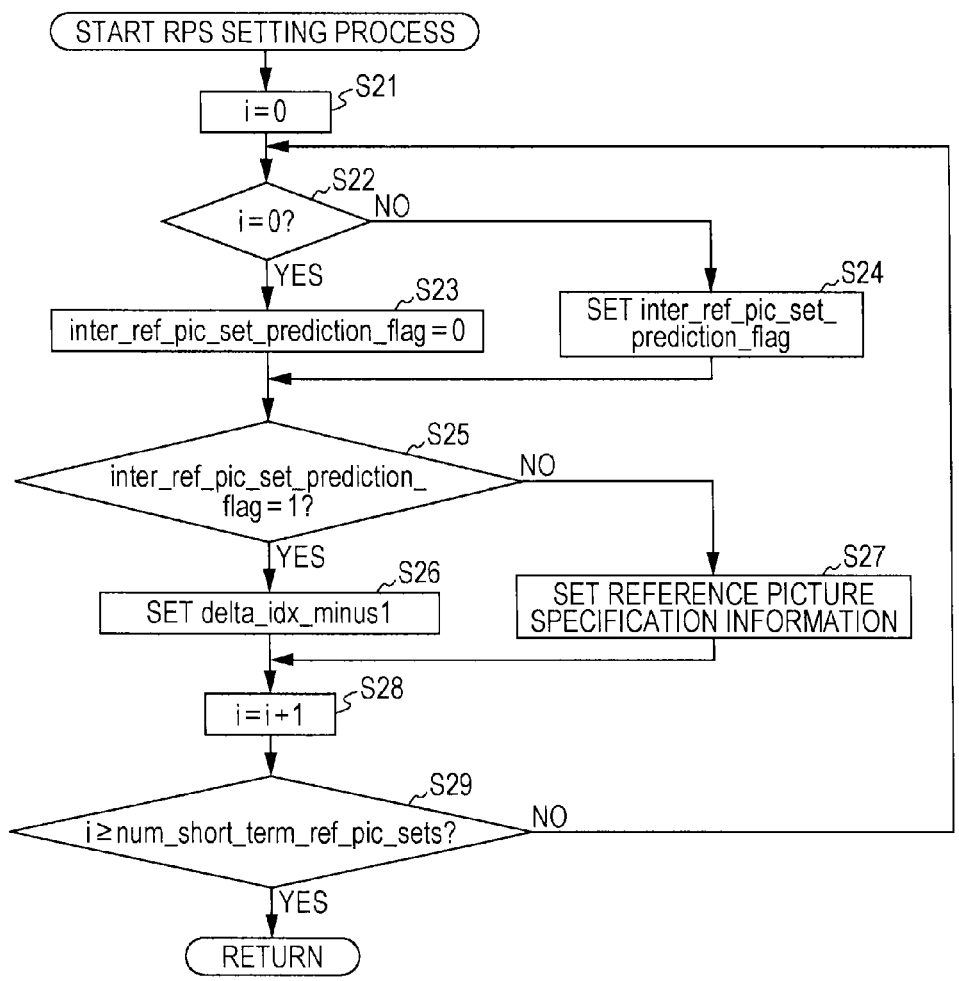
FIG. 11 is a flowchart depicting the details of an RPS setting process illustrated in FIG. 10.

FIG. 11 is a flowchart depicting the details of the RPS setting process in step S11 in FIG. 10.

Referring to FIG. 11, in step S21, the setting unit 12 sets the index i of the RPS to 0. In step S22, the setting unit 12 determines whether or not the index i of the RPS is equal to 0. If it is determined in step S22 that the index of the RPS is equal to 0, in step S23, the setting unit 12 sets inter_ref_pic_set_prediction_flag to 0. Then, the process proceeds to step S25.

If it is determined in step S22 that the index i of the RPS is not equal to 0, in step S24, the setting unit 12 sets inter_ref_pic_set_prediction_flag as an RPS having the index i. Then, the process proceeds to step S25.

In step S25, the setting unit 12 determines whether or not the inter_ref_pic_set_prediction_flag is equal to 1. If it is determined in step S25 that the inter_ref_pic_set_prediction_flag is equal to 1, in step S26, the setting unit 12 sets delta_idx_minus1 as an RPS having the index i. Then, the process proceeds to step S28.

If it is determined in step S25 that inter_ref_pic_set_prediction_flag is not equal to 1, that is, the inter_ref_pic_set_prediction_flag is equal to 0, in step S27, the setting unit 12 sets reference picture specification information. Then, the process proceeds to step S28.

In step S28, the setting unit 12 increments the index i by 1. In step S29, the setting unit 12 determines whether or not the index i is greater than or equal to num_short_term_ref_pic_sets, which represents the number of RPSs included in the SPS.

If it is determined in step S29 that the index i is not greater than or equal to the number num_short_term_ref_pic_sets, the process returns to step S22, and the processing of steps S22 to S29 is repeatedly performed until the index i becomes greater than or equal to the number num_short_term_ref_pic_sets.

If it is determined in step S29 that the index i is greater than or equal to the number num_short_term_ref_pic_sets, the process returns to step S11 in FIG. 10, and then proceeds to step S12.

Figure 12:
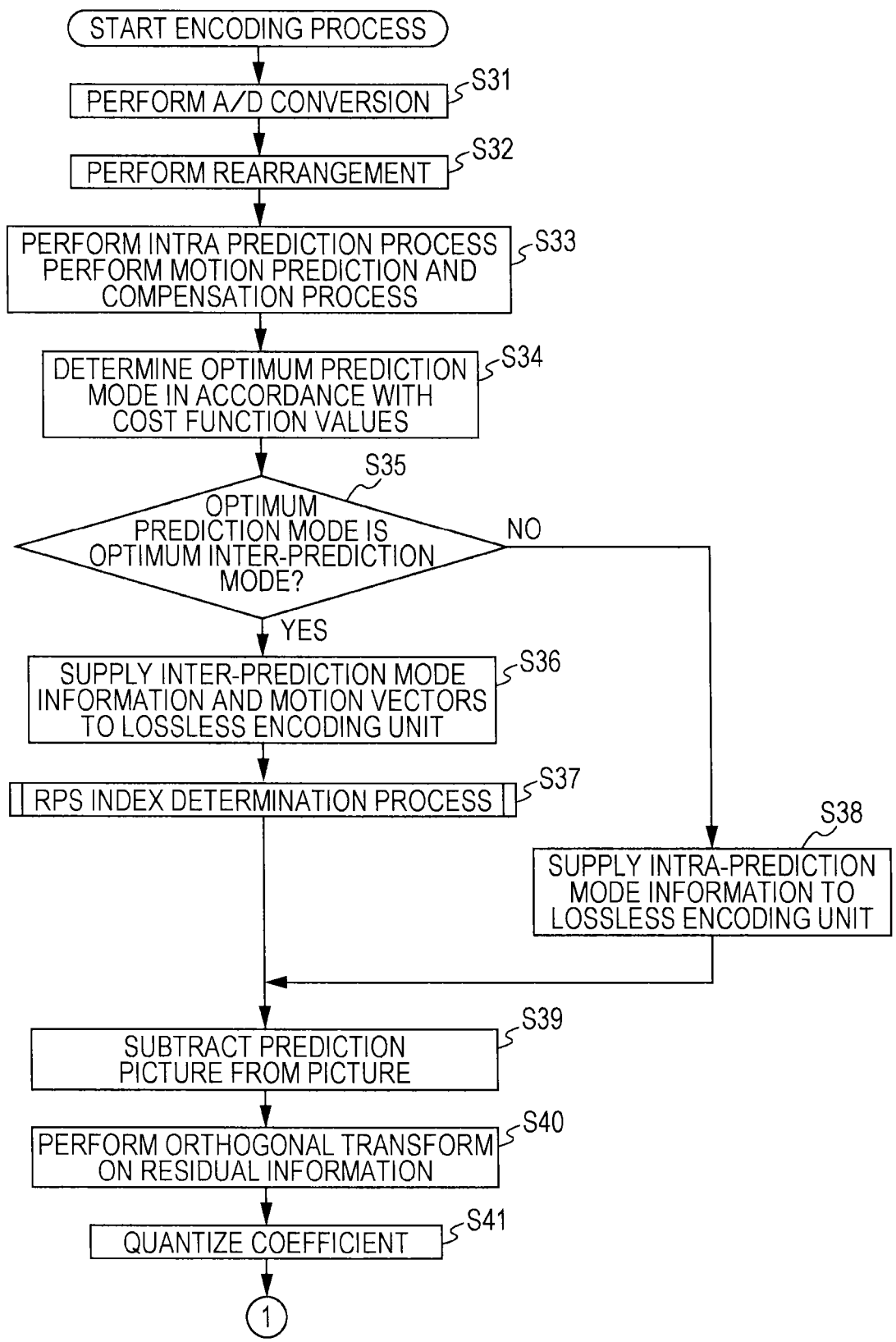
FIG. 12 is a flowchart depicting the details of an encoding process illustrated in FIG. 10.
Figure 13:
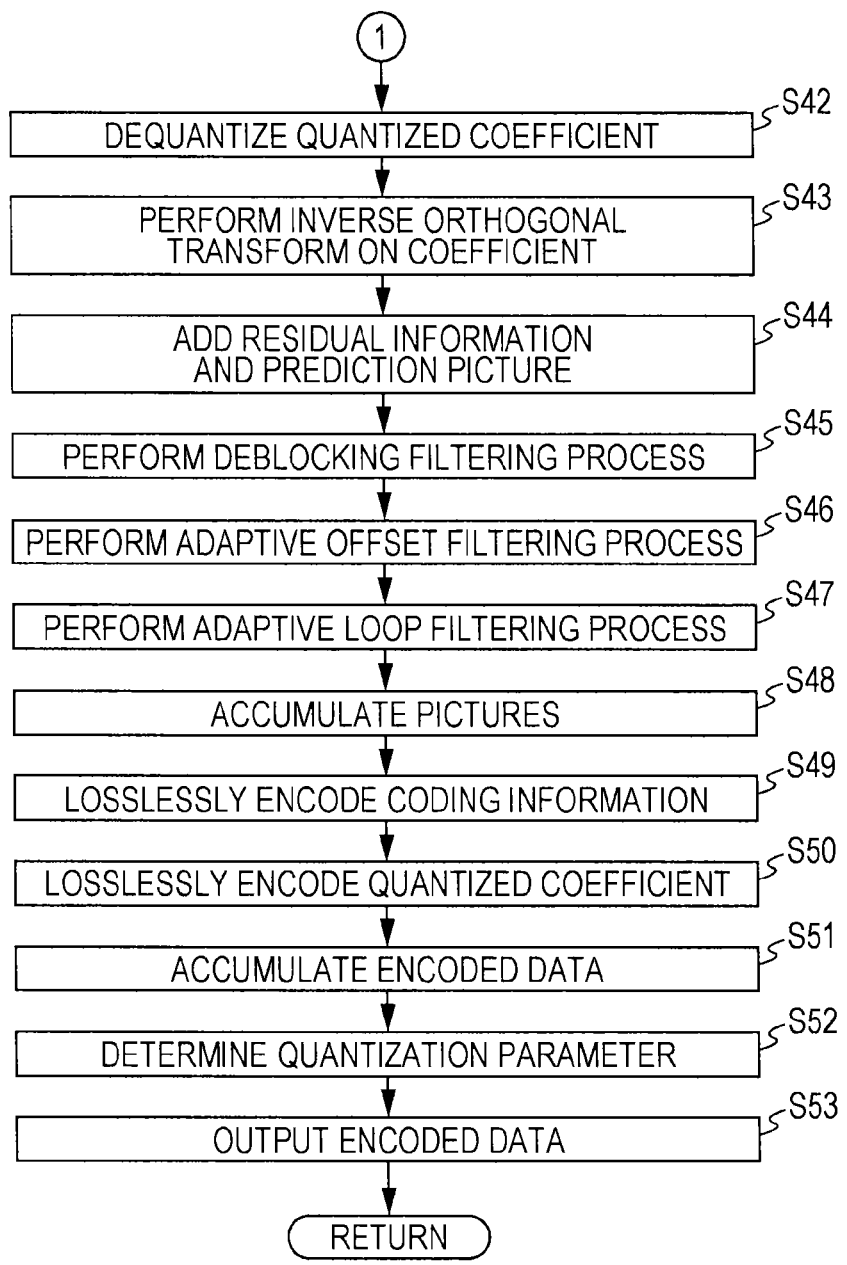
FIG. 13 is a flowchart depicting the details of the encoding process illustrated in FIG. 10.

FIGS. 12 and 13 are flowcharts illustrating the details of the encoding process in step S12 in FIG. 10.

Referring to FIG. 12, in step S31, the A/D conversion unit 31 of the encoding unit 11 performs A/D conversion on frame-by-frame pictures input as input signals, and outputs the resulting pictures to the screen rearrangement buffer 32 for storage.

In step S32, the screen rearrangement buffer 32 rearranges the stored pictures of frames arranged in display order to the encoding order in accordance with the GOP structure. The screen rearrangement buffer 32 supplies the rearranged frame-by-frame pictures to the computation unit 33, the intra prediction unit 46, and the motion prediction and compensation unit 47.

In step S33, the intra prediction unit 46 performs an intra prediction process for all the possible intra prediction modes. Further, the intra prediction unit 46 calculates cost function values for all the possible intra prediction modes in accordance with the pictures read from the screen rearrangement buffer 32 and a prediction picture generated as a result of the intra prediction process. Then, the intra prediction unit 46 determines the intra prediction mode for which the cost function value is minimum to be an optimum intra-prediction mode. The intra prediction unit 46 supplies a prediction picture generated in the optimum intra-prediction mode and the corresponding cost function value to the prediction picture selection unit 48.

Further, the motion prediction and compensation unit 47 performs a motion prediction and compensation process for all the possible inter prediction modes. Further, the motion prediction and compensation unit 47 calculates cost function values for all the possible inter prediction modes in accordance with the pictures supplied from the screen rearrangement buffer 32 and the prediction picture, and determines the inter prediction mode for which the cost function value is minimum to be an optimum inter-prediction mode. The motion prediction and compensation unit 47 supplies a prediction picture generated in the optimum inter-prediction mode and the corresponding cost function value to the prediction picture selection unit 48.

In step S34, the prediction picture selection unit 48 determines one of the optimum intra-prediction mode and the optimum inter-prediction mode having a smaller cost function value to be an optimum prediction mode in accordance with the cost function values supplied from the intra prediction unit 46 and the motion prediction and compensation unit 47 through the processing of step S33. Then, the prediction picture selection unit 48 supplies the prediction picture in the optimum prediction mode to the computation unit 33 and the adder unit 40.

In step S35, the prediction picture selection unit 48 determines whether or not the optimum prediction mode is an optimum inter-prediction mode. If it is determined in step S35 that the optimum prediction mode is an optimum inter-prediction mode, the prediction picture selection unit 48 informs the motion prediction and compensation unit 47 of the selection of the prediction picture generated in the optimum inter-prediction mode.

Then, in step S36, the motion prediction and compensation unit 47 supplies the inter-prediction mode information and the corresponding motion vectors to the lossless encoding unit 36. The motion prediction and compensation unit 47 supplies the reference picture specification information to the reference picture setting unit 49.

In step S37, the reference picture setting unit 49 performs an RPS index determination process for determining index of an RPS. The details of the RPS index determination process will be described with reference to FIG. 14 described below.

If it is determined in step S35 that the optimum prediction mode is not an optimum inter-prediction mode, that is, the optimum prediction mode is an optimum intra-prediction mode, the prediction picture selection unit 48 informs the intra prediction unit 46 of the selection of the prediction picture generated in the optimum intra-prediction mode. Then, in step S38, the intra prediction unit 46 supplies the intra-prediction mode information to the lossless encoding unit 36. Then, the process proceeds to step S39.

In step S39, the computation unit 33 performs encoding by subtracting the prediction picture supplied from the prediction picture selection unit 48 from a picture supplied from the screen rearrangement buffer 32. The computation unit 33 outputs the resultant picture to the orthogonal transform unit 34 as residual information.

In step S40, the orthogonal transform unit 34 performs an orthogonal transform on the residual information supplied from the computation unit 33 to obtain an orthogonal transform coefficient, and supplies the obtained orthogonal transform coefficient to the quantization unit 35.

In step S41, the quantization unit 35 quantizes the coefficient supplied from the orthogonal transform unit 34 using the quantization parameter supplied from the rate control unit 50. The quantized coefficient is input to the lossless encoding unit 36 and the dequantization unit 38.

Referring to FIG. 13, in step S42, the dequantization unit 38 dequantizes the quantized coefficient supplied from the quantization unit 35 using the quantization parameter supplied from the rate control unit 50 to obtain an orthogonal transform coefficient, and supplies the obtained orthogonal transform coefficient to the inverse orthogonal transform unit 39.

In step S43, the inverse orthogonal transform unit 39 performs an inverse orthogonal transform on the orthogonal transform coefficient supplied from the dequantization unit 38 to obtain residual information, and supplies the obtained residual information to the adder unit 40.

In step S44, the adder unit 40 adds the residual information supplied from the inverse orthogonal transform unit 39 and the prediction picture supplied from the prediction picture selection unit 48 to obtain a locally decoded picture. The adder unit 40 supplies the obtained picture to the deblocking filter 41 and also to the frame memory 44.

In step S45, the deblocking filter 41 performs a deblocking filtering process on the locally decoded picture supplied from the adder unit 40. The deblocking filter 41 supplies the picture obtained as a result of the deblocking filtering process to the adaptive offset filter 42.

In step S46, the adaptive offset filter 42 performs an adaptive offset filtering process on the picture supplied from the deblocking filter 41 on an LCU-by-LCU basis. The adaptive offset filter 42 supplies the picture obtained as a result of the adaptive offset filtering process to the adaptive loop filter 43. Further, the adaptive offset filter 42 supplies offset filter information including a storage flag, indices or offsets, and type information to the lossless encoding unit 36 on an LCU-by-LCU basis.

In step S47, the adaptive loop filter 43 performs an adaptive loop filtering process on the picture supplied from the adaptive offset filter 42 on an LCU-by-LCU basis. The adaptive loop filter 43 supplies the picture obtained as a result of the adaptive loop filtering process to the frame memory 44. The adaptive loop filter 43 further supplies the filter coefficient used in the adaptive loop filtering process to the lossless encoding unit 36.

In step S48, the frame memory 44 accumulates the picture supplied from the adaptive loop filter 43 and the picture supplied from the adder unit 40. The pictures accumulated in the frame memory 44 are output to the intra prediction unit 46 or the motion prediction and compensation unit 47 via the switch 45 as reference pictures.

In step S49, the lossless encoding unit 36 losslessly encodes, as coding information, the intra-prediction mode information or the inter-prediction mode information and the motion vectors, the indices of the RPSs or the RPSs and any other suitable data, the quantization parameter supplied from the rate control unit 50, the offset filter information, and the filter coefficient.

In step S50, the lossless encoding unit 36 losslessly encodes the quantized coefficient supplied from the quantization unit 35. Then, the lossless encoding unit 36 generates encoded data using the coding information losslessly encoded in the processing of step S49 and the losslessly encoded coefficient.

In step S51, the accumulation buffer 37 temporarily accumulates the encoded data supplied from the lossless encoding unit 36.

In step S52, the rate control unit 50 determines a quantization parameter to be used by the quantization unit 35 in accordance with the encoded data accumulated in the accumulation buffer 37 so that no overflow or underflow occurs. The rate control unit 50 supplies the determined quantization parameter to the quantization unit 35, the lossless encoding unit 36, and the dequantization unit 38.

In step S53, the accumulation buffer 37 outputs the stored encoded data to the setting unit 12 illustrated in FIG. 3.

In the encoding process illustrated in FIGS. 12 and 13, for simplicity of description, an intra prediction process and a motion prediction and compensation process are performed. In actuality, however, one of the processes may be performed in accordance with the picture type and the like.

Figure 14:
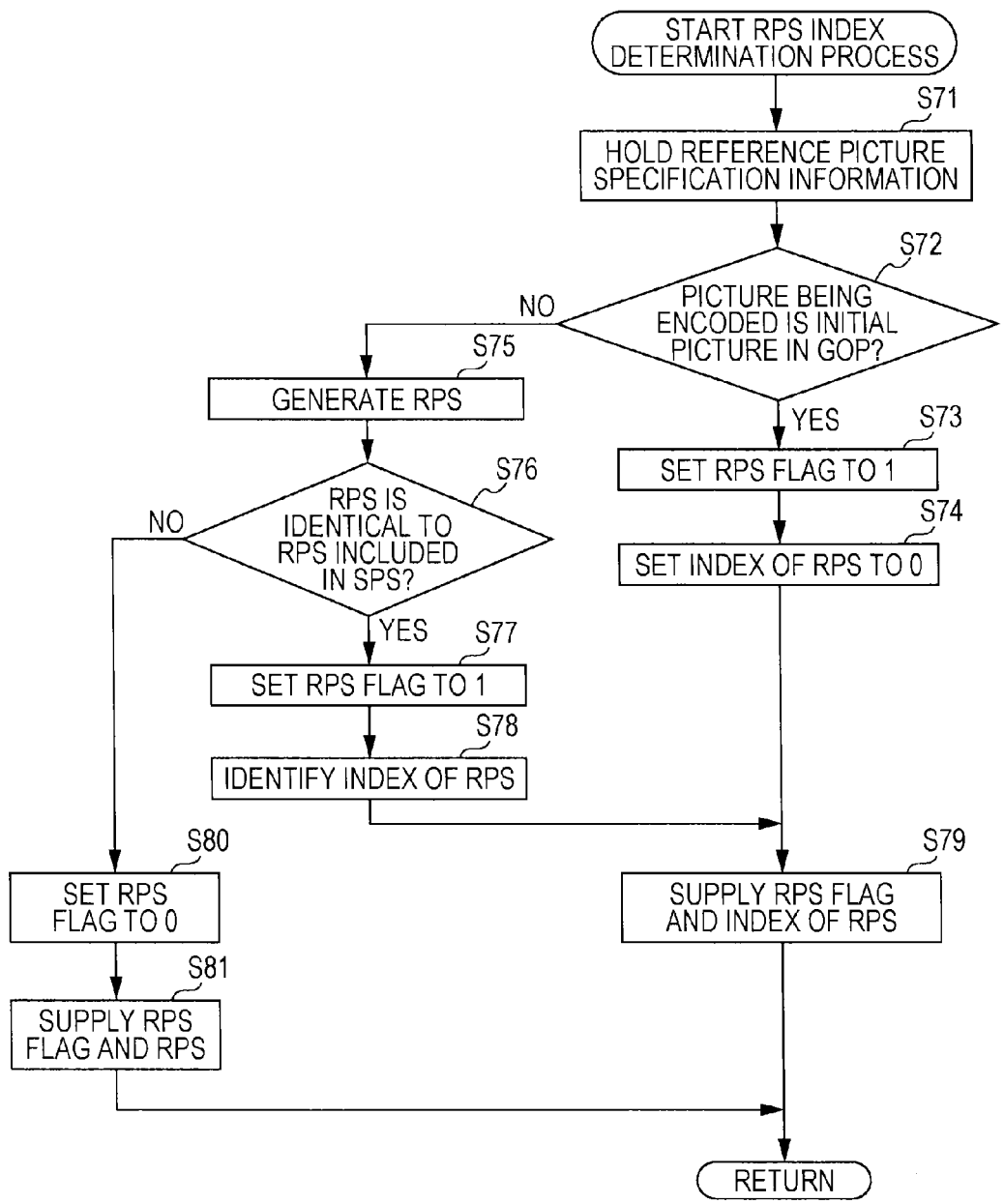
FIG. 14 is a flowchart depicting the details of an RPS index determination process illustrated in FIG. 12.

FIG. 14 is a flowchart depicting the details of the RPS index determination process in step S37 in FIG. 12.

Referring to FIG. 14, in step S71, the reference picture setting unit 49 holds the reference picture specification information supplied from the motion prediction and compensation unit 47, the amount of which corresponds to the GOP. In step S72, the reference picture setting unit 49 determines whether or not the picture being encoded is an initial picture in the GOP.

If it is determined in step S72 that the picture being encoded is an initial picture in the GOP, in step S73, the reference picture setting unit 49 sets the RPS flag to 1. In step S74, the reference picture setting unit 49 sets the index of the RPS to 0. Then, the process proceeds to step S79.

If it is determined in step S72 that the picture being encoded is a picture other than the initial picture in the GOP, in step S75, the reference picture setting unit 49 generates the RPS of the picture being encoded.

Specifically, the reference picture setting unit 49 determines whether or not the held reference picture specification information for the preceding picture is identical to the reference picture specification information for the picture being encoded. If it is determined that the held reference picture specification information for the preceding picture is identical to the reference picture specification information for the picture being encoded, the reference picture setting unit 49 generates an RPS of the picture being encoded which includes the value 1 for inter_ref_pic_set_prediction_flag and includes delta_idx_minus1.

If it is determined that the held reference picture specification information for the preceding picture is not identical to the reference picture specification information for the picture being encoded, the reference picture setting unit 49 generates an RPS of the picture being encoded which includes the value 0 for inter_ref_pic_set_prediction_flag.

In step S76, the reference picture setting unit 49 determines whether or not the RPS of the picture being encoded is identical to an RPS included in the SPS supplied from the setting unit 12. If it is determined in step S76 that the RPS of the picture being encoded is identical to an RPS included in the SPS, in step S77, the reference picture setting unit 49 sets the RPS flag to 1.

In step S78, the reference picture setting unit 49 identifies the index i of an RPS included in the same SPS as the SPS including the RPS of the picture being encoded. Then, the process proceeds to step S79. In step S79, the reference picture setting unit 49 supplies the RPS flag set in step S73 or S77 and the index of the RPS set in step S74 or the index of the RPS identified in step S78 to the lossless encoding unit 36. Then, the process returns to step S37 in FIG. 12, and proceeds to step S39.

If it is determined in step S76 that the RPS of the picture being encoded is not identical to an RPS included in the SPS, in step S80, the reference picture setting unit 49 sets the RPS flag to 0. In step S81, the reference picture setting unit 49 supplies the RPS flag set in step S80 and the RPS generated in step S75 to the lossless encoding unit 36. Then, the process returns to step S37 in FIG. 12, and proceeds to step S39.

Accordingly, if the picture being encoded is an image other than the initial picture in the GOP, the encoding apparatus 10 transmits inter_ref_pic_set_prediction_flag. That is, the encoding apparatus 10 does not transmit inter_ref_pic_set_prediction_flag if the picture being encoded is the initial picture in the GOP. Therefore, the amount of information of an RPS concerning reference picture specification information can be reduced by an amount corresponding to the inter_ref_pic_set_prediction_flag of the initial picture in the GOP.

Example Configuration of Decoding Apparatus According to First Embodiment

Figure 15:
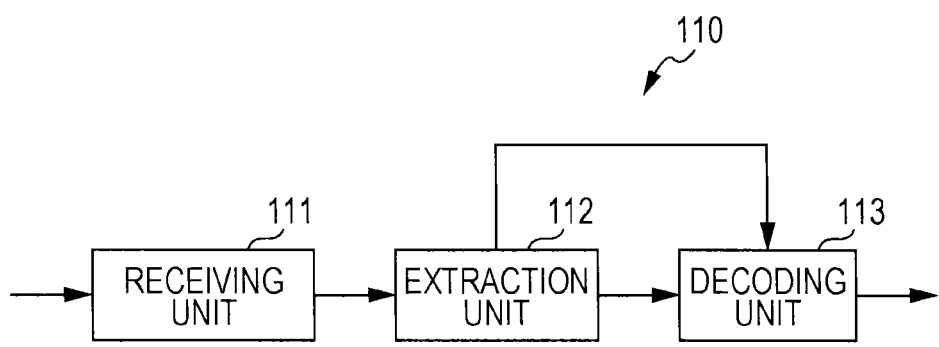
FIG. 15 is a block diagram illustrating an example configuration of a decoding apparatus according to a first embodiment of the present technology.

FIG. 15 is a block diagram illustrating an example configuration of a decoding apparatus according to the first embodiment of the present technology, which is configured to decode an encoded stream transmitted from the encoding apparatus 10 illustrated in FIG. 3.

Referring to FIG. 15, the decoding apparatus 110 includes a receiving unit 111, an extraction unit 112, and a decoding unit 113.

The receiving unit 111 of the decoding apparatus 110 receives an encoded stream transmitted from the encoding apparatus 10 illustrated in FIG. 3, and supplies the encoded stream to the extraction unit 112.

The extraction unit 112 extracts an SPS, a PPS, encoded data, and the like from the encoded stream supplied from the receiving unit 111. The extraction unit 112 supplies the encoded data to the decoding unit 113. Further, the extraction unit 112 acquires inter_ref_pic_set_prediction_flag and delta_idx_minus1 or reference picture specification information in each RPS in accordance with the SPS, and supplies the acquired information to the decoding unit 113. The extraction unit 112 also supplies the information other than RPSs included in the SPS, the PPS, and the like to the decoding unit 113, if necessary.

The decoding unit 113 decodes the encoded data supplied from the extraction unit 112 using the HEVC scheme in accordance with inter_ref_pic_set_prediction_flag and delta_idx_minus1 or reference picture specification information in each RPS supplied from the extraction unit 112. In this case, the decoding unit 113 also refers to the information other than the RPSs included in the SPS, the PPS, and the like, if necessary. The decoding unit 113 outputs a picture obtained as a result of decoding as an output signal.

Example Configuration of Decoding Unit

Figure 16:
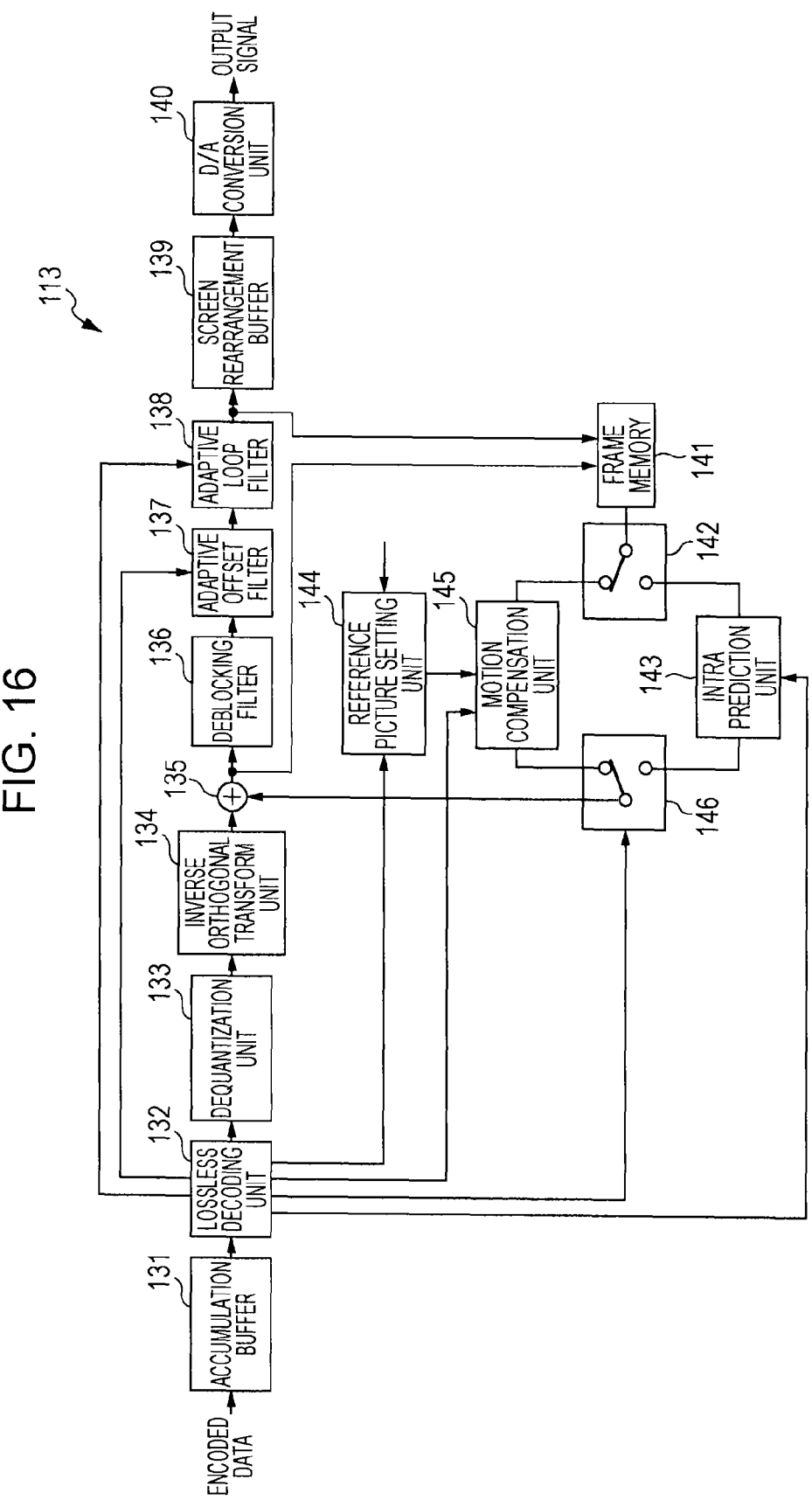
FIG. 16 is a block diagram illustrating an example configuration of a decoding unit illustrated in FIG. 15.

FIG. 16 is a block diagram illustrating an example configuration of the decoding unit 113 illustrated in FIG. 15.

Referring to FIG. 16, the decoding unit 113 includes an accumulation buffer 131, a lossless decoding unit 132, a dequantization unit 133, an inverse orthogonal transform unit 134, an adder unit 135, a deblocking filter 136, an adaptive offset filter 137, an adaptive loop filter 138, a screen rearrangement buffer 139, a digital-to-analog (D/A) conversion unit 140, a frame memory 141, a switch 142, an intra prediction unit 143, a reference picture setting unit 144, a motion compensation unit 145, and a switch 146.

The accumulation buffer 131 of the decoding unit 113 receives encoded data from the extraction unit 112 illustrated in FIG. 15, and accumulates the encoded data. The accumulation buffer 131 supplies the accumulated encoded data to the lossless decoding unit 132.

The lossless decoding unit 132 losslessly decodes the encoded data supplied from the accumulation buffer 131 using variable-length decoding, arithmetic decoding, or the like to obtain a quantized coefficient and coding information. The lossless decoding unit 132 supplies the quantized coefficient to the dequantization unit 133. Further, the lossless decoding unit 132 supplies, as the coding information, intra-prediction mode information and any other suitable data to the intra prediction unit 143 and supplies, as the coding information, motion vectors, inter-prediction mode information, and any other suitable data to the motion compensation unit 145. The lossless decoding unit 132 further supplies, as the coding information, the RPS flags and the indices of the RPSs or the RPSs to the reference picture setting unit 144.

Further, the lossless decoding unit 132 supplies, as the coding information, intra-prediction mode information or inter-prediction mode information to the switch 146. The lossless decoding unit 132 supplies, as the coding information, offset filter information to the adaptive offset filter 137, and supplies, as the coding information, a filter coefficient to the adaptive loop filter 138.

The dequantization unit 133, the inverse orthogonal transform unit 134, the adder unit 135, the deblocking filter 136, the adaptive offset filter 137, the adaptive loop filter 138, the frame memory 141, the switch 142, the intra prediction unit 143, and the motion compensation unit 145 perform processes similar to those of the dequantization unit 38, the inverse orthogonal transform unit 39, the adder unit 40, the deblocking filter 41, the adaptive offset filter 42, the adaptive loop filter 43, the frame memory 44, the switch 45, the intra prediction unit 46, and the motion prediction and compensation unit 47 illustrated in FIG. 4, respectively. Therefore, pictures are decoded.

Specifically, the dequantization unit 133 dequantizes the quantized coefficient supplied from the lossless decoding unit 132 to obtain an orthogonal transform coefficient, and supplies the obtained orthogonal transform coefficient to the inverse orthogonal transform unit 134.

The inverse orthogonal transform unit 134 performs an inverse orthogonal transform on the orthogonal transform coefficient supplied from the dequantization unit 133. The inverse orthogonal transform unit 134 supplies residual information obtained as a result of the inverse orthogonal transform to the adder unit 135.

The adder unit 135 functions as a decoding unit, and performs decoding by adding the residual information as the picture being decoded, which is supplied from the inverse orthogonal transform unit 134, and the prediction picture supplied from the switch 146. The adder unit 135 supplies a picture obtained as a result of decoding to the deblocking filter 136 and also to the frame memory 141. If no prediction picture is supplied from the switch 146, the adder unit 135 supplies the picture, which is the residual information supplied from the inverse orthogonal transform unit 134, as a picture obtained as a result of decoding, to the deblocking filter 136 and to the frame memory 141 for accumulation.

The deblocking filter 136 performs an adaptive deblocking filtering process on the picture supplied from the adder unit 135, and supplies the resultant picture to the adaptive offset filter 137.

The adaptive offset filter 137 has a buffer for storing offsets supplied from the lossless decoding unit 132 in order. Further, the adaptive offset filter 137 performs an adaptive offset filtering process on the picture subjected to the adaptive deblocking filtering process by the deblocking filter 136 in accordance with the offset filter information supplied from the lossless decoding unit 132 on an LCU-by-LCU basis.

Specifically, if the storage flag included in the offset filter information is equal to 0, the adaptive offset filter 137 performs the adaptive offset filtering process of the type specified by the type information on the picture subjected to the LCU-by-LCU deblocking filtering process using the offsets included in the offset filter information.

If the storage flag included in the offset filter information is equal to 1, the adaptive offset filter 137 reads the offsets stored at the positions indicated by the indices included in the offset filter information from the picture subjected to the LCU-by-LCU deblocking filtering process. Then, the adaptive offset filter 137 performs the adaptive offset filtering process of the type specified by the type information using the read offsets. The adaptive offset filter 137 supplies the picture subjected to the adaptive offset filtering process to the adaptive loop filter 138.

The adaptive loop filter 138 performs an adaptive loop filtering process on the picture supplied from the adaptive offset filter 137 using the filter coefficient supplied from the lossless decoding unit 132 on an LCU-by-LCU basis. The adaptive loop filter 138 supplies the picture obtained as a result of the adaptive loop filtering process to the frame memory 141 and the screen rearrangement buffer 139.

The screen rearrangement buffer 139 stores pictures supplied from the adaptive loop filter 138 in units of frames. The screen rearrangement buffer 139 rearranges the stored frame-by-frame pictures, which are arranged in encoding order, to the original display order, and supplies the rearranged pictures to the D/A conversion unit 140.

The D/A conversion unit 140 performs D/A conversion on the frame-by-frame pictures supplied from the screen rearrangement buffer 139, and outputs the resulting pictures as output signals. The frame memory 141 accumulates the picture supplied from the adaptive loop filter 138 and the picture supplied from the adder unit 135. The pictures accumulated in the frame memory 141 are read as reference pictures, and are supplied to the motion compensation unit 145 or the intra prediction unit 143 via the switch 142.

The intra prediction unit 143 performs an intra prediction process for the intra prediction mode indicated by the intra-prediction mode information supplied from the lossless decoding unit 132 using the reference picture read from the frame memory 141 via the switch 142. The intra prediction unit 143 supplies a prediction picture generated as a result of the intra prediction process to the switch 146.

The reference picture setting unit 144 holds, as RPS information, inter_ref_pic_set_prediction_flag and delta_idx_minus1 or reference picture specification information in each RPS supplied from the extraction unit 112 illustrated in FIG. 15. Further, the reference picture setting unit 144 generates reference picture specification information for the picture being decoded in accordance with the RPS flags, the indices of the RPSs or the RPSs, and RPS information on each RPS, which are supplied from the lossless decoding unit 132. The reference picture setting unit 144 supplies the generated reference picture specification information to the motion compensation unit 145, and also holds it.

The motion compensation unit 145 reads a reference picture specified by the reference picture specification information from the frame memory 141 via the switch 142 in accordance with the reference picture specification information supplied from the reference picture setting unit 144. The motion compensation unit 145 functions as a prediction picture generation unit, and performs a motion compensation process for an optimum inter-prediction mode indicated by the inter-prediction mode information using the motion vectors and the reference picture. The motion compensation unit 145 supplies a prediction picture generated as a result of the motion compensation process to the switch 146.

In a case where intra-prediction mode information is supplied from the lossless decoding unit 132, the switch 146 supplies the prediction picture supplied from the intra prediction unit 143 to the adder unit 135. In a case where inter-prediction mode information is supplied from the lossless decoding unit 132, the switch 146 supplies the prediction picture supplied from the motion compensation unit 145 to the adder unit 135.

Process of Decoding Apparatus

Figure 17:
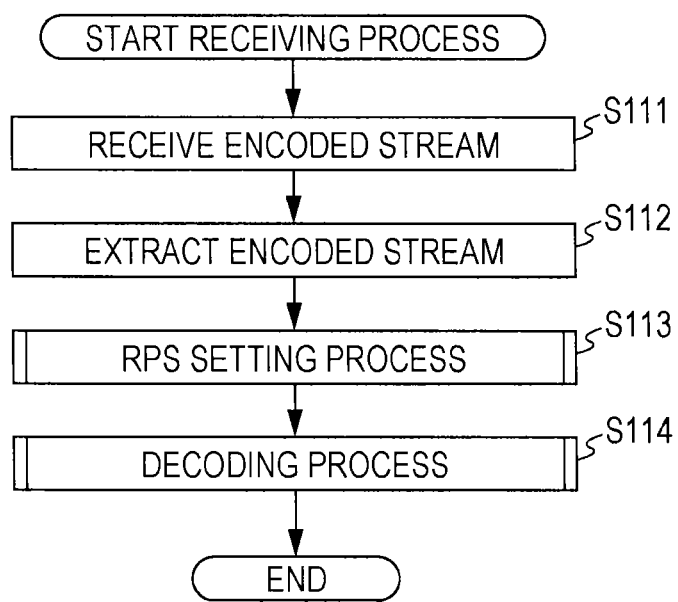
FIG. 17 is a flowchart depicting a receiving process performed by the decoding apparatus illustrated in FIG. 15.

FIG. 17 is a flowchart depicting a receiving process performed by the decoding apparatus 110 illustrated in FIG. 15.

Referring to FIG. 17, in step S111, the receiving unit 111 of the decoding apparatus 110 receives an encoded stream transmitted from the encoding apparatus 10 illustrated in FIG. 3, and supplies the encoded stream to the extraction unit 112.

In step S112, the extraction unit 112 extracts an SPS, a PPS, encoded data, and the like from the encoded stream supplied from the receiving unit 111. The extraction unit 112 supplies the encoded data to the decoding unit 113. The extraction unit 112 further supplies the information other than RPSs included in the SPS, the PPS, and the like to the decoding unit 113, if necessary.

In step S113, the extraction unit 112 acquires inter_ref_pic_set_prediction_flag and delta_idx_minus1 or reference picture specification information in each RPS as RPS information in accordance with the SPS, and supplies the acquired information to the decoding unit 113.

In step S114, the decoding unit 113 performs a decoding process for decoding the encoded data supplied from the extraction unit 112 using the HEVC scheme in accordance with the RPS information on each RPS supplied from the extraction unit 112. The details of the decoding process will be described with reference to FIG. 19 described below. Then, the process ends.

Figure 18:
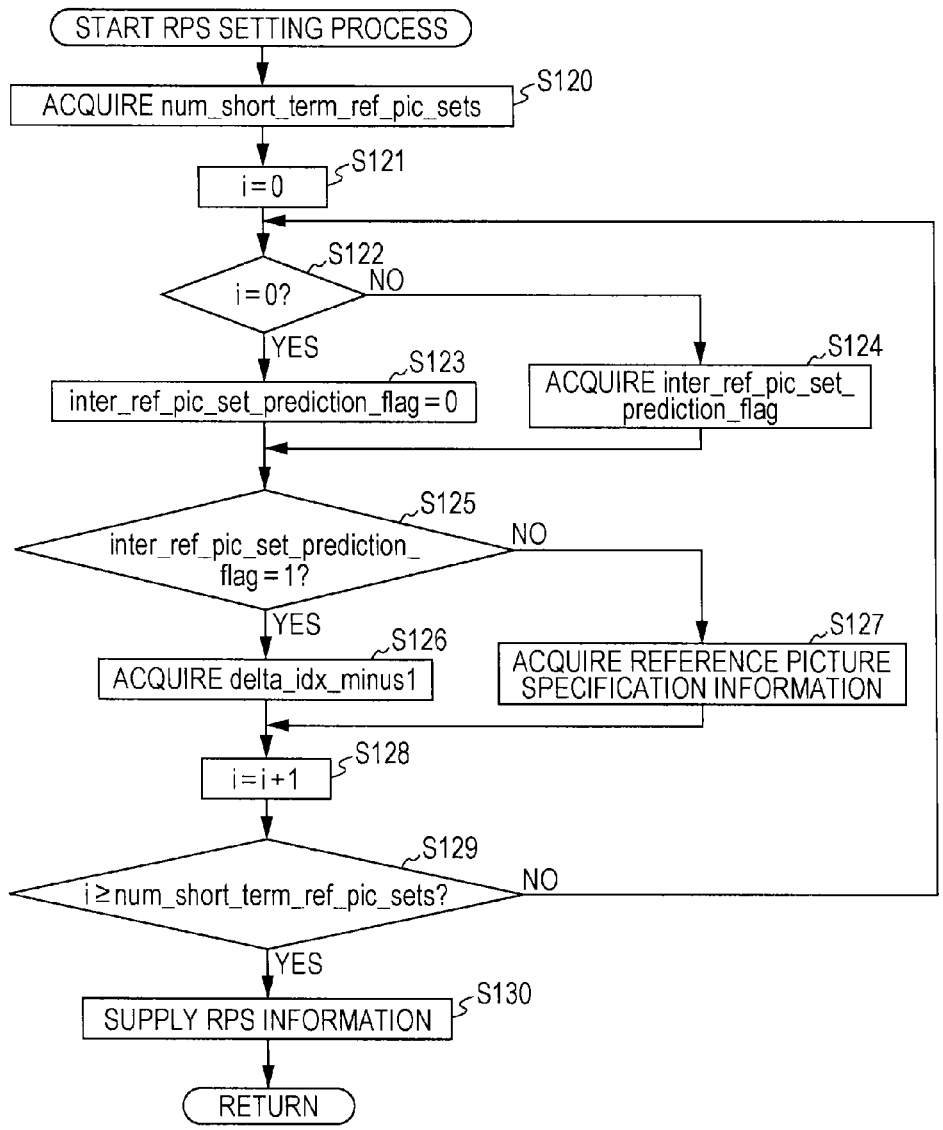
FIG. 18 is a flowchart depicting the details of an RPS setting process illustrated in FIG. 17.

FIG. 18 is a flowchart depicting the details of the RPS setting process in step S113 in FIG. 17.

Referring to FIG. 18, in step S120, the extraction unit 112 acquires num_short_term_ref_pic_sets included in the SPS (FIG. 5). In step S121, the extraction unit 112 sets the index i of the RPS corresponding to the RPS information to be generated to 0. In step S122, the extraction unit 112 determines whether or not the index i of the RPS is equal to 0.

If it is determined in step S122 that the index i is equal to 0, in step S123, the extraction unit 112 sets inter_ref_pic_set_prediction_flag included in the RPS information on the RPS having the index i to 0. Then, the process proceeds to step S125.

If it is determined in step S122 that the index i is not equal to 0, in step S124, the extraction unit 112 acquires inter_ref_pic_set_prediction_flag included in the RPS having the index i included in the SPS. Then, the extraction unit 112 sets the acquired inter_ref_pic_set_prediction_flag as inter_ref_pic_set_prediction_flag included in the RPS information on the RPS having the index i. Then, the process proceeds to step S125.

In step S125, the extraction unit 112 determines whether or not the inter_ref_pic_set_prediction_flag is equal to 1. If it is determined in step S125 that the inter_ref_pic_set_prediction_flag is equal to 1, in step S126, the extraction unit 112 acquires delta_idx_minus1 included in the RPS having the index i included in the SPS. Then, the extraction unit 112 sets the acquired delta_idx_minus1 as delta_idx_minus1 included the in the RPS information on the RPS having the index i. Then, the process proceeds to step S128.

If it is determined in step S125 that the inter_ref_pic_set_prediction_flag is not equal to 1, in step S127, the extraction unit 112 acquires the reference picture specification information included in the RPS having the index i included in the SPS. Then, the extraction unit 112 sets the acquired reference picture specification information as reference picture specification information included in the RPS information on the RPS having the index i. Then, the process proceeds to step S128.

In step S128, the extraction unit 112 increments the index i by 1. In step S129, the extraction unit 112 determines whether or not the index i is greater than or equal to the num_short_term_ref_pic_sets acquired in step S120.

If it is determined in step S129 that the index i is not greater than or equal to the num_short_term_ref_pic_sets, the process returns to step S122, and the processing of steps S122 to S129 is repeatedly performed until the index i becomes greater than or equal to the num_short_term_ref_pic_sets.

If it is determined in step S129 that the index i is greater than or equal to the num_short_term_ref_pic_sets, in step S130, the extraction unit 112 supplies the RPS information on set RPSs, the number of which is equal to the num_short_term_ref_pic_sets. Then, the process returns to step S113 in FIG. 17, and proceeds to step S114.

Figure 19:
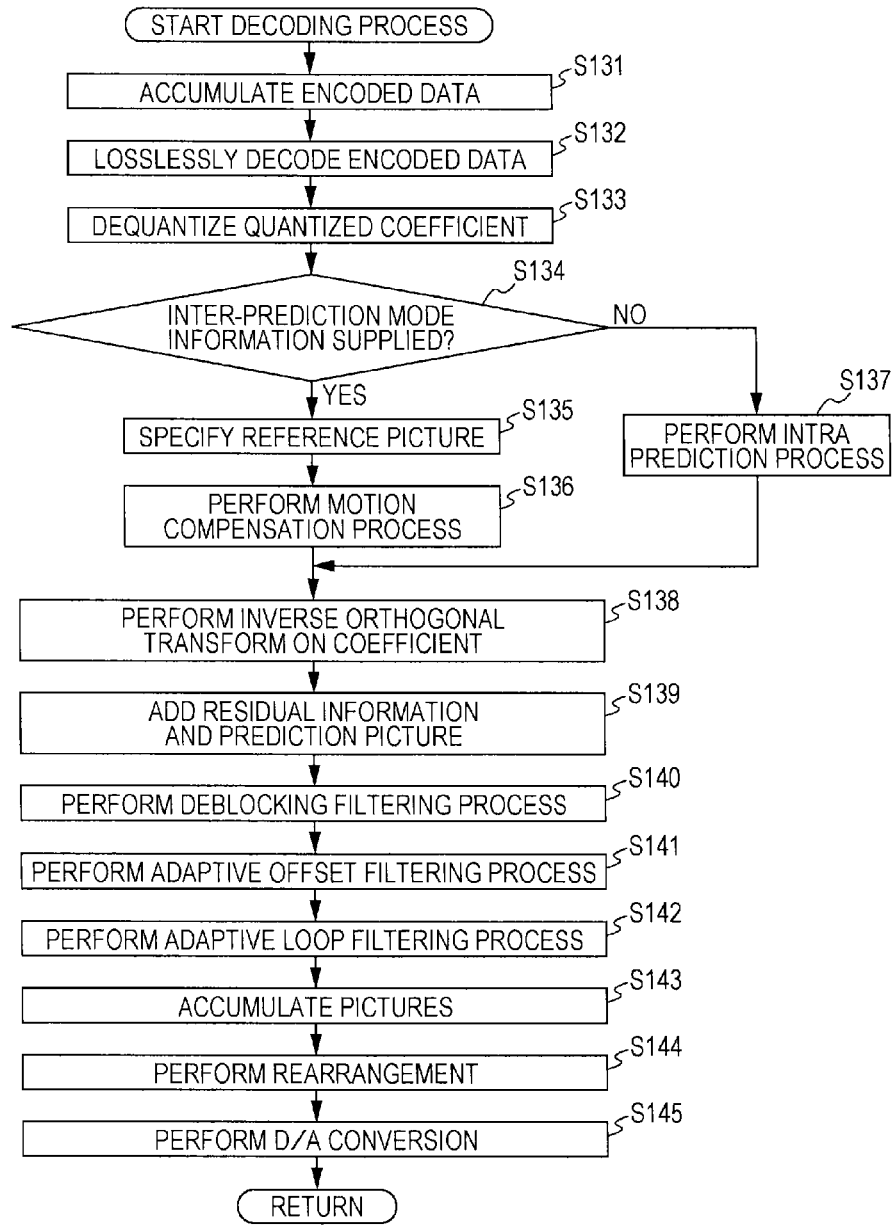
FIG. 19 is a flowchart depicting the details of a decoding process illustrated in FIG. 17.

FIG. 19 is a flowchart depicting the details of the decoding process in step S114 in FIG. 17.

Referring to FIG. 19, in step S131, the accumulation buffer 131 of the decoding unit 113 receives frame-by-frame encoded data from the extraction unit 112 illustrated in FIG. 15, and accumulates the encoded data. The accumulation buffer 131 supplies the accumulated encoded data to the lossless decoding unit 132.

In step S132, the lossless decoding unit 132 losslessly decodes the encoded data supplied from the accumulation buffer 131 to obtain a quantized coefficient and coding information. The lossless decoding unit 132 supplies the quantized coefficient to the dequantization unit 133. Further, the lossless decoding unit 132 supplies, as the coding information, intra-prediction mode information and any other suitable data to the intra prediction unit 143, and supplies, as the coding information, motion vectors, inter-prediction mode information, RPS flags, the indices of the RPSs or the RPSs, and any other suitable data to the motion compensation unit 145.

Further, the lossless decoding unit 132 supplies, as the coding information, intra-prediction mode information or inter-prediction mode information to the switch 146. The lossless decoding unit 132 supplies, as the coding information, offset filter information to the adaptive offset filter 137, and supplies, as the coding information, a filter coefficient to the adaptive loop filter 138.

In step S133, the dequantization unit 133 dequantizes the quantized coefficient supplied from the lossless decoding unit 132 to obtain an orthogonal transform coefficient, and supplies the obtained orthogonal transform coefficient to the inverse orthogonal transform unit 134.

In step S134, the motion compensation unit 145 determines whether or not inter-prediction mode information has been supplied from the lossless decoding unit 132. If it is determined in step S134 that inter-prediction mode information has been supplied, the process proceeds to step S135.

In step S135, the reference picture setting unit 144 generates reference picture specification information for the picture being decoded in accordance with the RPS information on each RPS supplied from the extraction unit 112 and the RPS flags and the indices of the RPSs or the RPSs supplied from the lossless decoding unit 132, and holds the generated reference picture specification information.

Specifically, the reference picture setting unit 144 holds the RPS information on each RPS supplied from the extraction unit 112. If the RPS flag is equal to 0, the reference picture setting unit 144 reads RPS information on the indices of the RPSs in the held RPS information. If the inter_ref_pic_set_prediction_flag included in the read RPS information is equal to 0, the reference picture setting unit 144 uses the reference picture specification information included in the RPS information as reference picture specification information for the picture being decoded to generate the reference picture specification information for the picture being decoded, and holds the generated reference picture specification information.

If the inter_ref_pic_set_prediction_flag is equal to 1, the reference picture setting unit 144 reads from the held reference picture specification information the reference picture specification information for the preceding picture that is specified by the delta_idx_minus1 included in the RPS information. Then, the reference picture setting unit 144 uses the read reference picture specification information for the preceding picture as reference picture specification information for the picture being decoded to generate the reference picture specification information for the picture being decoded, and holds the generated reference picture specification information.

Further, if the RPS flag is equal to 0 and the inter_ref_pic_set_prediction_flag included in the RPS supplied from the lossless decoding unit 132 together with the RPS flag is equal to 0, the reference picture setting unit 144 uses reference picture specification information included in the RPS as reference picture specification information for the picture being decoded to generate the reference picture specification information for the picture being decoded, and holds the generated reference picture specification information. In contrast, if the inter_ref_pic_set_prediction_flag is equal to 1, the reference picture setting unit 144 reads from the held reference picture specification information the reference picture specification information for the preceding picture that is specified by the delta_idx_minus1 included in the RPS. Then, the reference picture setting unit 144 uses the read reference picture specification information for the preceding picture as reference picture specification information for the picture being decoded to generate the reference picture specification information for the picture being decoded, and holds the generated reference picture specification information.

In step S136, the motion compensation unit 145 reads a reference picture in accordance with the reference picture specification information supplied from the reference picture setting unit 144, and performs a motion compensation process for the optimum inter-prediction mode indicated by the inter-prediction mode information using the motion vectors and the reference picture. The motion compensation unit 145 supplies a prediction picture generated as a result of the motion compensation process to the adder unit 135 via the switch 146. Then, the process proceeds to step S138.

If it is determined in step S134 that no inter-prediction mode information has been supplied, that is, intra-prediction mode information has been supplied, to the intra prediction unit 143, the process proceeds to step S137.

In step S137, the intra prediction unit 143 performs an intra prediction process for the intra prediction mode indicated by the intra-prediction mode information using the reference picture read from the frame memory 141 via the switch 142. The intra prediction unit 143 supplies a prediction picture generated as a result of the intra prediction process to the adder unit 135 via the switch 146. Then, the process proceeds to step S138.

In step S138, the inverse orthogonal transform unit 134 performs an inverse orthogonal transform on the orthogonal transform coefficient supplied from the dequantization unit 133 to obtain residual information, and supplies the obtained residual information to the adder unit 135.

In step S139, the adder unit 135 adds the residual information supplied from the inverse orthogonal transform unit 134 and the prediction picture supplied from the switch 146. The adder unit 135 supplies the picture obtained as a result of the addition to the deblocking filter 136 and also to the frame memory 141.

In step S140, the deblocking filter 136 performs a deblocking filtering process on the picture supplied from the adder unit 135 to remove block distortion. The deblocking filter 136 supplies the picture obtained as a result of the deblocking filtering process to the adaptive offset filter 137.

In step S141, the adaptive offset filter 137 performs an adaptive offset filtering process on the picture subjected to the deblocking filtering process by the deblocking filter 136, in accordance with the offset filter information supplied from the lossless decoding unit 132 on an LCU-by-LCU basis. The adaptive offset filter 137 supplies the picture subjected to the adaptive offset filtering process to the adaptive loop filter 138.

In step S142, the adaptive loop filter 138 performs an adaptive loop filtering process on the picture supplied from the adaptive offset filter 137 using the filter coefficient supplied from the lossless decoding unit 132 on an LCU-by-LCU basis. The adaptive loop filter 138 supplies the picture obtained as a result of the adaptive loop filtering process to the frame memory 141 and the screen rearrangement buffer 139.

In step S143, the frame memory 141 accumulates the picture supplied from the adder unit 135 and the picture supplied from the adaptive loop filter 138. The pictures accumulated in the frame memory 141 are supplied to the motion compensation unit 145 or the intra prediction unit 143 via the switch 142 as reference pictures.

In step S144, the screen rearrangement buffer 139 stores pictures supplied from the adaptive loop filter 138 in units of frames. The screen rearrangement buffer 139 rearranges the stored frame-by-frame pictures, which are arranged in encoding order, to the original display order, and supplies the resulting pictures to the D/A conversion unit 140.

In step S145, the D/A conversion unit 140 performs D/A conversion on the frame-by-frame pictures supplied from the screen rearrangement buffer 139, and outputs the resulting pictures as output signals. Then, the process returns to step S114 in FIG. 17, and ends.

Accordingly, the decoding apparatus 110 receives inter_ref_pic_set_prediction_flag, which is transmitted in a case where the picture being encoded is a picture other than the initial picture in a GOP. Upon receiving inter_ref_pic_set_prediction_flag, the decoding apparatus 110 generates reference picture specification information for the picture being decoded in accordance with the inter_ref_pic_set_prediction_flag. In a case where the decoding apparatus 110 does not receive inter_ref_pic_set_prediction_flag, the decoding apparatus 110 generates reference picture specification information for the picture being decoded in accordance with the value 0 for inter_ref_pic_set_prediction_flag.

As a result, the decoding apparatus 110 can decode an encoded stream with the amount of information on an RPS being reduced by an amount corresponding to the inter_ref_pic_set_prediction_flag of the initial picture in a GOP.

Figure 20:
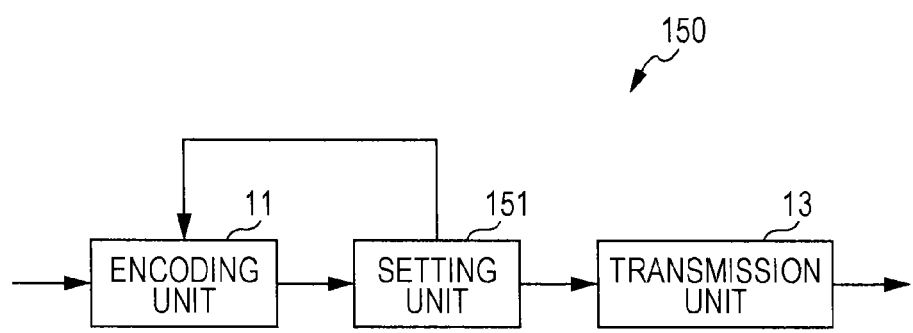
FIG. 20 is a block diagram illustrating an example configuration of an encoding apparatus according to a second embodiment of the present technology.

Second Embodiment
Example Configuration of Encoding Apparatus According to Second Embodiment FIG. 20 is a block diagram illustrating an example configuration of an encoding apparatus 150 according to a second embodiment of the present technology.

Of the components illustrated in FIG. 20, substantially the same components as those in FIG. 3 are identified using the same reference numerals, and will not be described to avoid redundancy.

The configuration of the encoding apparatus 150 illustrated in FIG. 20 is different from the configuration of the encoding apparatus 10 illustrated in FIG. 3 in that a setting unit 151 is provided in place of the setting unit 12. The encoding apparatus 150 sets an SPS so that inter_ref_pic_set_prediction_flag and delta_idx_minus1 can be shared in units of GOPs.

Specifically, the setting unit 151 sets an RPS including inter_ref_pic_set_prediction_flag, delta_idx_minus1, reference picture specification information, and any other necessary data, if any, and assigns indices to individual RPSs. The setting unit 151 supplies the RPSs that are assigned the indices to the encoding unit 11. The setting unit 151 further sets an SPS including an RPS and reference disablement information indicating whether the inter_ref_pic_set_prediction_flag is equal to 0 for all the pictures in a GOP and also including, if necessary, delta_idx_minus1, which is common to all the pictures in the GOP. The setting unit 151 sets a PPS and the like.

Further, similarly to the setting unit 12 illustrated in FIG. 3, the setting unit 151 generates an encoded stream using the set SPS and PPS and the encoded data supplied from the encoding unit 11. Similarly to the setting unit 12, the setting unit 151 supplies the encoded stream to the transmission unit 13.

Example of Syntax of SPS
FIG. 21 is a diagram illustrating an example of the syntax of the SPS set by the setting unit 151 illustrated in FIG. 20.

As given in the fourth line in FIG. 21, the SPS includes reference disablement information (disable_rps_prediction_flag). Further, as given in the fifth and sixth lines, in a case where the reference disablement information is equal to 0, which does not indicate that the inter_ref_pic_set_prediction_flag is equal to 0 for all the pictures in the GOP, the SPS includes identicalness information (unified_rps_prediction_control_present_flag) indicating whether delta_idx_minus1 is identical for all the pictures in the GOP.

Further, as given in the seventh and eighth lines, in a case where the identicalness information is equal to 1, which indicates that delta_idx_minus1 is identical for all the pictures in the GOP, the SPS includes unified_delta_idx_minus1, which is delta_idx_minus1 common to all the pictures in the GOP. Further, as given in the eleventh line, the SPS includes an RPS having an individual index (i).

Example of Syntax of RPS
FIG. 22 is a diagram illustrating an example of the syntax of an RPS.

Although not illustrated in FIG. 22, the description of the lines after the tenth line is similar to the description of the lines after the fourth line in FIG. 1.

As given in the second and third lines in FIG. 22, in a case where the disable_rps_prediction_flag is equal to 1, the RPS does not include inter_ref_pic_set_prediction_flag, but includes reference picture specification information which is included when the inter_ref_pic_set_prediction_flag is equal to 0.

In contrast, as given in the fourth and fifth lines, in a case where the disable_rps_prediction_flag is equal to 0, the RPS includes inter_ref_pic_set_prediction_flag. Further, as given in the sixth to eighth lines, in a case where the inter_ref_pic_set_prediction_flag is equal to 1 and the unified_rps_prediction_control_present_flag is equal to 1, the RPS does not include delta_idx_minus1, and includes unified_delta_idx_minus1 instead of delta_idx_minus1.

Further, as given in the ninth and tenth lines, in a case where the inter_ref_pic_set_prediction_flag is equal to 1 and the unified_rps_prediction_control_present_flag is equal to 0, the RPS includes delta_idx_minus1.

Advantages of Embodiment of Present Technology

Figure 23:
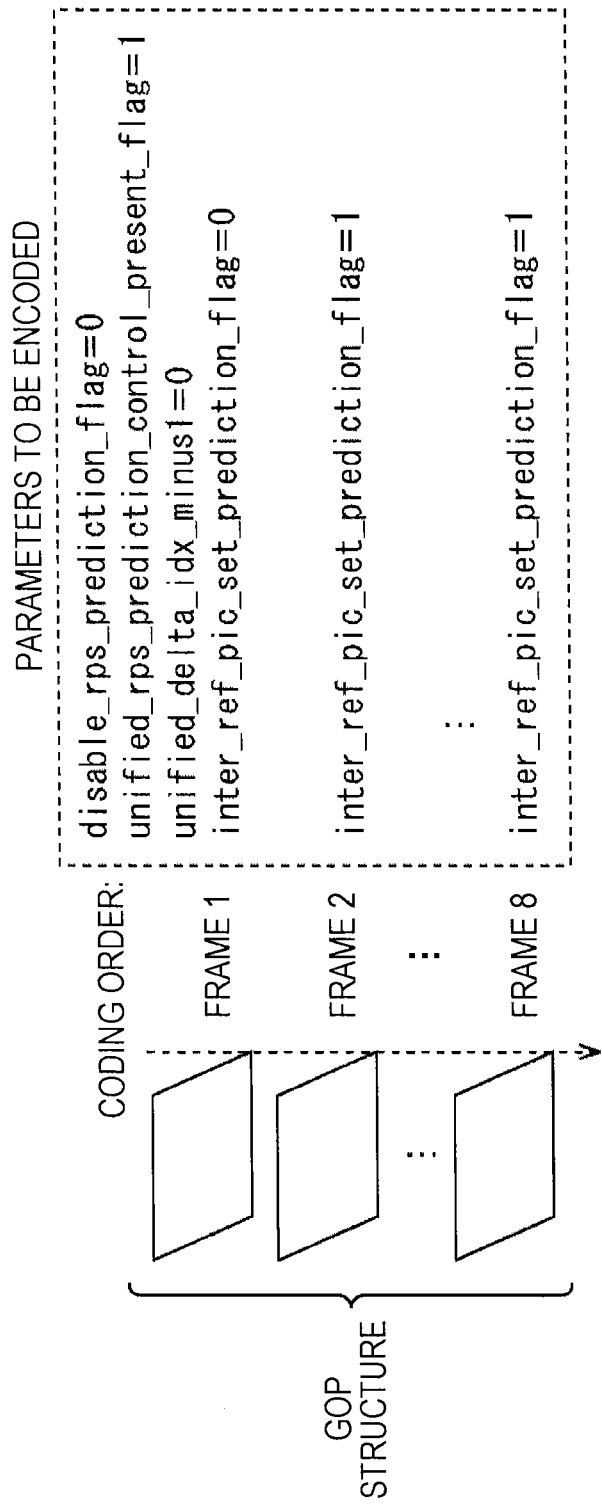
FIG. 23 is a diagram illustrating the amount of information of an RPS set by the setting unit illustrated in FIG. 20.
Figure 24:
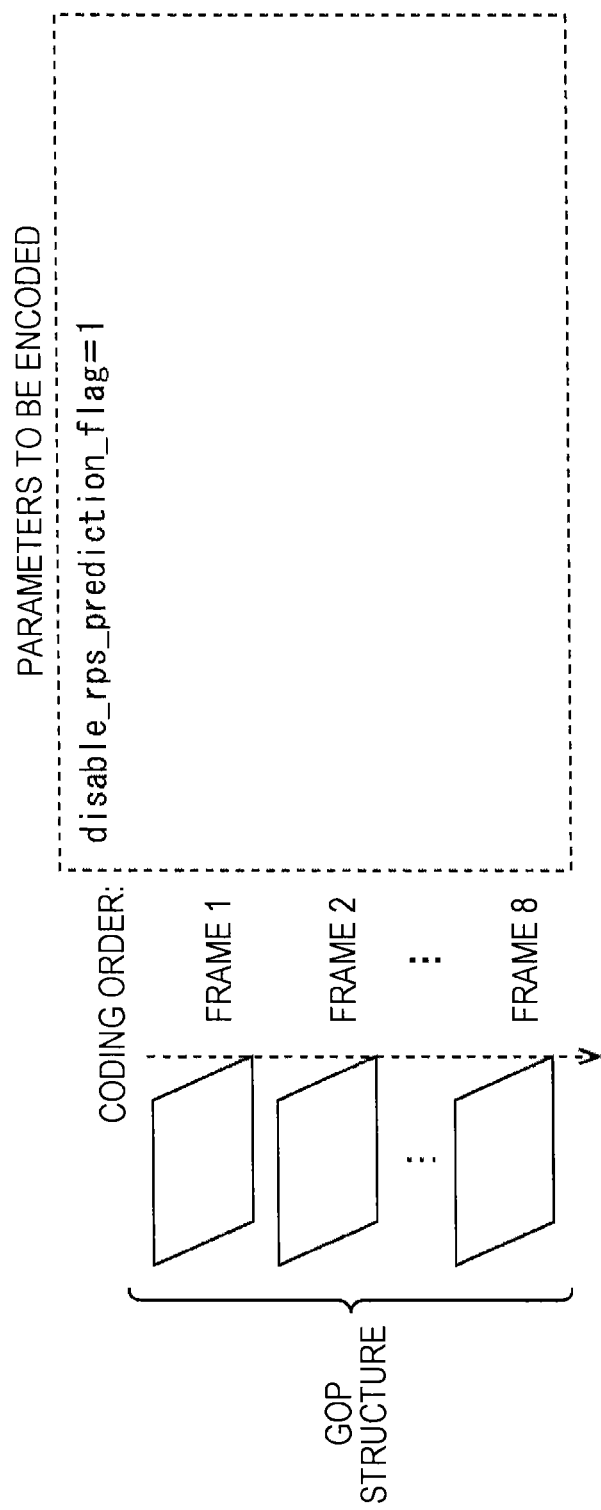
FIG. 24 is a diagram illustrating the amount of information of an RPS set by the setting unit illustrated in FIG. 20.
Figure 25:
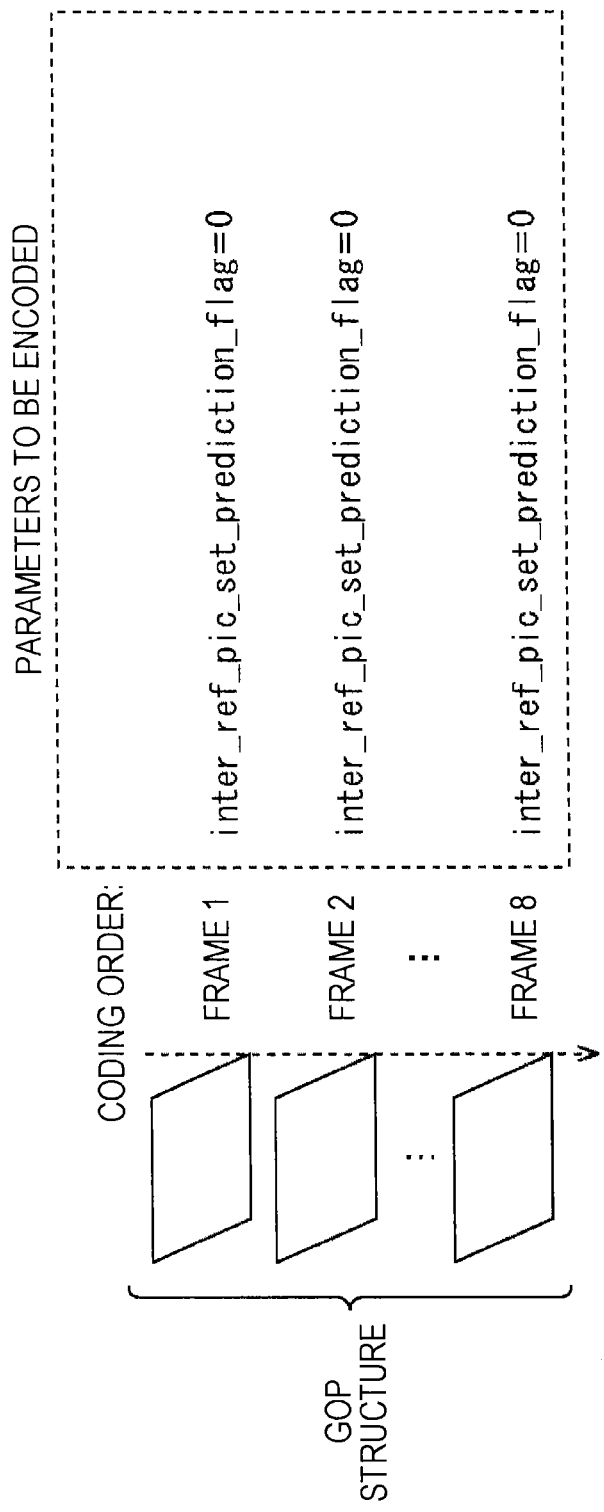
FIG. 25 is a diagram illustrating the amount of information of an RPS in the related art.

FIGS. 23 and 24 are diagrams illustrating the amount of information of the RPS set by the setting unit 151 illustrated in FIG. 20, and FIG. 25 is a diagram illustrating the amount of information of an RPS in the related art.

In the example in FIG. 23, the reference picture specification information for the second and eighth pictures from the beginning of the GOP is identical to the reference picture specification information for the immediately preceding pictures in encoding order.

In this case, as illustrated in FIG. 23, the setting unit 151 sets disable_rps_prediction_flag to 0, and sets unified_rps_prediction_control_present_flag to 1. The setting unit 151 further sets unified_delta_idx_minus1 to 0.

Further, the setting unit 151 sets, for example, as an RPS for which the index is equal to 0, the value 0 for inter_ref_pic_set_prediction_flag and reference picture specification information for the initial picture in the GOP. Further, the setting unit 151 sets, as an RPS for which the index is equal to 1, the value 1 for inter_ref_pic_set_prediction_flag. Then, the RPS of the initial picture in the GOP is assigned the index 0, and the RPSs of the second and eighth pictures are assigned the index 1.

In this manner, the setting unit 151 sets delta_idx_minus1, which is common to all the pictures in the GOP, as unified_delta_idx_minus1. Therefore, the setting unit 151 may set delta_idx_minus1 in units of GOPs.

In addition, in the examples in FIGS. 24 and 25, reference picture specification information for all the pictures in the GOP is not identical to the reference picture specification information for the preceding pictures in encoding order.

In this case, as illustrated in FIG. 24, the setting unit 151 sets the value 1 for disable_rps_prediction_flag, and sets, as an RPS corresponding to each of the pictures in the GOP, reference picture specification information for the picture. In the related art, in contrast, as illustrated in FIG. 25, as an RPS corresponding to each of the pictures in the GOP, the value 0 for inter_ref_pic_set_prediction_flag and reference picture specification information for the picture are set.

In this manner, the setting unit 151 sets, as disable_rps_prediction_flag, the value 0 for inter_ref_pic_set_prediction_flag, which is common to all the pictures in the GOP. Therefore, in a case where the disable_rps_prediction_flag is equal to 1, the amount of information on an RPS can be reduced compared to that in the related art by an amount corresponding to inter_ref_pic_set_prediction_flag.

Process of Encoding Apparatus

The generation process performed by the encoding apparatus 150 illustrated in FIG. 20 is similar to the generation process illustrated in FIG. 10, except the RPS setting process, and the following description will be given only for the RPS setting process.

Figure 26:
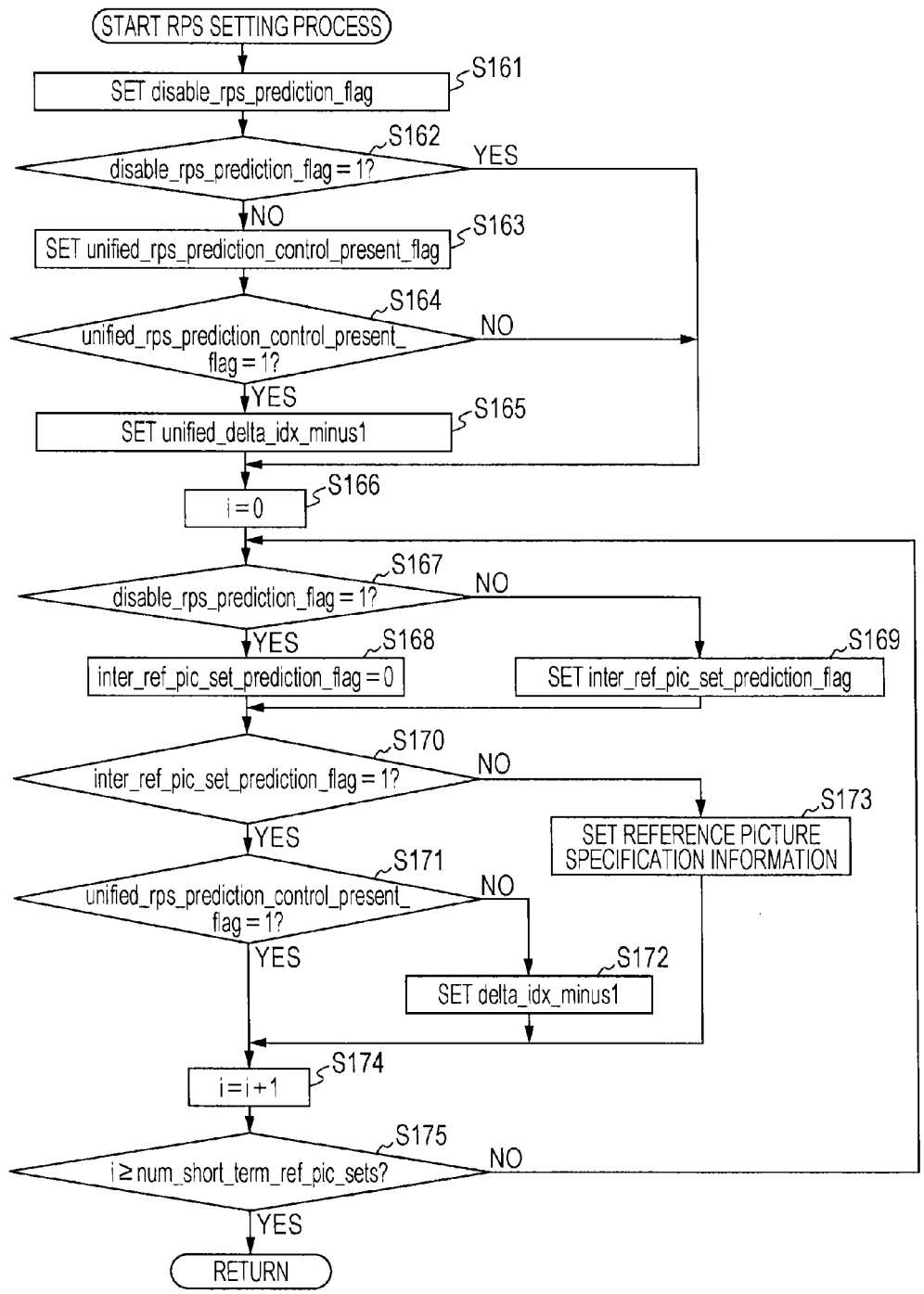
FIG. 26 is a flowchart depicting the details of an RPS setting process performed by the encoding apparatus illustrated in FIG. 20.

FIG. 26 is a flowchart depicting the details of the RPS setting process performed by the setting unit 151 of the encoding apparatus 150.

Referring to FIG. 26, in step S161, the setting unit 151 sets disable_rps_prediction_flag as an SPS. In step S162, the setting unit 151 determines whether or not the disable_rps_prediction_flag is equal to 1. If it is determined in step S162 that the disable_rps_prediction_flag is not equal to 1, in step S163, the setting unit 151 sets unified_rps_prediction_control_present_flag as an SPS.

In step S164, the setting unit 151 determines whether or not the unified_rps_prediction_control_present_flag is equal to 1. If it is determined in step S164 that the unified_rps_prediction_control_present_flag is equal to 1, in step S165, the setting unit 151 sets unified_delta_idx_minus1 as an SPS. Then, the process proceeds to step S166.

If it is determined in step S162 that the disable_rps_prediction_flag is equal to 1 or if it is determined in step S164 that the unified_rps_prediction_control_present_flag is equal to 0, the process proceeds to step S166.

In step S166, the setting unit 151 sets the index i of the RPS to 0. In step S167, the setting unit 151 determines whether or not the disable_rps_prediction_flag is equal to 1. If it is determined in step S167 that the disable_rps_prediction_flag is equal to 1, in step S168, the setting unit 151 sets inter_ref_pic_set_prediction_flag to 0. Then, the process proceeds to step S170.

If it is determined in step S167 that the disable_rps_prediction_flag is not equal to 1, in step S169, the setting unit 151 sets inter_ref_pic_set_prediction_flag as an RPS having the index i. Then, the process proceeds to step S170.

In step S170, the setting unit 151 determines whether or not the inter_ref_pic_set_prediction_flag is equal to 1. If it is determined in step S170 that the inter_ref_pic_set_prediction_flag is equal to 1, in step S171, the setting unit 151 determines whether or not the unified_rps_prediction_control_present_flag is equal to 1.

If it is determined in step S171 that the unified_rps_prediction_control_present_flag is equal to 1, the process proceeds to step S174. If it is determined in step S171 that the unified_rps_prediction_control_present_flag is not equal to 1, in step S172, the setting unit 151 sets delta_idx_minus1 as the RPS having the index i. Then, the process proceeds to step S174.

If it is determined in step S170 that the inter_ref_pic_set_prediction_flag is not equal to 1, in step S173, the setting unit 151 sets reference picture specification information as the RPS having the index i. Then, the process proceeds to step S174.

In step S174, the setting unit 151 increments the index by 1. In step S175, the setting unit 151 determines whether or not the index i is greater than or equal to num_short_term_ref_pic_sets, which represents the number of RPSs included in the SPS.

If it is determined in step S175 that the index i is not greater than or equal to the number num_short_term_ref_pic_sets, the process returns to step S167, and the processing of steps S167 to S175 is repeatedly performed until the index i becomes greater than or equal to the number num_short_term_ref_pic_sets.

If it is determined in step S175 that the index i is greater than or equal to the number num_short_term_ref_pic_sets, the RPS setting process ends.

The encoding apparatus 150 sets disable_rps_prediction_flag in the manner described above. Thus, in a case where the disable_rps_prediction_flag is equal to 1, the amount of information on an RPS concerning reference picture specification information can be reduced compared to that in the related art by an amount corresponding to inter_ref_pic_set_prediction_ flag. In addition, inter_ref_pic_set_prediction_flag can be set in units of GOPs.

Furthermore, since the encoding apparatus 150 sets delta_idx_minus1, which is common to all the pictures in the GOP, as unified_delta_idx_minus1, delta_idx_minus1 can be set in units of GOPs.

Example Configuration of Decoding Apparatus According to Second Embodiment

Figure 27:
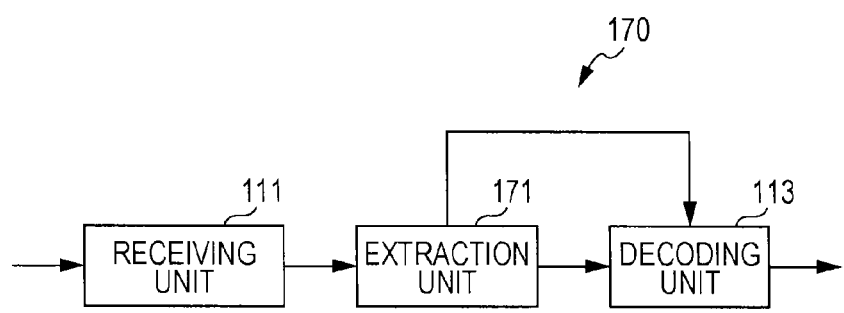
FIG. 27 is a block diagram illustrating an example configuration of a decoding apparatus according to the second embodiment of the present technology.

FIG. 27 is a block diagram illustrating an example configuration of a decoding apparatus 170 according to the second embodiment of the present technology, which is configured to decode an encoded stream transmitted from the encoding apparatus 150 illustrated in FIG. 20.

Of the components illustrated in FIG. 27, substantially the same components as those in FIG. 15 are identified using the same reference numerals, and will not be described to avoid redundancy.

The configuration of the decoding apparatus 170 illustrated in FIG. 27 is different from the configuration of the decoding apparatus 110 illustrated in FIG. 15 in that an extraction unit 171 is provided in place of the extraction unit 112. The decoding apparatus 170 sets RPS information on each RPS in accordance with the SPS illustrated in FIG. 21.

Specifically, similarly to the extraction unit 112 illustrated in FIG. 15, the extraction unit 171 of the decoding apparatus 170 extracts an SPS, a PPS, encoded data, and the like from the encoded stream supplied from the receiving unit 111. Similarly to the extraction unit 112, the extraction unit 171 supplies the encoded data to the decoding unit 113. Further, the extraction unit 171 acquires RPS information on each RPS in accordance with the SPS illustrated in FIG. 21, and supplies the acquired information to the decoding unit 113. Further, similarly to the extraction unit 112, the extraction unit 171 supplies the information other than RPSs included in the SPS, the PPS, and the like to the decoding unit 113, if necessary.

Process of Decoding Apparatus

The receiving process performed by the decoding apparatus 170 illustrated in FIG. 27 is similar to the receiving process illustrated in FIG. 17, except the RPS setting process, and the following description will be given only for the RPS setting process.

Figure 28:
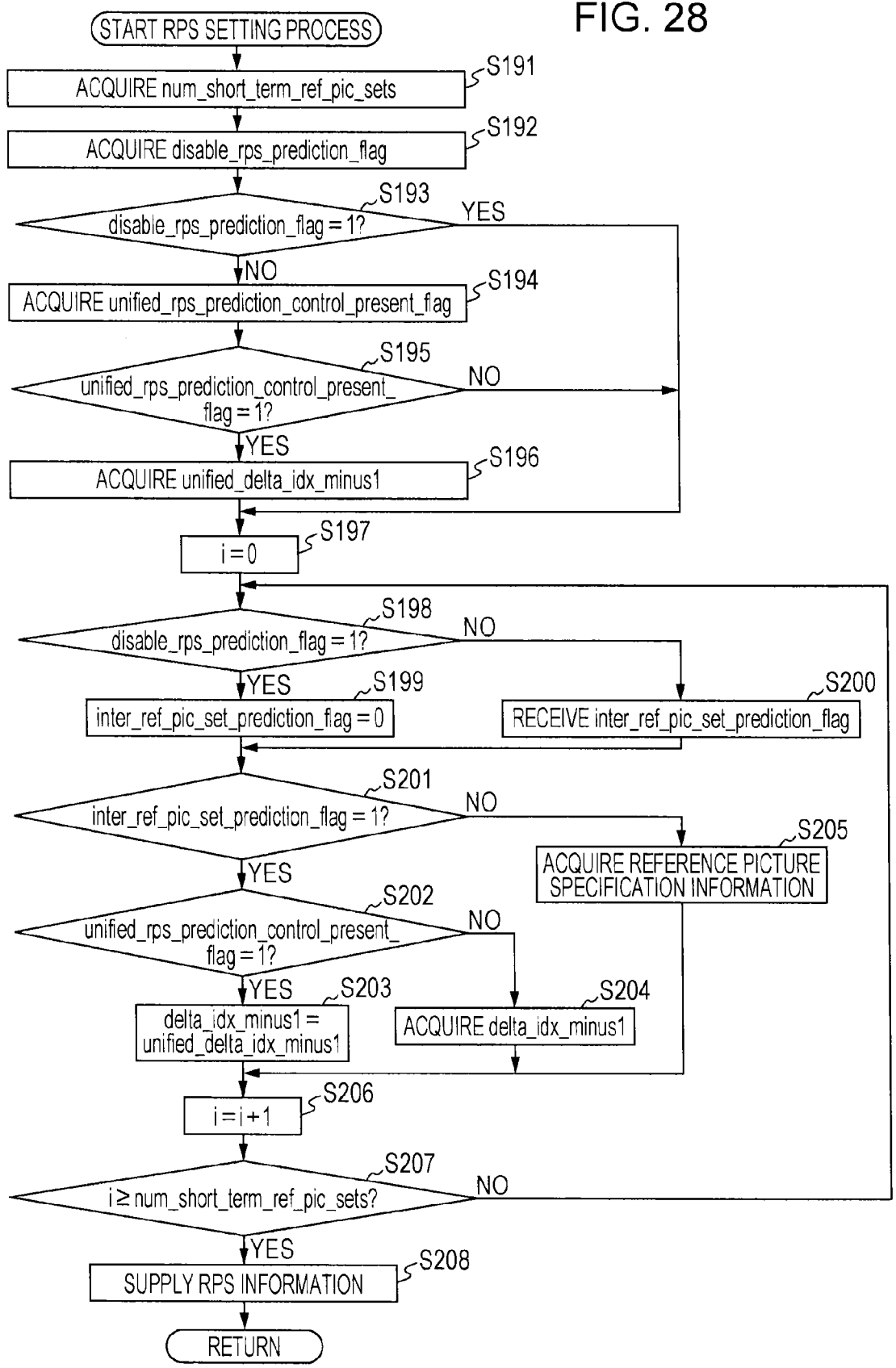
FIG. 28 is a flowchart depicting the details of an RPS setting process performed by the decoding apparatus illustrated in FIG. 27.

FIG. 28 is a flowchart depicting the details of the RPS setting process performed by the decoding apparatus 170 illustrated in FIG. 27.

Referring to FIG. 28, in step S191, the extraction unit 171 acquires the num_short_term_ref_pic_sets included in the SPS (FIG. 21). In step S192, the extraction unit 171 acquires the disable_rps_prediction_flag included in the SPS. In step S193, the extraction unit 171 determines whether or not the acquired disable_rps_prediction_flag is equal to 1.

If it is determined in step S193 that the disable_rps_prediction_flag is not equal to 1, in step S194, the extraction unit 171 acquires the unified_rps_prediction_control_ present_ flag included in the SPS. In step S195, the extraction unit 171 determines whether or not the acquired unified_rps_prediction_control_present_flag is equal to 1.

If it is determined in step S195 that the unified_rps_prediction_control_present_flag is equal to 1, in step S196, the extraction unit 171 acquires the unified_delta_idx_minus1 included in the SPS. Then, the process proceeds to step S197.

If it is determined in step S195 that the unified_delta_idx_minus1 is not equal to 1, the process proceeds to step S197. If it is determined in step S193 that the disable_rps_prediction_flag is equal to 1, the process proceeds to step S197.

In step S197, the extraction unit 171 sets the index i of the RPS corresponding to the RPS information to be generated to 0. In step S198, the extraction unit 171 determines whether or not the disable_rps_prediction_flag acquired in step S192 is equal to 1.

If it is determined in step S198 that the disable_rps_prediction_flag is equal to 1, in step S199, the extraction unit 171 sets the inter_ref_pic_set_prediction_flag included in the RPS information on the RPS having the index i to 0. Then, the process proceeds to step S201.

If it is determined in step S198 that the disable_rps_prediction_flag is not equal to 1, in step S200, the extraction unit 171 acquires the inter_ref_pic_set_prediction_flag included in the RPS having the index i included in the SPS. Then, the extraction unit 171 sets the acquired inter_ref_pic_set_prediction_flag as inter_ref_pic_set_prediction_flag included in the RPS information on the RPS having the index i. Then, the process proceeds to step S201.

In step S201, the extraction unit 171 determines whether or not the inter_ref_pic_set_prediction_flag is equal to 1. If it is determined in step S201 that the inter_ref_pic_set_prediction_flag is equal to 1, in step S202, the extraction unit 171 determines whether or not the unified_rps_prediction_control_present_flag acquired in step S194 is equal to 1.

If it is determined in step S202 that the unified_rps_prediction_control_present_flag is equal to 1, the process proceeds to step S203. In step S203, the extraction unit 171 sets the unified_delta_idx_minus1 acquired in step S196 as unified_delta_idx_minus1 included in the RPS information on the RPS having the index i. Then, the process proceeds to step S206.

If it is determined in step S202 that the unified_rps_prediction_control_present_flag is not equal to 1, in step S204, the extraction unit 171 acquires the delta_idx_minus1 included in the RPS having the index i included in the SPS. Then, the extraction unit 171 sets the acquired delta_idx_minus1 as delta_idx_minus1 included in the RPS information on the RPS having the index i. Then, the process proceeds to step S206.

If it is determined in step S201 that the inter_ref_pic_set_prediction_flag is not equal to 1, in step S205, the extraction unit 171 acquires the reference picture specification information included in the RPS having the index i included in the SPS. Then, the extraction unit 171 sets the acquired reference picture specification information as reference picture specification information included in the RPS information on the RPS having the index i. Then, the process proceeds to step S206.

The processing of steps S206 to S208 is similar to the processing of steps S128 to S130 in FIG. 18, and will not be described herein.

Accordingly, the decoding apparatus 170 receives disable_rps_prediction_flag, and generates reference picture specification information for the picture being decoded in accordance with disable_rps_prediction_flag. As a result, the decoding apparatus 170 can decode an encoded stream with the amount of information on an RPS being reduced by an amount corresponding to inter_ref_pic_set_prediction_flag in a case where the disable_rps_prediction_flag is equal to 1.

In addition, the decoding apparatus 170 receives delta_idx_minus1, which is common to all the pictures in the GOP, as unified_delta_idx_minus1, and generates reference picture specification information for the picture being decoded in accordance with unified_delta_idx_minus1. As a result, the decoding apparatus 170 can decode an encoded stream in which delta_idx_minus1 is set in units of GOPs.

Third Embodiment

Example Configuration of Encoding Apparatus According to Third Embodiment

Figure 29:
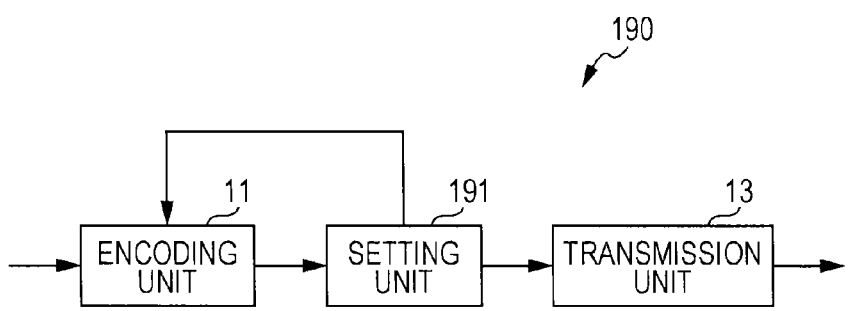
FIG. 29 is a block diagram illustrating an example configuration of an encoding apparatus according to a third embodiment of the present technology.

FIG. 29 is a block diagram illustrating an example configuration of an encoding apparatus 190 according to a third embodiment of the present technology.

Of the components illustrated in FIG. 29, substantially the same components as those in FIG. 3 are identified using the same reference numerals, and will not be described to avoid redundancy.

The configuration of the encoding apparatus 190 illustrated in FIG. 29 is different from the configuration of the encoding apparatus 10 illustrated in FIG. 3 in that a setting unit 191 is provided in place of the setting unit 12. The encoding apparatus 190 is a combination of the encoding apparatus 10 illustrated in FIG. 3 and the encoding apparatus 150 illustrated in FIG. 20.

Specifically, the setting unit 191 of the encoding apparatus 190 sets an RPS not including inter_ref_pic_set_prediction_flag but including an RPS including reference picture specification information and an RPS including inter_ref_pic_set_prediction_flag, delta_idx_minus1, reference picture specification information, and any other necessary data, if any. Further, the setting unit 191 assigns indices to individual RPSs. Here, an RPS not including inter_ref_pic_set_prediction_flag but including reference picture specification information is assigned the index 0.

The setting unit 191 supplies the RPSs that are assigned the indices to the encoding unit 11. Further, the setting unit 191 sets an SPS including the RPSs and disable_rps_prediction_flag and also including unified_rps_prediction_control_present_flag or unified_delta_idx_minus1, if necessary. The setting unit 191 sets a PPS and the like.

Further, similarly to the setting unit 12 illustrated in FIG. 3, the setting unit 191 generates an encoded stream using the set SPS and PPS and the encoded data supplied from the encoding unit 11. Similarly to the setting unit 12, the setting unit 191 supplies the encoded stream to the transmission unit 13.

Example of Syntax of SPS

FIG. 30 is a diagram illustrating an example of the syntax of the SPS set by the setting unit 191 illustrated in FIG. 29.

The configuration illustrated in FIG. 30 is the same as the configuration illustrated in FIG. 21, and will not be described here.

Example of Syntax of RPS

FIG. 31 is a diagram illustrating an example of the syntax of an RPS.

Although not illustrated in FIG. 31, the description of the lines after the tenth line is similar to the description of the lines after the fourth line in FIG. 1.

As given in the second and third lines in FIG. 31, if the index (idx) is equal to 0 or if the disable_rps_prediction_flag is equal to 1, the RPS does not include inter_ref_pic_set_prediction_flag, but includes reference picture specification information which is included when the inter_ref_pic_set_prediction_flag is equal to 0.

The description of the fourth to tenth lines is similar to the description of the fourth to tenth lines in FIG. 22, and will not be described herein.

Advantages of Embodiment of Present Technology

Figure 32:
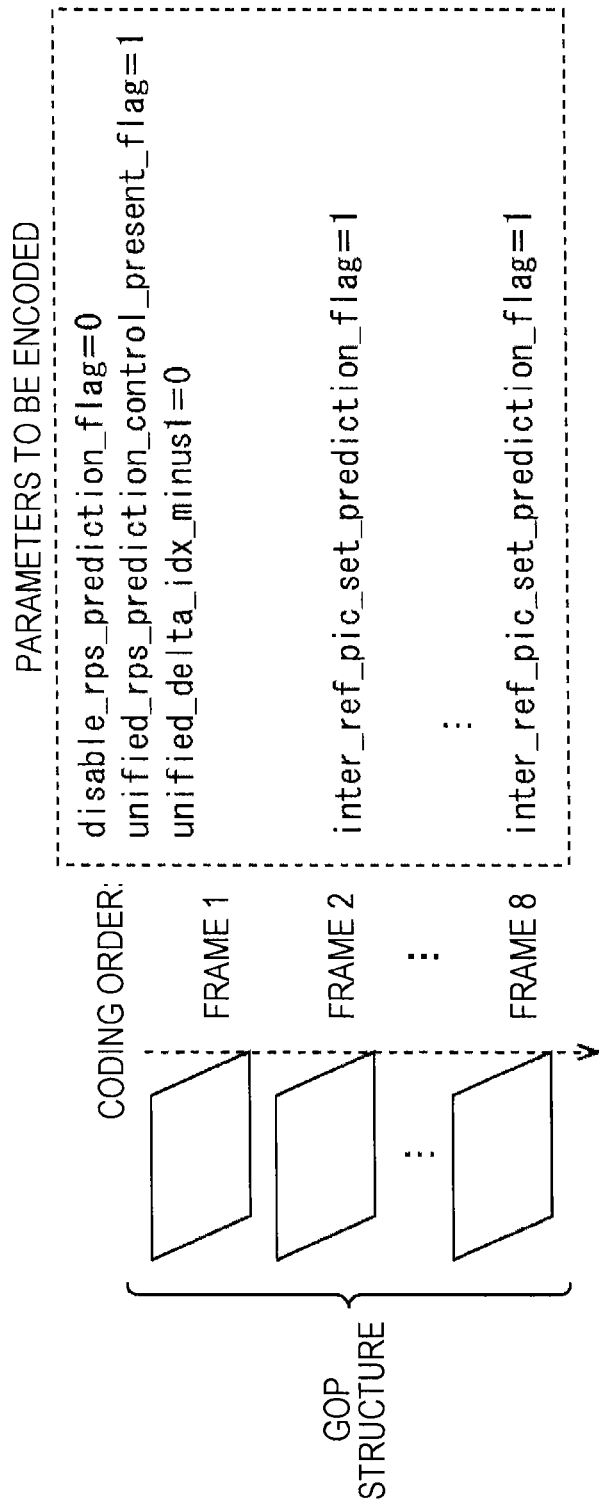
FIG. 32 is a diagram illustrating the amount of information of an RPS set by a setting unit illustrated in FIG. 29.

FIG. 32 is a diagram illustrating the amount of information of the RPS set by the setting unit 191 illustrated in FIG. 29.

In the example in FIG. 32, the reference picture specification information for the second and eighth pictures from the beginning of the GOP is identical to the reference picture specification information for the immediately preceding pictures in encoding order.

In this case, as illustrated in FIG. 32, the setting unit 191 sets the value 0 for disable_rps_prediction_flag, and sets the value 1 for unified_rps_prediction_control_present_flag. The setting unit 191 further sets unified_delta_idx_minus1 to 0.

Further, the setting unit 191 sets, for example, as an RPS for which the index is equal to 0, reference picture specification information for the initial picture in the GOP. The setting unit 191 further sets, as an RPS for which the index is equal to 1, the value 1 for inter_ref_pic_set_prediction_flag. Then, the RPS of the initial picture in the GOP is assigned the index 0, and the RPSs of the second and eighth pictures are assigned the index 1.

In this manner, the setting unit 191 does not set inter_ref_pic_set_prediction_flag as an RPS for which the index used as the RPS of the initial picture is equal to 0.

Therefore, the amount of information on an RPS can be reduced compared to that in the related art illustrated in FIG. 8 by an amount corresponding to the inter_ref_pic_set_prediction_flag of the initial picture.

Furthermore, the setting unit 191 sets delta_idx_minus1, which is common to all the pictures in the GOP, as unified_delta_idx_minus1. Therefore, delta_idx_minus1 may be set in units of GOPs.

Additionally, although not illustrated in the drawings, the setting unit 191 sets the value 0 for inter_ref_pic_set_prediction_flag, which is common to all the pictures in the GOP, as disable_rps_prediction_flag. Therefore, if the disable_rps_prediction_flag is equal to 1, the amount of information on an RPS can be reduced compared to that in the related art by an amount corresponding to the inter_ref_pic_set_prediction_flag of the pictures other than the initial picture.

Process of Encoding Apparatus

The generation process performed by the encoding apparatus 190 illustrated in FIG. 29 is similar to the generation process illustrated in FIG. 10, except the RPS setting process, and the following description will be given only for the RPS setting process.

Figure 33:
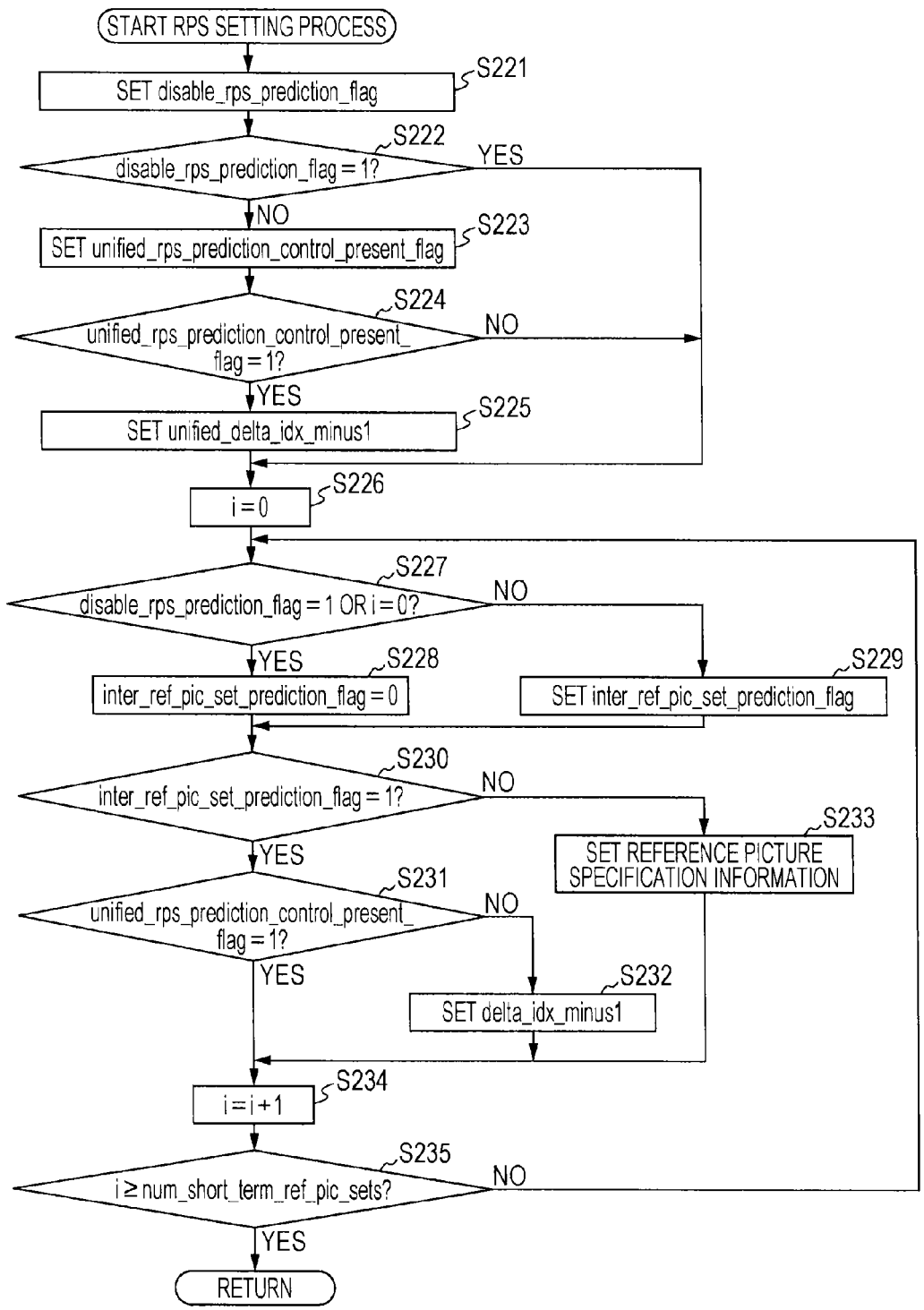
FIG. 33 is a flowchart depicting the details of an RPS setting process performed by the encoding apparatus illustrated in FIG. 29.

FIG. 33 is a flowchart depicting the details of the RPS setting process performed by the setting unit 191 of the encoding apparatus 190.

The processing of steps S221 to S226 in FIG. 33 is similar to the processing of steps S161 to S166 in FIG. 26, and will not be described herein.

In step S227, the setting unit 191 determines whether or not the disable_rps_prediction_flag is equal to 1 or whether or not the index i is equal to 0. If it is determined in step S227 that the disable_rps_prediction_flag is equal to 1 or the index i is equal to 0, the process proceeds to step S228. If it is determined in step S227 that the disable_rps_prediction_flag is not equal to 1 or the index i is not equal to 0, the process proceeds to step S229.

The processing of steps S228 to S235 is similar to the processing of steps S168 to S175 in FIG. 26, and will not be described herein.

Example Configuration of Decoding Apparatus According to Third Embodiment

Figure 34:
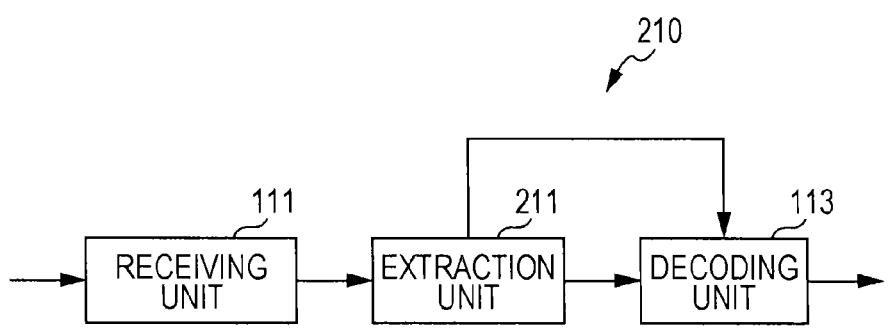
FIG. 34 is a block diagram illustrating an example configuration of a decoding apparatus according to the third embodiment of the present technology.

FIG. 34 is a block diagram illustrating an example configuration of a decoding apparatus 210 according to the third embodiment of the present technology, which is configured to decode an encoded stream transmitted from the encoding apparatus 190 illustrated in FIG. 29.

Of the components illustrated in FIG. 34, substantially the same components as those in FIG. 15 are identified using the same reference numerals, and will not be described to avoid redundancy.

The configuration of the decoding apparatus 210 illustrated in FIG. 34 is different from the configuration of the decoding apparatus 110 illustrated in FIG. 15 in that an extraction unit 211 is provided in place of the extraction unit 112. The decoding apparatus 210 sets RPS information on each RPS in accordance with the SPS illustrated in FIG. 30 which includes the RPS illustrated in FIG. 31.

Specifically, similarly to the extraction unit 112 illustrated in FIG. 15, the extraction unit 211 of the decoding apparatus 210 extracts an SPS, a PPS, encoded data, and the like from the encoded stream supplied from the receiving unit 111. Similarly to the extraction unit 112, the extraction unit 211 supplies the encoded data to the decoding unit 113. Further, the extraction unit 211 acquires RPS information on each RPS in accordance with the SPS illustrated in FIG. 30 which includes the RPS illustrated in FIG. 31, and supplies the acquired information to the decoding unit 113. Further, similarly to the extraction unit 112, the extraction unit 211 supplies the information other than RPSs included in the SPS, the PPS, and the like to the decoding unit 113, if necessary.

Process of Decoding Apparatus

The receiving process performed by the decoding apparatus 210 illustrated in FIG. 34 is similar to the receiving process illustrated in FIG. 17, except the RPS setting process, and the following description will be given only for the RPS setting process.

Figure 35:
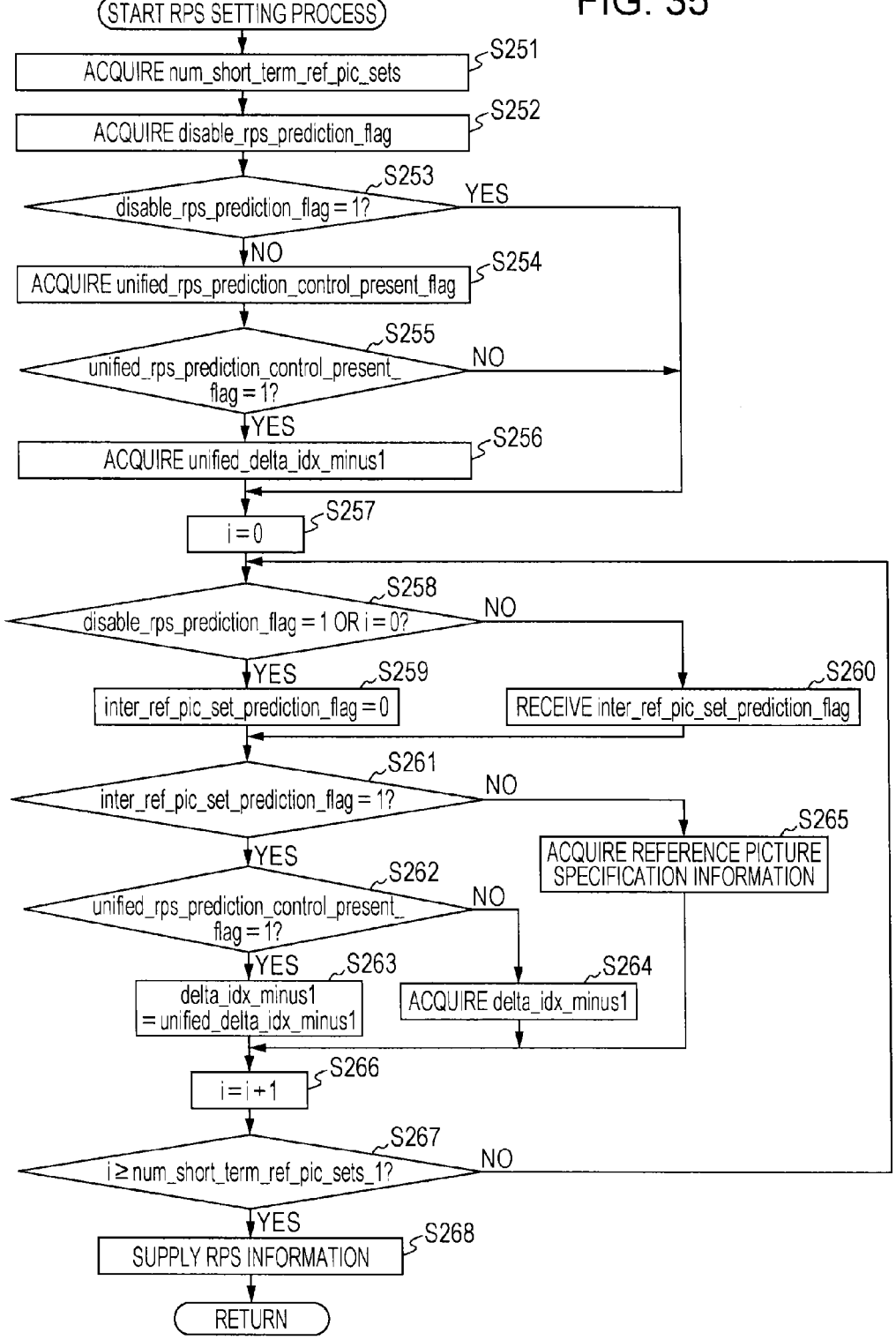
FIG. 35 is a flowchart depicting the details of an RPS setting process performed by the decoding apparatus illustrated in FIG. 34.

FIG. 35 is a flowchart depicting the details of the RPS setting process performed by the decoding apparatus 210 illustrated in FIG. 34.

The processing of steps S251 to S257 in FIG. 35 is similar to the processing of steps S191 to S197 in FIG. 28, and will not be described herein.

In step S258, the extraction unit 211 determines whether or not the disable_rps_prediction_flag acquired in step S252 is equal to 1 or whether or not the index i is equal to 0.

If it is determined in step S258 that the disable_rps_prediction_flag is equal to 1 or the index i is equal to 0, the process proceeds to step S259. If it is determined in step S258 that the disable_rps_prediction_flag is not equal to 1 or the index i is not equal to 0, the process proceeds to step S260.

The processing of steps S259 to S268 is similar to the processing of steps S199 to S208 in FIG. 28, and will not be described herein.

Fourth Embodiment

Example Configuration of Encoding Apparatus According to Fourth Embodiment

Figure 36:
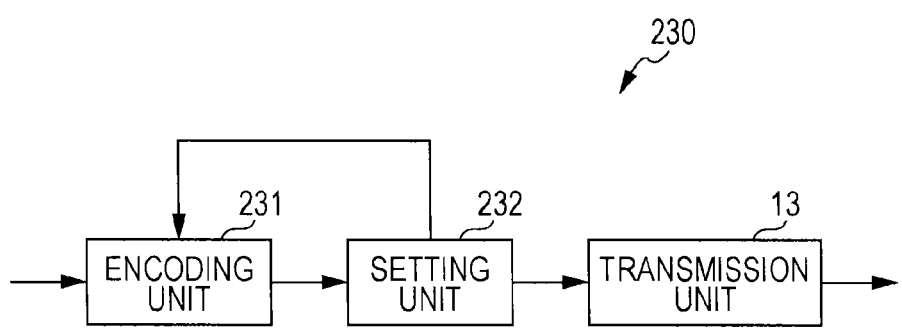
FIG. 36 is a block diagram illustrating an example configuration of an encoding apparatus according to a fourth embodiment of the present technology.

FIG. 36 is a block diagram illustrating an example configuration of an encoding apparatus 230 according to a fourth embodiment of the present technology.

Of the components illustrated in FIG. 36, substantially the same component as that in FIG. 3 is identified using the same reference numeral, and will not be described to avoid redundancy.

The configuration of the encoding apparatus 230 illustrated in FIG. 36 is different from the configuration of the encoding apparatus 10 illustrated in FIG. 3 in that an encoding unit 231 and a setting unit 232 are provided in place of the encoding unit 11 and the setting unit 12, respectively. The encoding apparatus 230 does not set information concerning a reference picture that is not necessary for the types of slices depending on the type of slice in the picture.

Specifically, frame-by-frame pictures are input to the encoding unit 231 of the encoding apparatus 230 as input signals. The encoding unit 231 encodes the input signals using the HEVC scheme by referring to the RPSs, PPS, and the like supplied from the setting unit 232. In this case, the encoding unit 231 performs weighted prediction on a reference picture for inter prediction, if necessary.

Weighted prediction is a process for applying a weight to the reference picture to generate a prediction picture. Specifically, for example, in a case where the decoded pictures of the two preceding frames $Y_1$ and $Y_0$ of a frame X being encoded in encoding order are used as reference pictures, a prediction picture X' of a frame X is determined in weighted prediction by using Formula (3) below.

$$X' = w_0 \times Y_0 + w_0 \times Y_1 + d \quad (3)$$

In Formula (3), $w_0$ and $w_1$ denote weighting factors, and d denotes the offset value. The weighting factors and the offset value are included in an encoded stream before the encoded stream is transmitted.

The weighted prediction can reduce the difference between the prediction picture and the picture being encoded even though changes in luminance occur between the reference picture and the picture being encoded with the use of a fade-in, a fade-out, a cross-fade, or the like. As a result, coding efficiency can be increased.

In a case where weighted prediction is not performed, in contrast, changes in luminance between the reference picture and the picture being encoded with the use of a fade-in, a fade-out, a cross-fade, or the like directly cause differences between the prediction picture and the picture being encoded, resulting in poor coding efficiency.

The encoding unit 231 supplies encoded data obtained as a result of encoding to the setting unit 232.

Similarly to the setting unit 12 illustrated in FIG. 3, the setting unit 232 sets an RPS not including inter_ref_pic_set_prediction_flag but including reference picture specification information, and an RPS including inter_ref_pic_set_prediction_flag and reference picture specification information or delta_idx_minus1. Similarly to the setting unit 12, the setting unit 232 assigns an index to each of the RPSs.

The setting unit 232 sets an SPS including the RSPs, a PPS, and the like. The setting unit 232 supplies the RPSs that are assigned the indices and the PPS to the encoding unit 231. The setting unit 232 generates an encoded stream using the set SPS and PPS and the encoded data supplied from the encoding unit 231. The setting unit 232 supplies the encoded stream to the transmission unit 13.

Example Configuration of Encoding Unit

Figure 37:
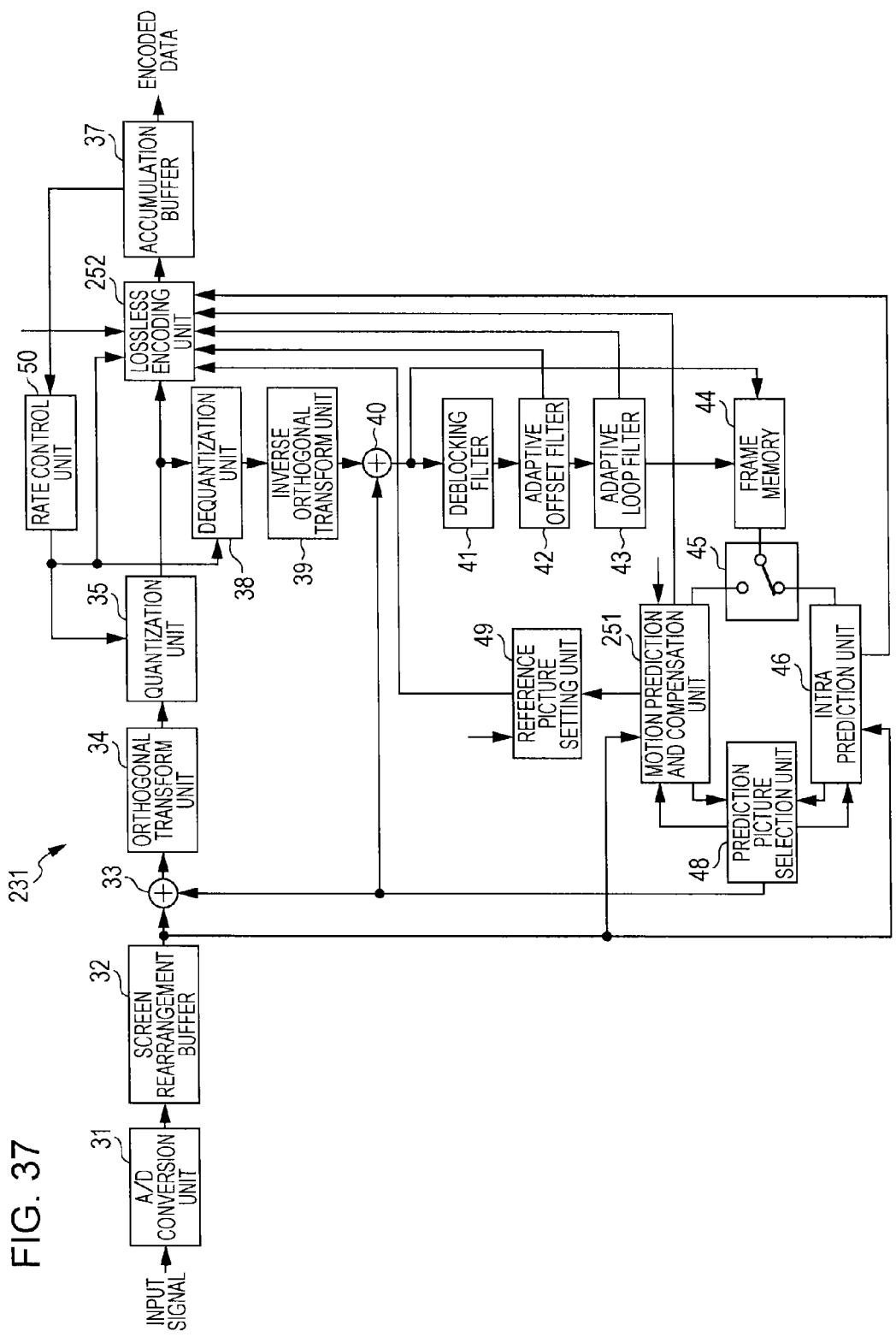
FIG. 37 is a block diagram illustrating an example configuration of an encoding unit illustrated in FIG. 36.

FIG. 37 is a block diagram illustrating an example configuration of the encoding unit 231 illustrated in FIG. 36.

Of the components illustrated in FIG. 37, substantially the same components as those in FIG. 4 are identified using the same reference numerals, and will not be described to avoid redundancy.

The configuration of the encoding unit 231 illustrated in FIG. 37 is different from the configuration of the encoding unit 11 illustrated in FIG. 4 in that a motion prediction and compensation unit 251 and a lossless encoding unit 252 are provided in place of the motion prediction and compensation unit 47 and the lossless encoding unit 36, respectively.

The motion prediction and compensation unit 251 performs a motion prediction and compensation process using weighted prediction for all the possible inter prediction modes in accordance with the PPS supplied from the setting unit 232 illustrated in FIG. 36. Specifically, the motion prediction and compensation unit 251 detects motion vectors for all the possible inter prediction modes in accordance with the pictures supplied from the screen rearrangement buffer 32 and the reference picture read from the frame memory 44 via the switch 45. Then, the motion prediction and compensation unit 251 performs a compensation process on the reference picture in accordance with the detected motion vectors.

Further, the motion prediction and compensation unit 251 calculates weighting information including a weighting factor and an offset value in weighted prediction. The motion prediction and compensation unit 251 functions as a generation unit, and performs weighted prediction on the reference picture subjected to the compensation process in accordance with the calculated weighting information to generate a prediction picture.

In this case, similarly to the motion prediction and compensation unit 47 illustrated in FIG. 4, the motion prediction and compensation unit 251 calculates cost function values for all the possible inter prediction modes in accordance with the pictures supplied from the screen rearrangement buffer 32 and the prediction picture. Then, similarly to the motion prediction and compensation unit 47, the motion prediction and compensation unit 251 determines the inter prediction mode for which the cost function value is minimum to be an optimum inter prediction mode.

Then, similarly to the motion prediction and compensation unit 47, the motion prediction and compensation unit 251 supplies a prediction picture generated in the optimum inter-prediction mode and the corresponding cost function value to the prediction picture selection unit 48. Upon being informed by the prediction picture selection unit 48 of the selection of the prediction picture generated in the optimum inter-prediction mode, the motion prediction and compensation unit 251 outputs the inter-prediction mode information, the corresponding motion vectors, the weighting information, and any other suitable data to the lossless encoding unit 252. The motion prediction and compensation unit 251 also outputs the reference picture specification information to the reference picture setting unit 49.

The lossless encoding unit 252 generates a slice type indicating the types of slices in the picture being encoded in accordance with the PPS supplied from the setting unit 232 illustrated in FIG. 36. Further, similarly to the lossless encoding unit 36 illustrated in FIG. 4, the lossless encoding unit 252 acquires intra-prediction mode information from the intra prediction unit 46. The lossless encoding unit 252 further acquires inter-prediction mode information, motion vectors, weighting information, and any other suitable data from the motion prediction and compensation unit 251. Further, similarly to the lossless encoding unit 36, the lossless encoding unit 252 acquires the indices of the RPSs or the RPSs and any other suitable data from the reference picture setting unit 49, and acquires a quantization parameter from the rate control unit 50.

In addition, similarly to the lossless encoding unit 36, the lossless encoding unit 252 acquires offset filter information including a storage flag, indices or offsets, and type information from the adaptive offset filter 42, and acquires a filter coefficient from the adaptive loop filter 43.

Similarly to the lossless encoding unit 36, the lossless encoding unit 252 losslessly encodes the quantized coefficient supplied from the quantization unit 35. The lossless encoding unit 252 also losslessly encodes, as coding information, the slice type, the intra-prediction mode information or the inter-prediction mode information and the motion vectors, the weighting information, the indices of the RPSs or the RPSs and any other suitable data, the quantization parameter, the offset filter information, and the filter coefficient.

The lossless encoding unit 252 adds the losslessly encoded coding information to the losslessly encoded coefficient as the slice header to generate encoded data. The lossless encoding unit 252 supplies the encoded data to the accumulation buffer 37 for accumulation.

Example of Syntax of PPS

FIGS. 38 and 39 are diagrams illustrating an example of the syntax of the PPS set by the setting unit 232 illustrated in FIG. 36, and FIGS. 40 and 41 are diagrams illustrating an example of the syntax of a PPS according to the HEVC scheme in the related art.

As given in the sixth line in FIG. 38, the PPS set by the setting unit 232 includes a unity flag (unified_slice_type_flag) indicating whether or not all the slices in the corresponding picture have the same type. Further, as given in the seventh and eighth lines, if the unity flag is equal to 1, the PPS includes an I-flag (all_intra_slice_flag) indicating whether or not all the slices in the corresponding picture are of the type of I-slice.

Further, as given in the ninth and tenth lines, if the I-flag is not equal to 1, that is, if the picture includes the P-slice or the B-slice, the PPS includes a non-B-flag (no_b_slice_flag) indicating whether the corresponding picture includes no B-slices.

As given in the eleventh and twelfth lines, if the I-flag is not equal to 1, the PPS includes, as information concerning the reference picture, an RPSL0 number (num_ref_idx_l0_default_active_minus1), which is the largest number of RPSs in forward prediction (L0 prediction) that is performed using a reference picture presented earlier than the corresponding picture.

As given in the thirteenth and fourteenth lines, if the non-B-flag is equal to 0, that is, if the picture includes a B-slice, the PPS includes, as information concerning the reference picture, an RPSL1 number (num_ref_idx_l1_default_active_minus1), which is the largest number of RPSs in backward prediction (L1 prediction) that is performed using a reference picture presented later than the corresponding picture.

As given in the twenty-fifth and twenty-sixth lines, if the I-flag is not equal to 1, the PPS includes, as information concerning the reference picture, a P-prediction flag (weighted_pred_flag) indicating whether or not to perform weighted prediction on the P-slices. Further, if the non-B-flag is not equal to 1, the PPS includes, as information concerning the reference picture, a B-prediction flag (weighted_bipred_flag) indicating whether or not to perform weighted prediction on the B-slices.

Accordingly, in the PPS illustrated in FIGS. 38 and 39, the RPSL0 number, the RPSL1 number, the P-prediction flag, and the B-prediction flag are not set in a case where the corresponding picture includes only I-slices. Further, the RPSL1 number and the B-prediction flag are not set in a case where the corresponding picture includes other slices than an I-slice. Therefore, coding efficiency can be increased compared to the case where the RPSL0 number, the RPSL1 number, the P-prediction flag, and the B-prediction flag are set for all the pictures regardless of the types of slices in the picture.

Note that a decoding apparatus determines that the RPSL0 number is equal to 0 and the RPSL1 number is equal to 0 when the picture includes only I-slices, and determines that the RPSL1 number is equal to 0 when the picture includes other slices than an I-slice.

In the syntax of a PPS according to the HEVC scheme in the related art illustrated in FIGS. 40 and 41, in contrast, as given in the sixth, seventh, seventeenth, and eighteenth lines in FIG. 40, the RPSL0 number, the RPSL1 number, the P-prediction flag, and the B-prediction flag are set regardless of the types of slices in the picture.

If the picture includes only B-slices, the P-prediction flag may not necessarily be set.

Example of Syntax of Slice Header

FIGS. 42 to 44 are diagrams illustrating an example of the syntax of the slice header to be added by the lossless encoding unit 252 illustrated in FIG. 37, and FIGS. 45 to 47 are diagrams illustrating an example of the syntax of a slice header according to the HEVC scheme in the related art.

As given in the second line in FIG. 42, the slice header to be added by the lossless encoding unit 252 includes an initial flag (first_slice_in_pic_flag) indicating whether or not the corresponding slice is the initial slice in the picture. Further, as given in the eleventh and twelfth lines, the slice header includes the slice type (slice_type) of the corresponding slice if the unity flag is equal to 0 or if the unity flag is equal to 1 and the initial flag is equal to 0.

Specifically, the slice type is set in the slice header illustrated in FIGS. 42 to 44 if the slices in the picture do not have the same type or if the slices in the picture have the same type and the corresponding slice is the initial slice in the picture.

However, the slice type is not set in the slice header illustrated in FIGS. 42 to 44 if the slices in the picture have the same type and if the corresponding slice is a slice other than the initial slice in the picture. In this case, the slice type included in the slice header of the initial slice is used as the slice type of a slice other than the initial slice.

Therefore, coding efficiency can be increased compared to that in the case where the slice types of all the slices are set regardless of whether or not all the slices in the picture have the same slice type.

In contrast, as given in the eleventh line in FIG. 45, the slice types of all the slices in the picture are set in the slice header according to the HEVC scheme in the related art illustrated in FIGS. 45 to 47 regardless of whether or not all the slices have the same slice type.

Process of Encoding Apparatus

Figure 48:
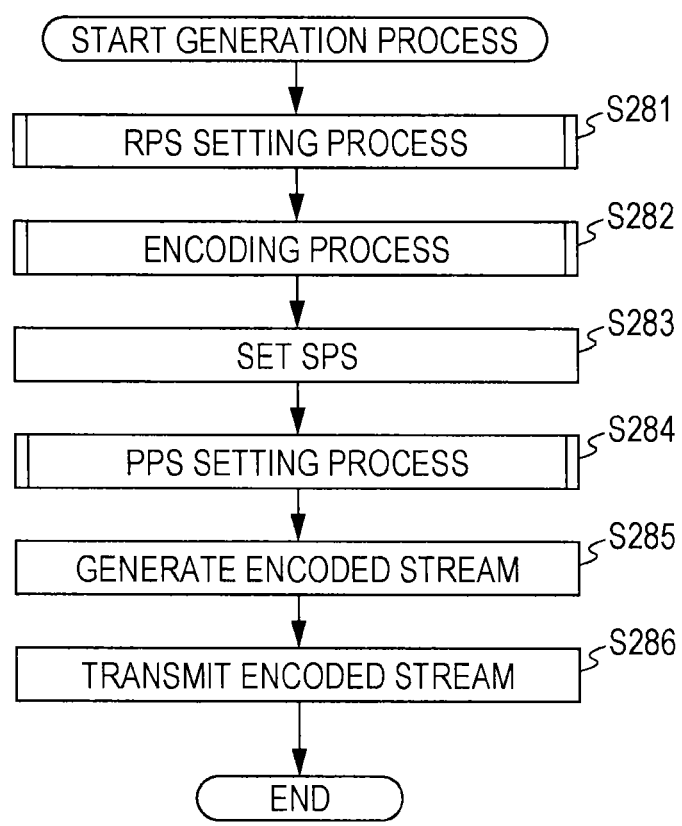
FIG. 48 is a flowchart depicting a generation process performed by the encoding apparatus illustrated in FIG. 36.

FIG. 48 is a flowchart depicting a generation process performed by the encoding apparatus 230 illustrated in FIG. 36.

Referring to FIG. 48, in step S281, the setting unit 232 of the encoding apparatus 230 performs the RPS setting process illustrated in FIG. 11. In step S282, the encoding unit 231 performs an encoding process for encoding frame-by-frame pictures input as input signals from outside using the HEVC scheme. The details of the encoding process will be described with reference to FIGS. 49 and 50 described below.

In step S283, the setting unit 232 sets an SPS including an RPS assigned an index. In step S284, the setting unit 232 performs a PPS setting process for setting a PPS. The details of the PPS setting process will be described with reference to FIG. 51 described below.

The processing of steps S285 and S286 is similar to the processing of steps S15 and S16 in FIG. 10, and will not be described herein.

Figure 49:
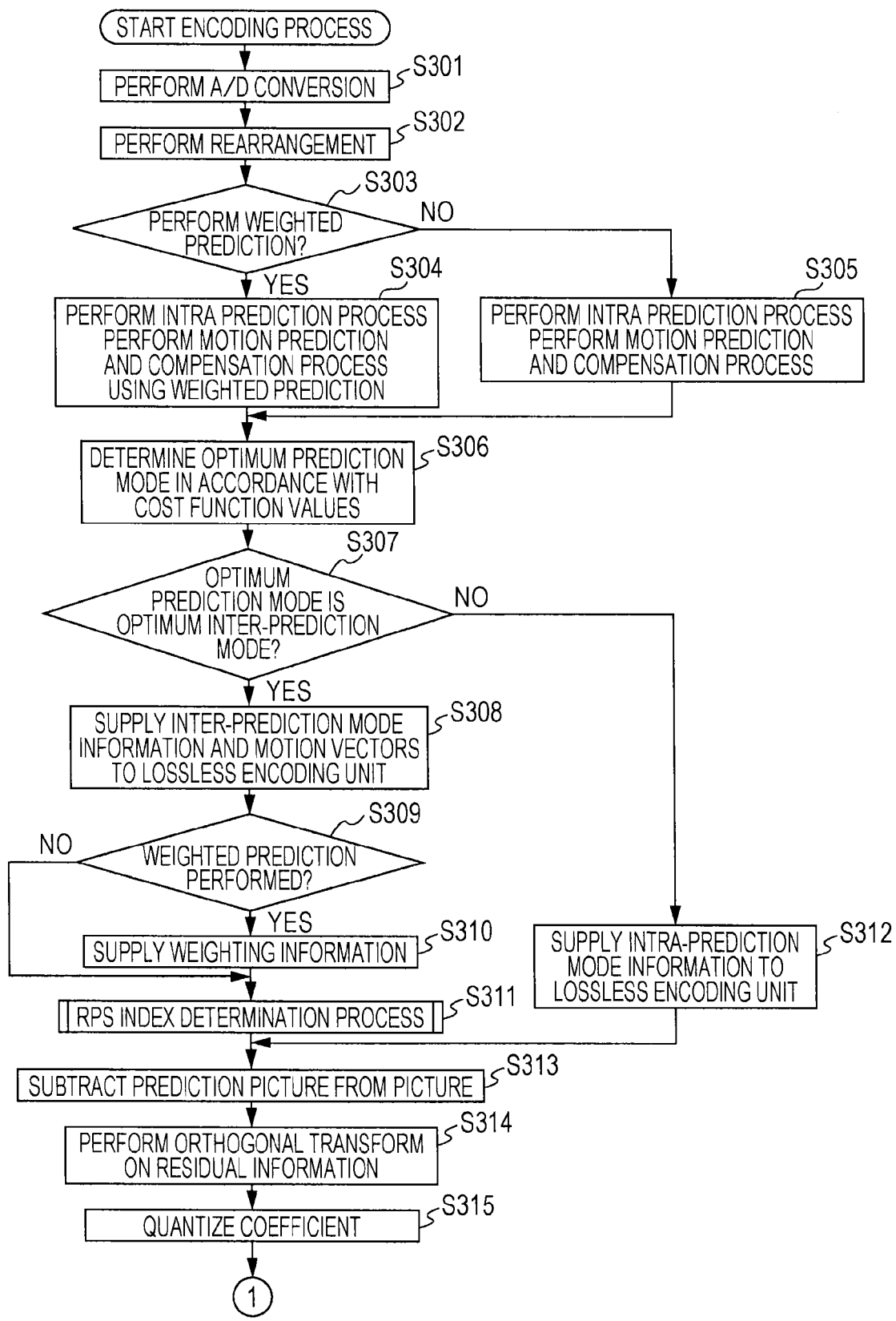
FIG. 49 is a flowchart depicting the details of an encoding process illustrated in FIG. 48.
Figure 50:
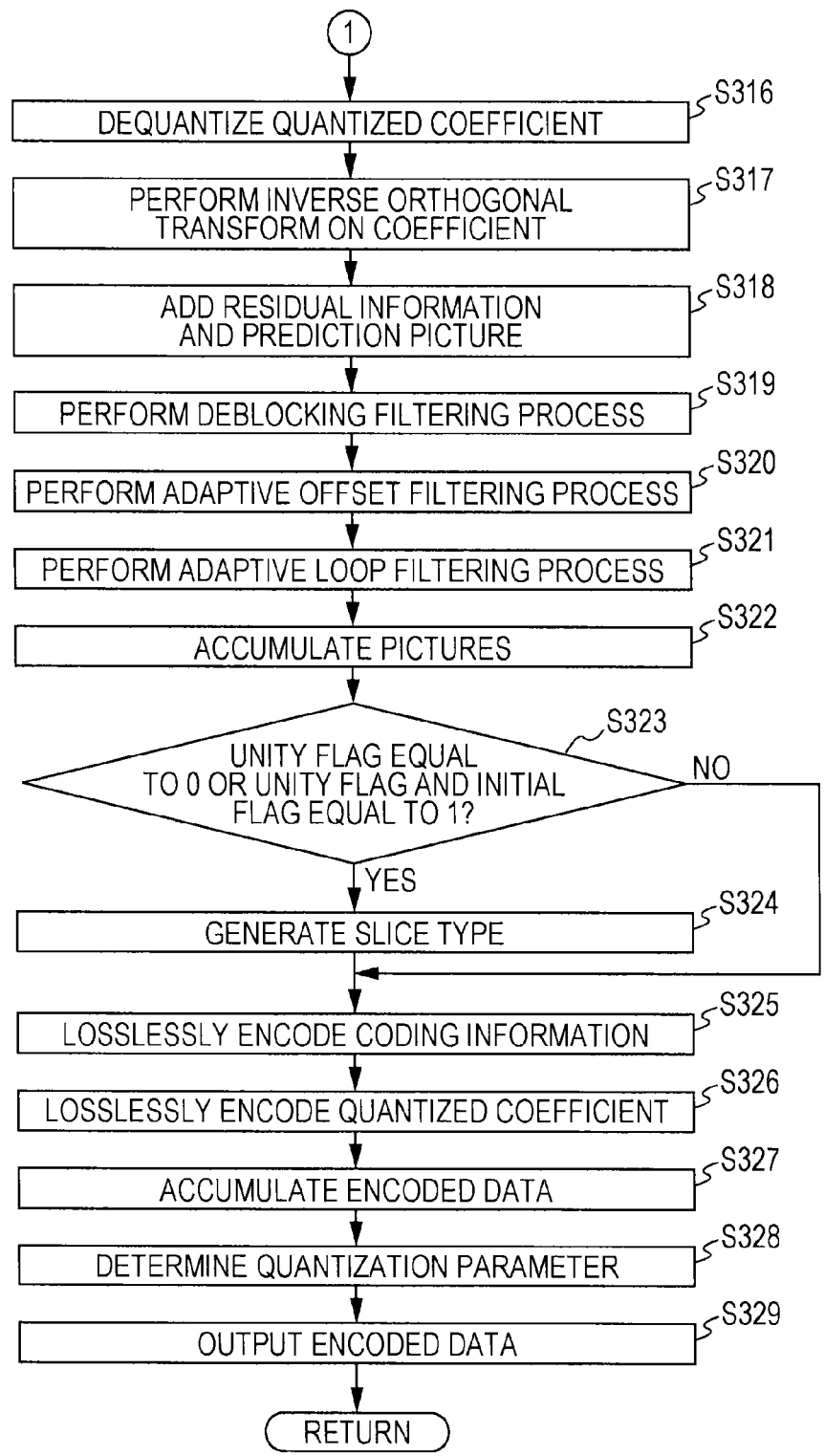
FIG. 50 is a flowchart depicting the details of the encoding process illustrated in FIG. 48.

FIGS. 49 and 50 illustrate a flowchart depicting the details of the encoding process in step S282 in FIG. 48.

The processing of steps S301 and S302 in FIG. 49 is similar to the processing of steps S31 and S32 in FIG. 12, and will not be described herein.

In step S303, the motion prediction and compensation unit 251 determines whether or not to perform weighted prediction in accordance with the P-prediction flag or B-prediction flag included in the PPS supplied from the setting unit 232 illustrated in FIG. 36.

Specifically, in a case where the picture being encoded is a P-slice, the motion prediction and compensation unit 251 determines that weighted prediction is to be performed if the P-prediction flag is equal to 1. In a case where the picture being encoded is a B-slice, the motion prediction and compensation unit 251 determines that weighted prediction is to be performed if the B-prediction flag is equal to 1. Further, in a case where the picture being encoded is an I-slice, the process skips the processing of step S303, and proceeds to step S304.

If it is determined in step S303 that weighted prediction is to be performed, in step S304, the intra prediction unit 46 performs an intra prediction process for all the possible intra prediction modes. Further, the intra prediction unit 46 calculates cost function values for all the possible intra prediction modes in accordance with the pictures read from the screen rearrangement buffer 32 and the prediction picture generated as a result of the intra prediction process. Then, the intra prediction unit 46 determines the intra prediction mode for which the cost function value is minimum to be an optimum intra-prediction mode. The intra prediction unit 46 supplies the prediction picture generated in the optimum intra-prediction mode and the corresponding cost function value to the prediction picture selection unit 48.

The motion prediction and compensation unit 251 further performs a motion prediction and compensation process using weighted prediction for all the possible inter prediction modes. Further, the motion prediction and compensation unit 251 calculates cost function values for all the possible inter prediction modes in accordance with the pictures supplied from the screen rearrangement buffer 32 and the prediction picture, and determines the inter prediction mode for which the cost function value is minimum to be an optimum inter-prediction mode. The motion prediction and compensation unit 251 supplies a prediction picture generated in the optimum inter-prediction mode and the corresponding cost function value to the prediction picture selection unit 48.

The motion prediction and compensation process is not performed if the picture being encoded is an I-slice. After the processing of step S304, the process proceeds to step S306.

If it is determined in step S303 that weighted prediction is not to be performed, in step S305, the intra prediction unit 46 performs a process similar to the processing of step S304.

The motion prediction and compensation unit 251 further performs a motion prediction and compensation process for all the possible inter prediction modes. Further, the motion prediction and compensation unit 251 calculates cost function values for all the possible inter prediction modes in accordance with the pictures supplied from the screen rearrangement buffer 32 and the prediction picture, and determines the inter prediction mode for which the cost function value is minimum to be an optimum inter-prediction mode. The motion prediction and compensation unit 251 supplies a prediction picture generated in the optimum inter-prediction mode and the corresponding cost function value to the prediction picture selection unit 48. Then, the process proceeds to step S306.

The processing of steps S306 to S308 is similar to the processing of steps S34 to S36 in FIG. 12, and will not be described herein.

After the processing of step S308, in step S309, the motion prediction and compensation unit 251 determines whether or not weighted prediction has been performed in the motion prediction and compensation process. If it is determined in step S309 that weighted prediction has been performed, in step S310, the motion prediction and compensation unit 251 supplies weighting information concerning the weighted prediction to the lossless encoding unit 252. Then, the process proceeds to step S311.

The processing of steps S311 to S322 is similar to the processing of steps S37 to S48 in FIGS. 12 and 13, and will not be described herein.

Referring to FIG. 50, in step S323, the lossless encoding unit 252 determines whether or not the unity flag included in the PPS supplied from the setting unit 232 illustrated in FIG. 36 is equal to 0 or whether or not the unity flag is equal to 1 and the initial flag is equal to 1.

If it is determined in step S323 that the unity flag is equal to 0 or that the unity flag is equal to 1 and the initial flag is equal to 1, in step S324, the lossless encoding unit 252 generates the slice type of the picture being encoded. Then, the process proceeds to step S325.

If it is determined in step S323 that the unity flag is not equal to 0 and that the unity flag is not equal to 1 or the initial flag is not equal to 1, the process proceeds to step S325.

In step S325, the lossless encoding unit 252 losslessly encodes, as the coding information, the slice type, the intra-prediction mode information or the inter-prediction mode information and the motion vectors, the weighting information, the indices of the RPSs or the RPSs and any other suitable data, the quantization parameter supplied from the rate control unit 50, the offset filter information, and the filter coefficient.

The processing of steps S326 to S329 is similar to the processing of steps S50 to S53 in FIG. 13, and will not be described herein.

Figure 51:
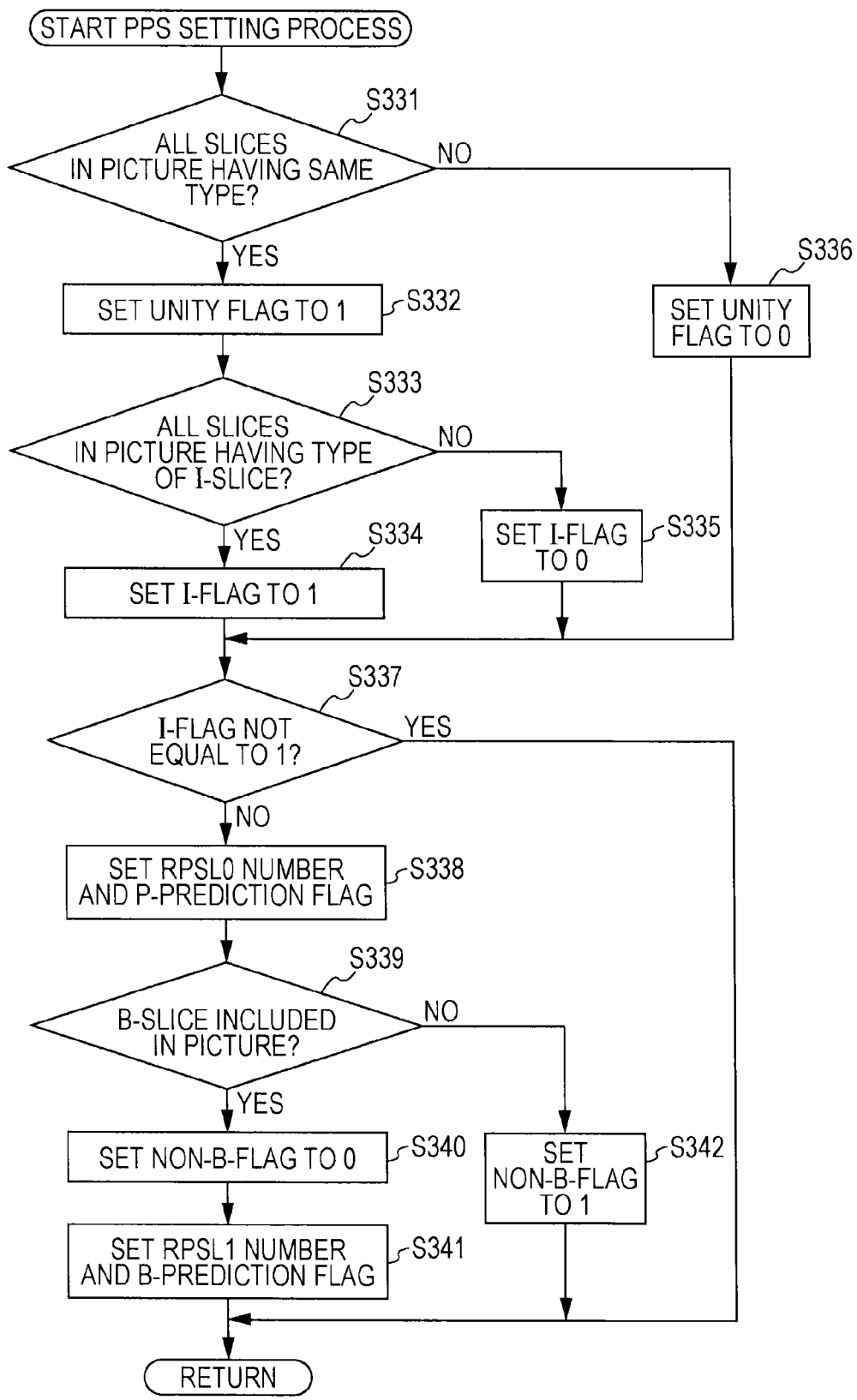
FIG. 51 is a flowchart depicting the details of a PPS setting process illustrated in FIG. 48.

FIG. 51 is a flowchart depicting the details of the PPS setting process in step S284 in FIG. 48. The PPS setting process is performed in units of pictures.

Referring to FIG. 51, in step S331, the setting unit 232 determines whether or not all the slices in the picture have the same type. If it is determined in step S331 that all the slices in the picture have the same type, in step S332, the setting unit 232 sets the unity flag to 1, and causes the unity flag to be included in the PPS.

In step S333, the setting unit 232 determines whether or not all the slices in the picture are of the type of I-slice. If it is determined in step S333 that all the slices in the picture are of the type of I-slice, in step S334, the setting unit 232 sets the I-flag to 1, and causes the I-flag to be included in the PPS. Then, the process proceeds to step S337.

If it is determined in step S333 that all the slices in the picture are not of the type of I-slice, in step S335, the setting unit 232 sets the I-flag to 0, and causes the I-flag to be included in the PPS. Then, the process proceeds to step S337.

If it is determined in step S331 that all the slices in the picture do not have the same type, in step S336, the setting unit 232 sets the unity flag to 0, and causes the unity flag to be included in the PPS. Then, the process proceeds to step S337.

In step S337, the setting unit 232 determines whether the I-flag is not equal to 1. If it is determined in step S337 that the I-flag is not equal to 1, in step S338, the setting unit 232 sets the RPSL0 number and the P-prediction flag in the PPS, and causes the RPSL0 number and the P-prediction flag to be included in the PPS.

In step S339, the setting unit 232 determines whether or not the picture includes a B-slice. If it is determined in step S339 that the picture includes a B-slice, in step S340, the setting unit 232 sets the non-B-flag included in the PPS to 0, and causes the non-B-flag to be included in the PPS. In step S341, the setting unit 232 sets the RPSL1 number and the B-prediction flag in the PPS, and causes the RPSL1 number and the B-prediction flag to be included in the PPS. Then, the process returns to step S284 in FIG. 48, and proceeds to step S285.

If it is determined in step S339 that the picture includes no B-slices, in step S342, the setting unit 232 sets the non-B-flag to 1, and causes the non-B-flag to be included in the PPS. Then, the process returns to step S284 in FIG. 48, and proceeds to step S285.

If it is determined in step S337 that the I-flag is equal to 1, the process returns to step S284 in FIG. 48, and proceeds to step S285.

Accordingly, since the encoding apparatus 230 sets information concerning a reference picture in accordance with the types of slices in the picture, the amount of information concerning a reference picture can be reduced, and coding efficiency can be increased. In addition, since the encoding apparatus 230 sets a slice type in accordance with whether or not all the slices in the picture have the same type, the amount of information on the slice type can be reduced, and coding efficiency can be increased.

Example Configuration of Decoding Apparatus According to Fourth Embodiment

Figure 52:
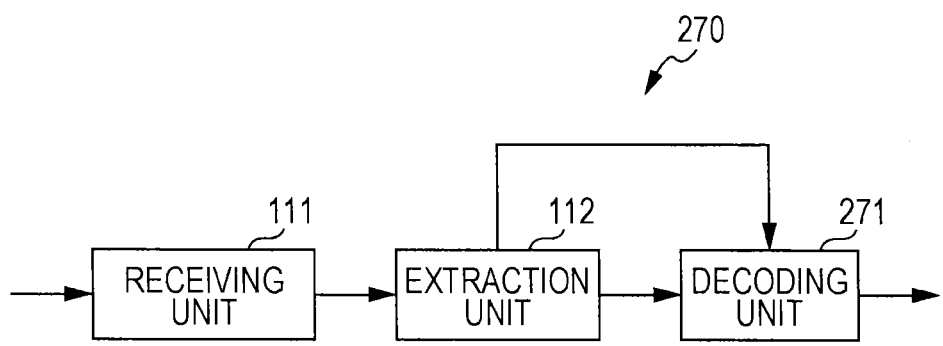
FIG. 52 is a block diagram illustrating an example configuration of a decoding apparatus according to the fourth embodiment of the present technology.

FIG. 52 is a block diagram illustrating an example configuration of a decoding apparatus 270 according to the fourth embodiment of the present technology, which is configured to decode an encoded stream transmitted from the encoding apparatus 230 illustrated in FIG. 36.

Of the components illustrated in FIG. 52, substantially the same components as those in FIG. 15 are identified using the same reference numerals, and will not be described to avoid redundancy.

The configuration of the decoding apparatus 270 illustrated in FIG. 52 is different from the configuration illustrated in FIG. 15 in that a decoding unit 271 is provided in place of the decoding unit 113. The decoding apparatus 270 performs weighted prediction during the motion compensation process, if necessary.

Specifically, the decoding unit 271 of the decoding apparatus 270 decodes the encoded data supplied from the extraction unit 112 using the HEVC scheme in accordance with inter_ref_pic_set_prediction_flag and delta_idx_minus1 or reference picture specification information in each RPS supplied from the extraction unit 112. In this case, the decoding unit 271 also refers to the information other than RPSs included in the SPS, the PPS, and the like, if necessary. Further, the decoding unit 271 performs weighted prediction, if necessary, in the motion compensation process. The decoding unit 271 outputs pictures obtained as a result of decoding as output signals.

Example Configuration of Decoding Unit

Figure 53:
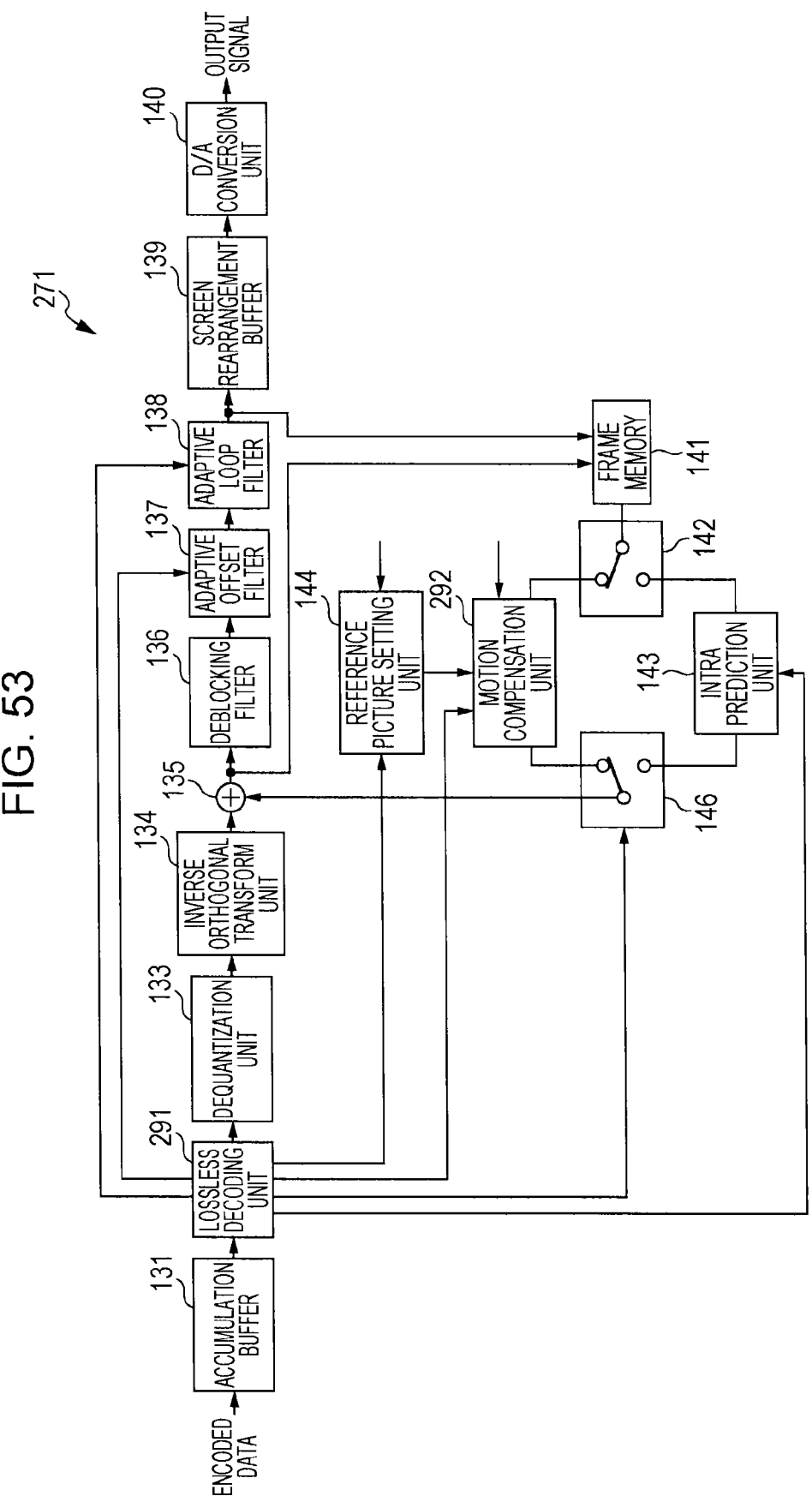
FIG. 53 is a block diagram illustrating an example configuration of a decoding unit illustrated in FIG. 52.

FIG. 53 is a block diagram illustrating an example configuration of the decoding unit 271 illustrated in FIG. 52.

Of the components illustrated in FIG. 53, substantially the same components as those in FIG. 16 are identified using the same reference numerals, and will not be described to avoid redundancy.

The configuration of the decoding apparatus 271 illustrated in FIG. 53 is different from the configuration illustrated in FIG. 16 in that a lossless decoding unit 291 and a motion compensation unit 292 are provided in place of the lossless decoding unit 132 and the motion compensation unit 145, respectively.

Similarly to the lossless decoding unit 132 illustrated in FIG. 16, the lossless decoding unit 291 of the decoding unit 271 losslessly decodes the encoded data supplied from the accumulation buffer 131 to obtain a quantized coefficient and coding information. Similarly to the lossless decoding unit 132, the lossless decoding unit 291 supplies the quantized coefficient to the dequantization unit 133. Further, the lossless decoding unit 291 supplies, as the coding information, intra-prediction mode information and any other suitable data to the intra prediction unit 143, and supplies, as the coding information, motion vectors, inter-prediction mode information, weighting information, and any other suitable data to the motion compensation unit 292. Similarly to the lossless decoding unit 132, the lossless decoding unit 291 supplies, as the coding information, the RPS flags and the indices of the RPSs or the RPSs to the reference picture setting unit 144.

Similarly to the lossless decoding unit 132, the lossless decoding unit 291 further supplies, as the coding information, intra-prediction mode information or inter-prediction mode information to the switch 146. Similarly to the lossless decoding unit 132, the lossless decoding unit 291 supplies, as the coding information, offset filter information to the adaptive offset filter 137, and supplies, as the coding information, a filter coefficient to the adaptive loop filter 138.

Similarly to the motion compensation unit 292 illustrated in FIG. 16, the motion compensation unit 292 reads the reference picture specified by the reference picture specification information from the frame memory 141 via the switch 142 in accordance with the reference picture specification information supplied from the reference picture setting unit 144.

Further, similarly to the motion prediction and compensation unit 251 illustrated in FIG. 37, the motion compensation unit 292 determines whether or not to perform weighted prediction in accordance with the P-prediction flag or B-prediction flag included in the PPS supplied from the extraction unit 112.

The motion compensation unit 292 functions as a generation unit, and performs, if it is determined that weighted prediction is to be performed, a motion compensation process using weighted prediction for the optimum inter-prediction mode indicated by the inter-prediction mode information by using the motion vectors and the reference picture. In this case, the motion compensation unit 292 refers to the RPSL0 number if a slice in the picture being encoded is a P-slice, or refers to the RPSL0 number and the RPSL1 number if a slice in the picture being encoded is a B-slice, if necessary.

If it is determined that weighted prediction is not to be performed, similarly to the motion compensation unit 145, the motion compensation unit 292 performs a motion compensation process for the optimum inter-prediction mode. The motion compensation unit 292 supplies a prediction picture generated as a result of the motion compensation process to the switch 146.

Process of Decoding Apparatus

Figure 54:
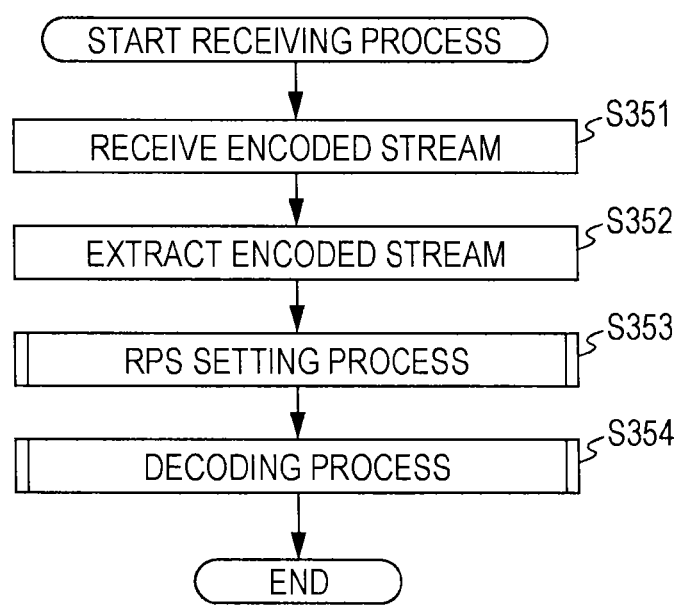
FIG. 54 is a flowchart depicting a receiving process performed by the decoding apparatus illustrated in FIG. 52.

FIG. 54 is a flowchart depicting a receiving process performed by the decoding apparatus 270 illustrated in FIG. 52.

The processing of steps S351 to S353 in FIG. 54 is similar to the processing of steps S111 to S113 in FIG. 17, and will not be described herein.

In step S354, the decoding unit 271 performs a decoding process in accordance with the RPS information on each RPS and the PPS which are supplied from the extraction unit 112. The details of the decoding process will be described with reference to FIG. 55 described below. Then, the process ends.

Figure 55:
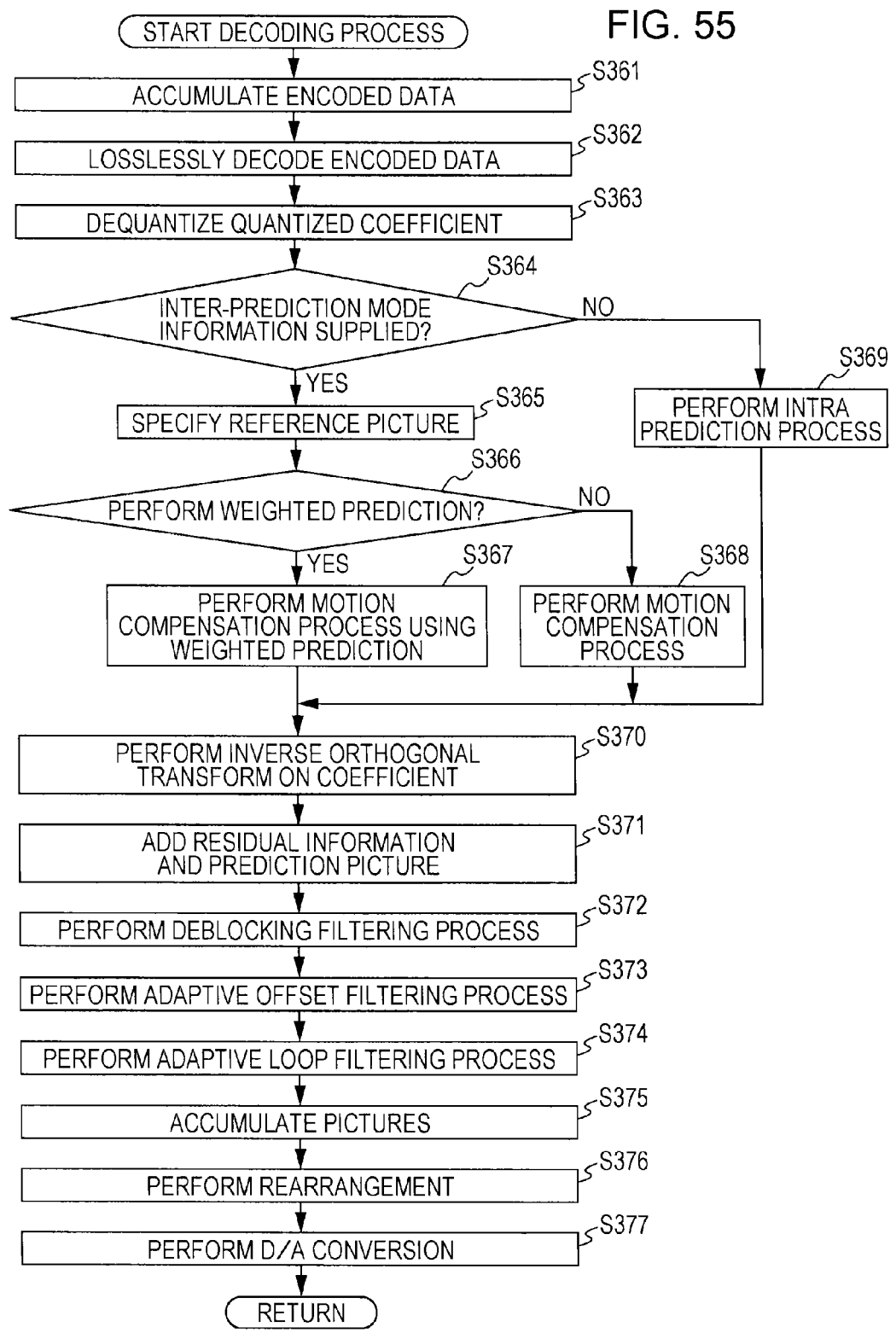
FIG. 55 is a flowchart depicting the details of a decoding process illustrated in FIG. 54.

FIG. 55 is a flowchart depicting the details of the decoding process in step S354 in FIG. 54.

Referring to FIG. 55, in step S361, the accumulation buffer 131 of the decoding unit 271 receives frame-by-frame encoded data from the extraction unit 112 illustrated in FIG. 52, and accumulates the frame-by-frame encoded data. The accumulation buffer 131 supplies the accumulated encoded data to the lossless decoding unit 291.

In step S362, the lossless decoding unit 291 losslessly decodes the encoded data supplied from the accumulation buffer 131 to obtain a quantized coefficient and coding information. The lossless decoding unit 291 supplies the quantized coefficient to the dequantization unit 133. Further, the lossless decoding unit 291 supplies, as the coding information, intra-prediction mode information and any other suitable data to the intra prediction unit 143, and supplies, as the coding information, motion vectors, inter-prediction mode information, weighting information, RPS flags, the indices of the RPSs or the RPSs, and any other suitable data to the motion compensation unit 292.

The lossless decoding unit 291 further supplies, as the coding information, intra-prediction mode information or inter-prediction mode information to the switch 146. The lossless decoding unit 291 supplies, as the coding information, offset filter information to the adaptive offset filter 137, and supplies, as the coding information, a filter coefficient to the adaptive loop filter 138.

The processing of steps S363 to S365 is similar to the processing of steps S133 to S135 in FIG. 19, and will not be described herein. In step S366, similarly to the motion prediction and compensation unit 251 illustrated in FIG. 37, the motion compensation unit 292 determines whether or not to perform weighted prediction in accordance with the P-prediction flag or B-prediction flag included in the PPS supplied from the extraction unit 112 illustrated in FIG. 52.

If it is determined in step S366 that weighted prediction is to be performed, in step S367, the motion compensation unit 292 reads a reference picture in accordance with the reference picture specification information supplied from the reference picture setting unit 144, and performs a motion compensation process using weighted prediction for the optimum inter-prediction mode indicated by the inter-prediction mode information by using the motion vectors and the reference picture.

In this case, the motion compensation unit 292 refers to the RPSL0 number if a slice in the picture being encoded is a P-slice, and refers to the RPSL0 number and the RPSL1 number if a slice in the picture being encoded is a B-slice, if necessary. The motion compensation unit 292 supplies a prediction picture generated as a result of the motion compensation process to the adder unit 135 via the switch 146. Then, the process proceeds to step S370.

If it is determined in step S366 that weighted prediction is not to be performed, in step S368, the motion compensation unit 292 reads a reference picture in accordance with the reference picture specification information supplied from the reference picture setting unit 144, and performs a motion compensation process for the optimum inter-prediction mode indicated by the inter-prediction mode information by using the motion vectors and the reference picture. The motion compensation unit 292 supplies a prediction picture generated as a result of the motion compensation process to the adder unit 135 via the switch 146. Then, the process proceeds to step S370.

The processing of steps S369 to S377 is similar to the processing of steps S137 to S145 in FIG. 19, and will not be described herein.

Accordingly, the decoding apparatus 270 sets information concerning a reference picture in accordance with the types of slices in the picture, thereby decoding an encoded stream with increased coding efficiency.

In the fourth embodiment, the information concerning a reference picture includes, but not limited to, the RPSL0 number, the RPSL1 number, the P-prediction flag, and the B-prediction flag.

Application to Multi-View Image Encoding and Multi-View Image Decoding

Figure 56:
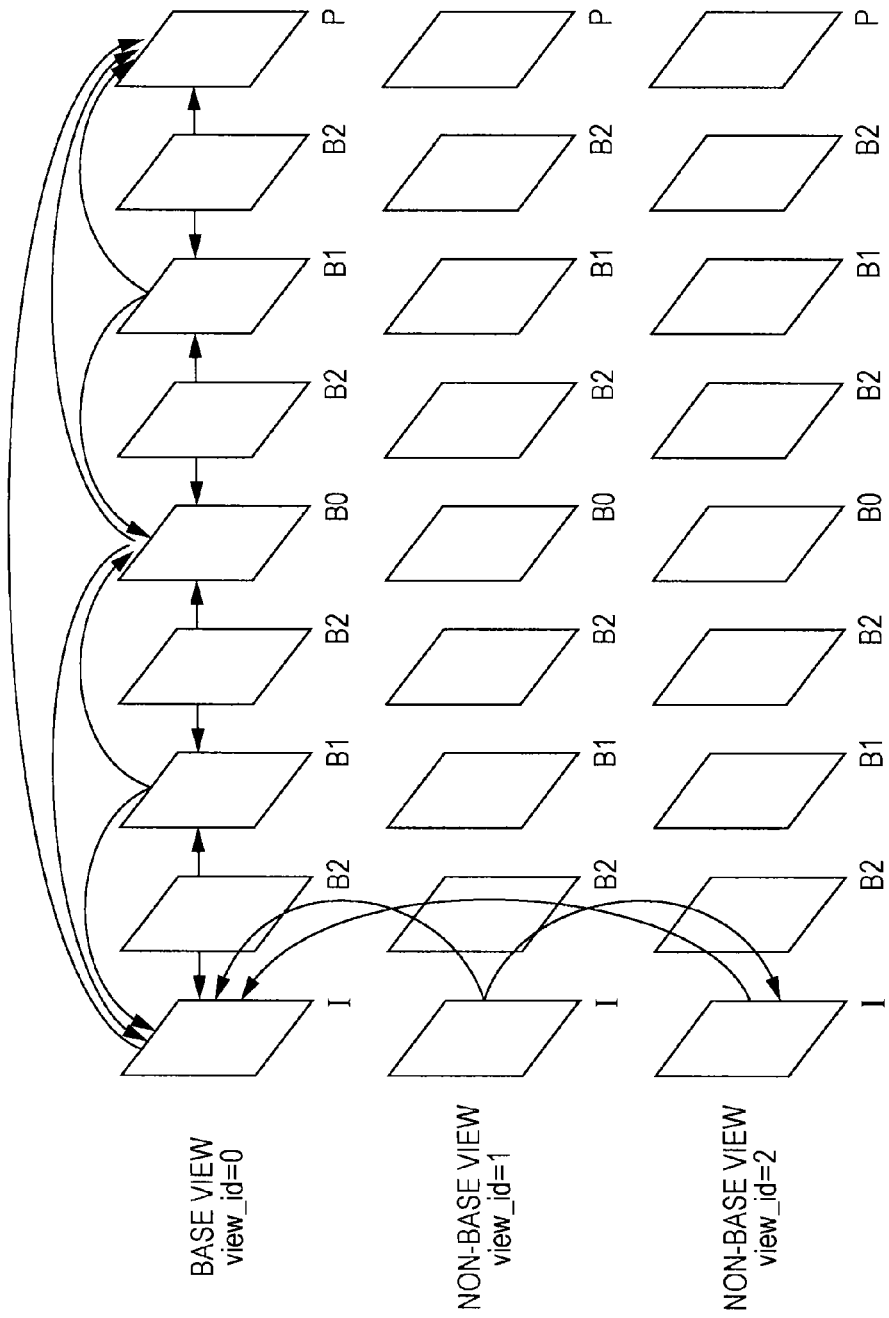
FIG. 56 is a diagram illustrating an example of a multi-view image encoding scheme.

The series of processes described above may be applied to multi-view image encoding and multi-view image decoding. FIG. 56 illustrates an example of a multi-view image encoding scheme.

As illustrated in FIG. 56, a multi-view image includes pictures of a plurality of views, and a picture of a certain view among the plurality of views is designated as a base-view picture. The pictures of the individual views other than the base-view picture are handled as non-base-view pictures.

In multi-view image encoding illustrated in FIG. 56, differences between quantization parameters may be taken in individual views (the same view).

(1) Base-View:

$$dQP(\text{base view}) = \text{Current}\_CU\_QP(\text{base view}) - LCU\_QP(\text{base view}) \quad (1\text{-}1)$$

$$dQP(\text{base view}) = \text{Current}\_CU\_QP(\text{base view}) - \text{Previous}\_CU\_QP(\text{base view}) \quad (1\text{-}2)$$

$$dQP(\text{base view}) = \text{Current}\_CU\_QP(\text{base view}) - \text{Slice}\_QP(\text{base view}) \quad (1\text{-}3)$$

(2) Non-Base-View:

$$dQP(\text{non-base view}) = \text{Current}\_CU\_QP(\text{non-base view}) - LCU\_QP(\text{non-base view}) \quad (2\text{-}1)$$

$$dQP(\text{non-base view}) = \text{Current}QP(\text{non-base view}) - \text{Previous } QP(\text{non-base view}) \quad (2\text{-}2)$$

$$dQP(\text{non-base view}) = \text{Current}\_CU\_QP(\text{non-base view}) - \text{Slice}\_QP(\text{non-base view}) \quad (2\text{-}3)$$

In multi-view image encoding, differences between quantization parameters may be taken in individual views (different views).

(3) Base-View/Non-Base View:

$$dQP(\text{inter-view}) = \text{Slice}\_QP(\text{base view}) - \text{Slice}\_QP(\text{non-base view}) \quad (3\text{-}1)$$

$$dQP(\text{inter-view}) = LCU\_QP(\text{base view}) - LCU\_QP(\text{non-base view}) \quad (3\text{-}2)$$

(4) Non-Base View/Non-Base View:

$$dQP(\text{inter-view}) = \text{Slice}\_QP(\text{non-base view } i) - \text{Slice}\_QP(\text{non-base view } j) \quad (4\text{-}1)$$

$$dQP(\text{inter-view}) = LCU\_QP(\text{non-base view } i) - LCU\_QP(\text{non-base view } j) \quad (4\text{-}2)$$

In this case, the items (1) to (4) above may be used in combination. For example, in the non-base views, a technique (using 3-1 and 2-3 in combination) for taking a difference in quantization parameter between a base view and a non-base view on a slice level basis, and a technique (using 3-2 and 2-1 in combination) for taking a difference in quantization parameter between a base view and a non-base view on an LCU level basis may be used. Accordingly, repeatedly applying differences can increase coding efficiency even in multi-view encoding.

Similarly to the techniques described above, a flag identifying whether or not a dQP whose value is not 0 is present may be set for each dQP described above.

Multi-View Image Encoding Apparatus

Figure 57:
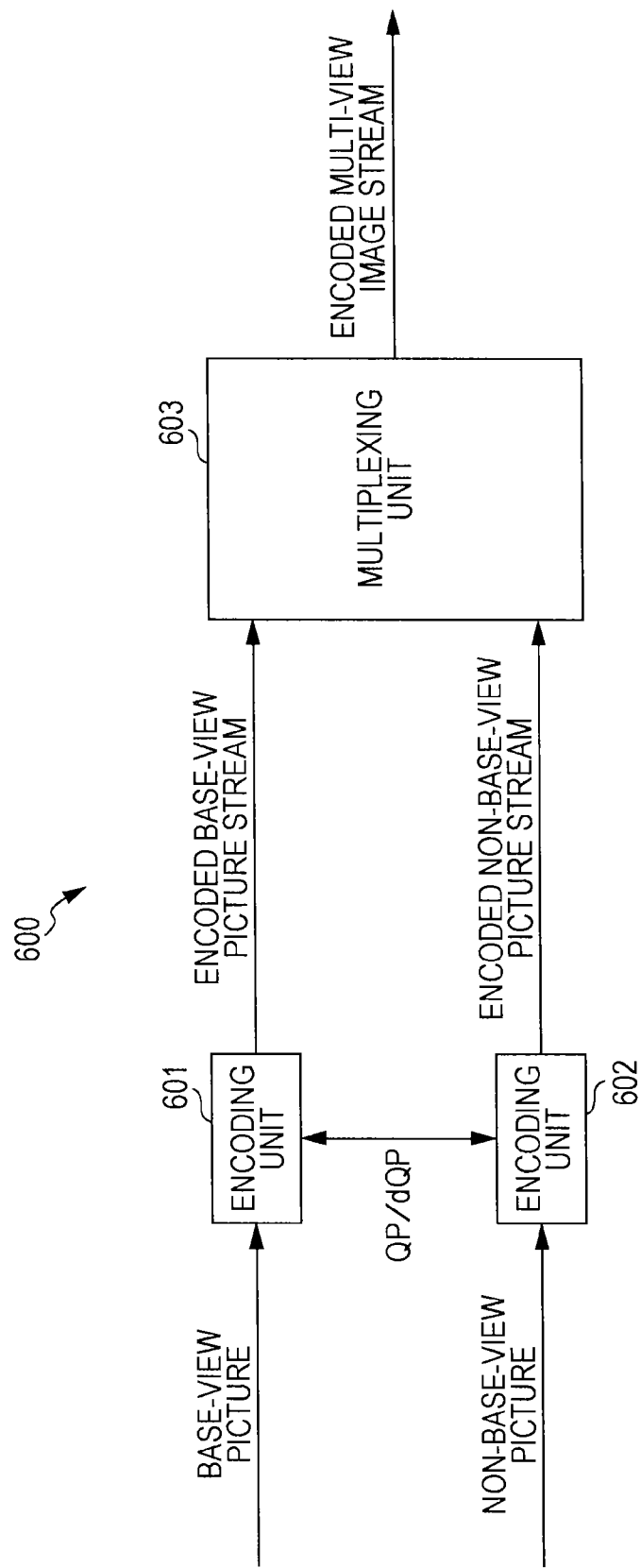
FIG. 57 is a diagram illustrating an example main configuration of a multi-view image encoding apparatus according to an embodiment of the present technology.

FIG. 57 is a diagram illustrating a multi-view image encoding apparatus 600 configured to perform the multi-view image encoding operation described above. As illustrated in FIG. 57, the multi-view image encoding apparatus 600 includes an encoding unit 601, an encoding unit 602, and a multiplexing unit 603.

The encoding unit 601 encodes base-view pictures to generate an encoded base-view picture stream. The encoding unit 602 encodes non-base-view pictures to generate an encoded non-base-view picture stream. The multiplexing unit 603 multiplexes the encoded base-view picture stream generated by the encoding unit 601 and the encoded non-base-view picture stream generated by the encoding unit 602 to generate an encoded multi-view image stream.

The encoding apparatus 10 (150, 190) may be used for each of the encoding unit 601 and the encoding unit 602 of the multi-view image encoding apparatus 600. In this case, the multi-view image encoding apparatus 600 sets a difference value between a quantization parameter set by the encoding unit 601 and a quantization parameter set by the encoding unit 602, and transmits the difference value.

Multi-View Image Decoding Apparatus

Figure 58:
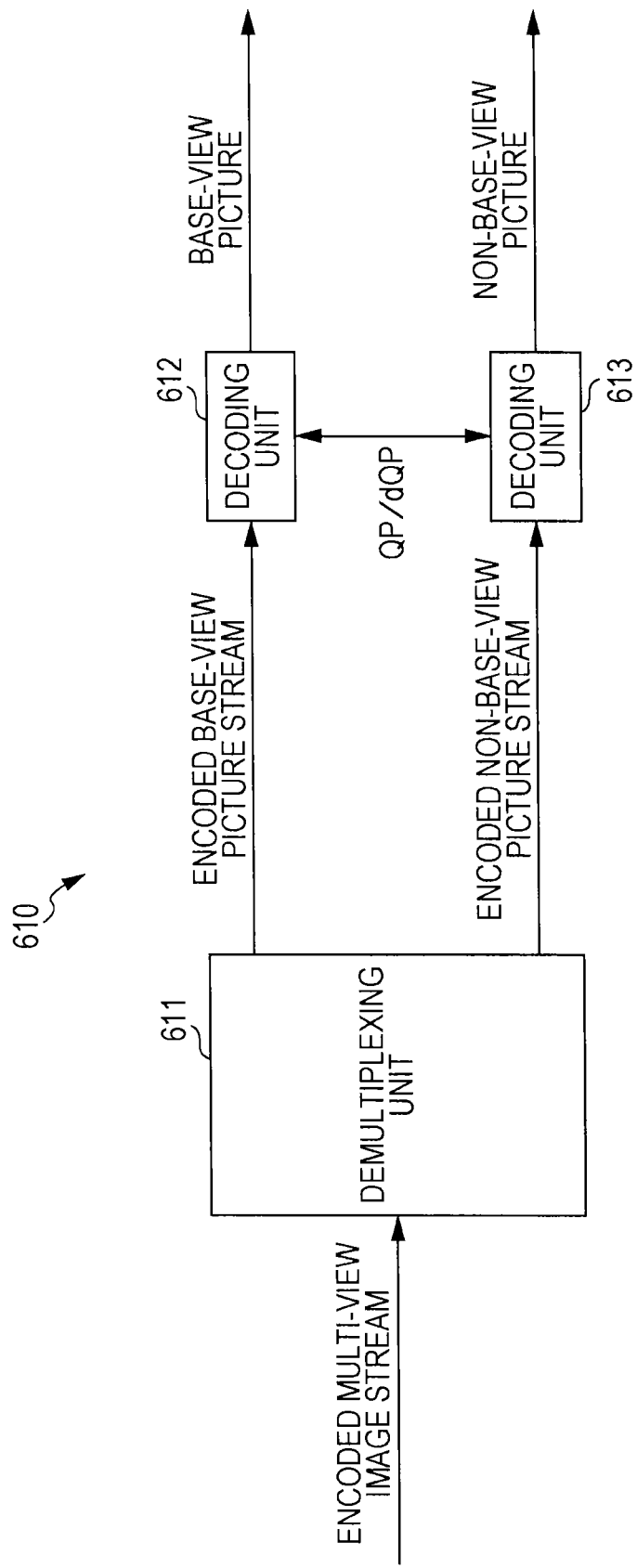
FIG. 58 is a diagram illustrating an example main configuration of a multi-view image decoding apparatus according to an embodiment of the present technology.

FIG. 58 is a diagram illustrating a multi-view image decoding apparatus 610 configured to perform the multi-view image decoding operation described above. As illustrated in FIG. 58, the multi-view image decoding apparatus 610 includes a demultiplexing unit 611, a decoding unit 612, and a decoding unit 613.

The demultiplexing unit 611 demultiplexes an encoded multi-view image stream in which an encoded base-view picture stream and an encoded non-base-view picture stream are multiplexed, and extracts the encoded base-view picture stream and the encoded non-base-view picture stream. The decoding unit 612 decodes the encoded base-view picture stream extracted by the demultiplexing unit 611 to obtain base-view pictures. The decoding unit 613 decodes the encoded non-base-view picture stream extracted by the demultiplexing unit 611 to obtain non-base-view pictures.

The decoding apparatus 110 (170, 210) may be used for each of the decoding unit 612 and the decoding unit 613 of the multi-view image decoding apparatus 610. In this case, the multi-view image decoding apparatus 610 sets a quantization parameter using a difference value between a quantization parameter set by the encoding unit 601 and a quantization parameter set by the encoding unit 602, and performs dequantization.

Application to Layered Image Encoding and Layered Image Decoding

Figure 59:
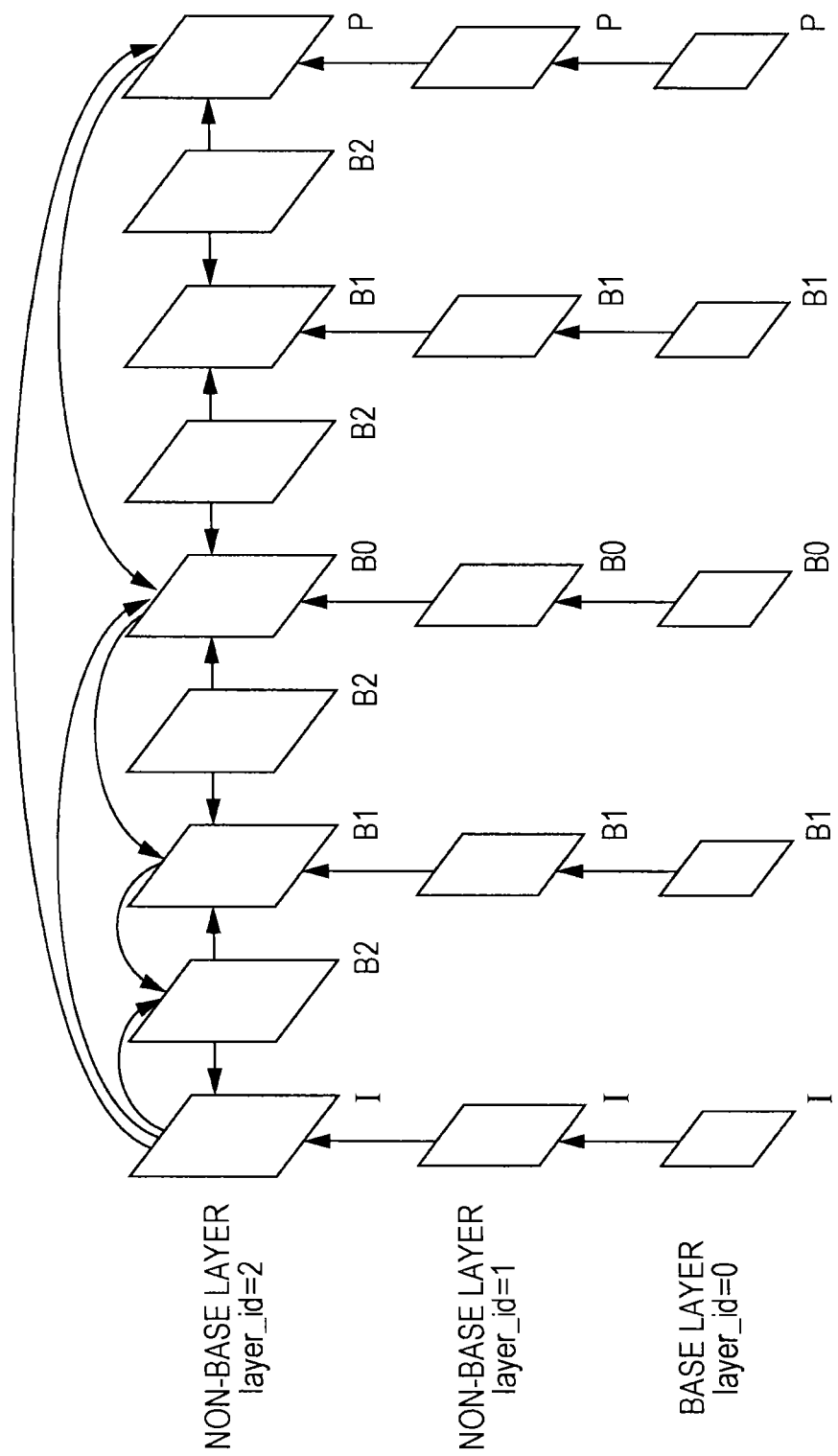
FIG. 59 is a diagram illustrating a layered image encoding scheme.

The series of processes described above may be applied to layered image encoding and layered image decoding. FIG. 59 illustrates an example of a layered image coding scheme.

As illustrated in FIG. 59, a layered image includes pictures in a plurality of layers (or resolutions), and a picture in a certain layer among the plurality of layers is designed as a base-layer picture. The pictures in the individual layers other than the base-layer picture are handled as non-base-layer pictures.

In layered image encoding (spatial scalability) illustrated in FIG. 59, differences between quantization parameters may be taken in individual layers (the same layer).

(1) Base-Layer:

$$dQP(\text{base layer}) = \text{Current}\_CU\_QP(\text{base layer}) - LCU\_QP(\text{base layer}) \quad (1\text{-}1)$$

$$dQP(\text{base layer}) = \text{Current}\_CU\_QP(\text{base layer}) - \text{Previous}\_CU\_QP(\text{base layer}) \quad (1\text{-}2)$$

$$dQP(\text{base layer}) = \text{Current}\_CU\_QP(\text{base layer}) - \text{Slice}\_QP(\text{base layer}) \quad (1\text{-}3)$$

(2) Non-Base-Layer:

$$dQP(\text{non-base layer}) = \text{Current}\_CU\_QP(\text{non-base layer}) - LCU\_QP(\text{non-base layer}) \quad (2\text{-}1)$$

$$dQP(\text{non-base layer}) = \text{Current}QP(\text{non-base layer}) - \text{Previous } QP(\text{non-base layer}) \quad (2\text{-}2)$$

$$dQP(\text{non-base layer}) = \text{Current}\_CU\_QP(\text{non-base layer}) - \text{Slice}\_QP(\text{non-base layer}) \quad (2\text{-}3)$$

In layered encoding, differences between quantization parameters may be taken in individual layers (different layers).

(3) Base-Layer/Non-Base Layer:

$$dQP(\text{inter-layer}) = \text{Slice\_}QP(\text{base layer}) - \text{Slice\_}QP(\text{non-base layer}) \quad (3\text{-}1)$$

$$dQP(\text{inter-layer}) = LCU\_QP(\text{base layer}) - LCU\_QP(\text{non-base layer}) \quad (3\text{-}2)$$

(4) Non-Base Layer/Non-Base Layer:

$$dQP(\text{inter-layer}) = \text{Slice\_}QP(\text{non-base layer } i) - \text{Slice\_}QP(\text{non-base layer } j) \quad (4\text{-}1)$$

$$dQP(\text{inter-layer}) = LCU\_QP(\text{non-base layer } i) - LCU\_QP(\text{non-base layer } j) \quad (4\text{-}2)$$

In this case, the items (1) to (4) above may be used in combination. For example, in the non-base layers, a technique (using 3-1 and 2-3 in combination) for taking a difference in quantization parameter between a base layer and a non-base layer on a slice level basis, and a technique (using 3-2 and 2-1 in combination) for taking a difference in quantization parameter between a base layer and a non-base layer on an LCU level basis may be used. Accordingly, repeatedly applying differences can increase coding efficiency even in layered encoding.

Similarly to the techniques described above, a flag identifying whether or not a dQP whose value is not 0 is present may be set for each dQP described above.

Layered Image Encoding Apparatus

Figure 60:
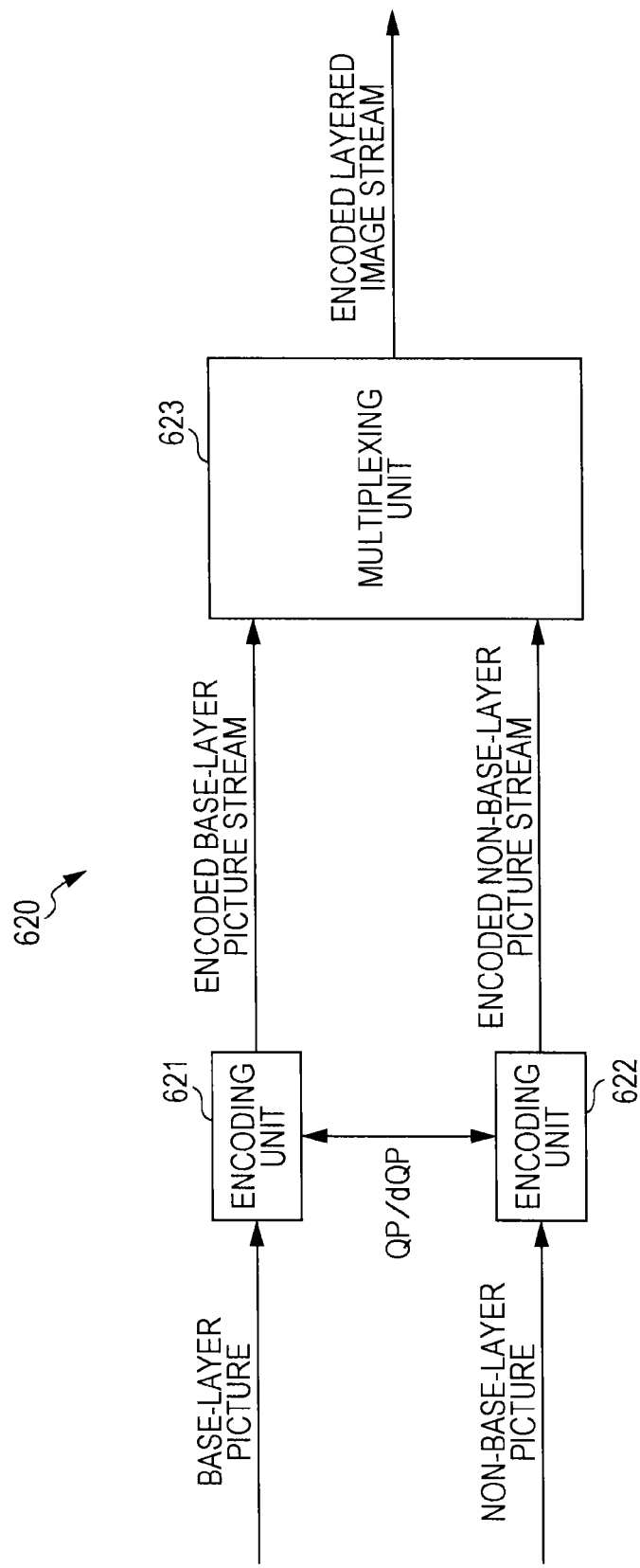
FIG. 60 is a diagram illustrating an example main configuration of a layered image encoding apparatus according to an embodiment of the present technology.

FIG. 60 is a diagram illustrating a layered image encoding apparatus 620 configured to perform the layered image encoding operation described above. As illustrated in FIG. 60, the layered image encoding apparatus 620 includes an encoding unit 621, an encoding unit 622, and a multiplexing unit 623.

The encoding unit 621 encodes base-layer pictures to generate an encoded base-layer picture stream. The encoding unit 622 encodes non-base-layer pictures to generate an encoded non-base-layer picture stream. The multiplexing unit 623 multiplexes the encoded base-layer picture stream generated by the encoding unit 621 and the encoded non-base-layer picture stream generated by the encoding unit 622 to generate an encoded layered image stream.

The encoding apparatus 10 (150, 190) may be used for each of the encoding unit 621 and the encoding unit 622 of the layered image encoding apparatus 620. In this case, the layered image encoding apparatus 620 sets a difference value between a quantization parameter set by the encoding unit 621 and a quantization parameter set by the encoding unit 622, and transmits the difference value.

Layered Image Decoding Apparatus

Figure 61:
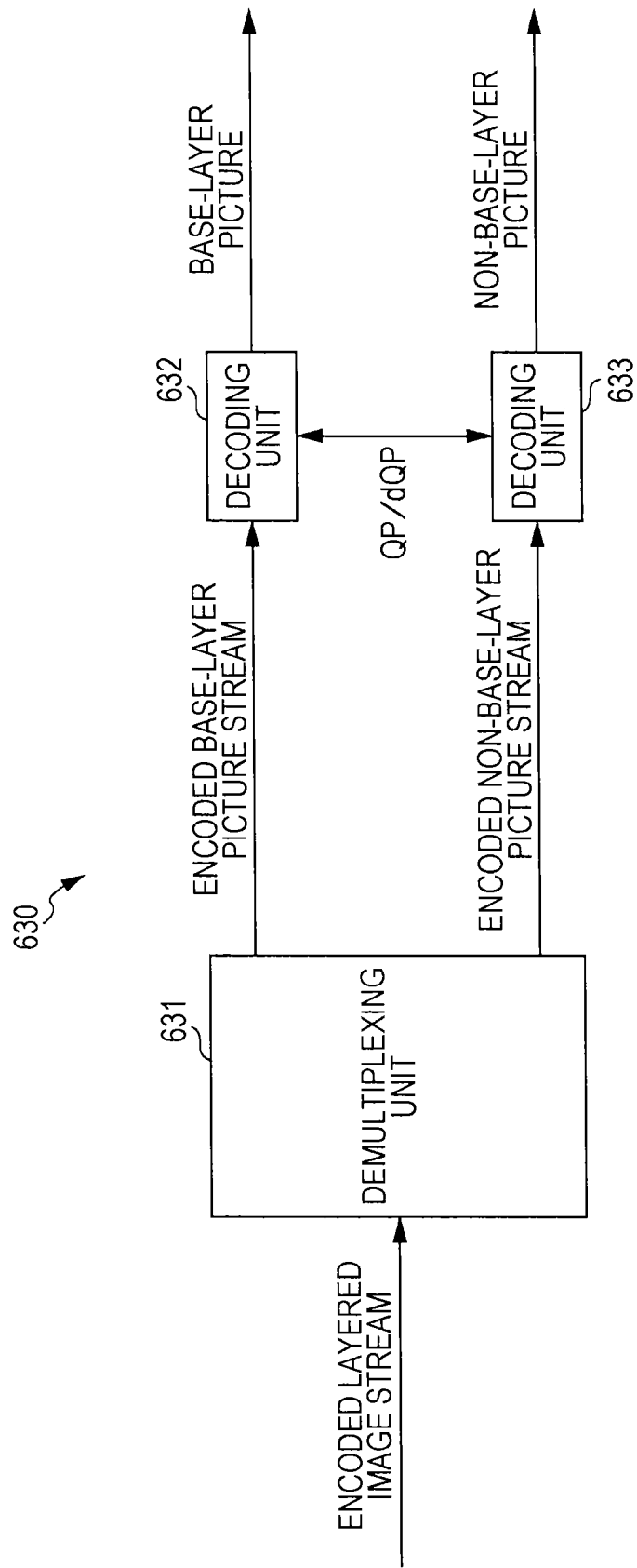
FIG. 61 is a diagram illustrating an example main configuration of a layered image decoding apparatus according to an embodiment of the present technology.

FIG. 61 is a diagram illustrating a layered image decoding apparatus 630 configured to perform the layered image decoding operation described above. As illustrated in FIG. 61, the layered image decoding apparatus 630 includes a demultiplexing unit 631, a decoding unit 632, and a decoding unit 633.

The demultiplexing unit 631 demultiplexes an encoded layered image stream in which an encoded base-layer picture stream and an encoded non-base-layer picture stream are multiplexed, and extracts the encoded base-layer picture stream and the encoded non-base-layer picture stream. The decoding unit 632 decodes the encoded base-layer picture stream extracted by the demultiplexing unit 631 to obtain base-layer pictures. The decoding unit 633 decodes the encoded non-base-layer picture stream extracted by the demultiplexing unit 631 to obtain non-base-layer pictures.

The decoding apparatus 110 (170, 210) may be used for each of the decoding unit 632 and the decoding unit 633 of the layered image decoding apparatus 630. In this case, the layered image decoding apparatus 630 sets a quantization parameter using a difference value between a quantization parameter set by the encoding unit 621 and a quantization parameter set by the encoding unit 622, and performs dequantization.

Computer According to Embodiment of Present Technology

The series of processes described above may be executed by hardware or software. If the series of processes is executed by software, a program constituting the software is installed into a computer. Examples of the computer include a computer incorporated in dedicated hardware, and a computer capable of executing various functions by installing various programs therein, such as a general-purpose personal computer.

Figure 62:
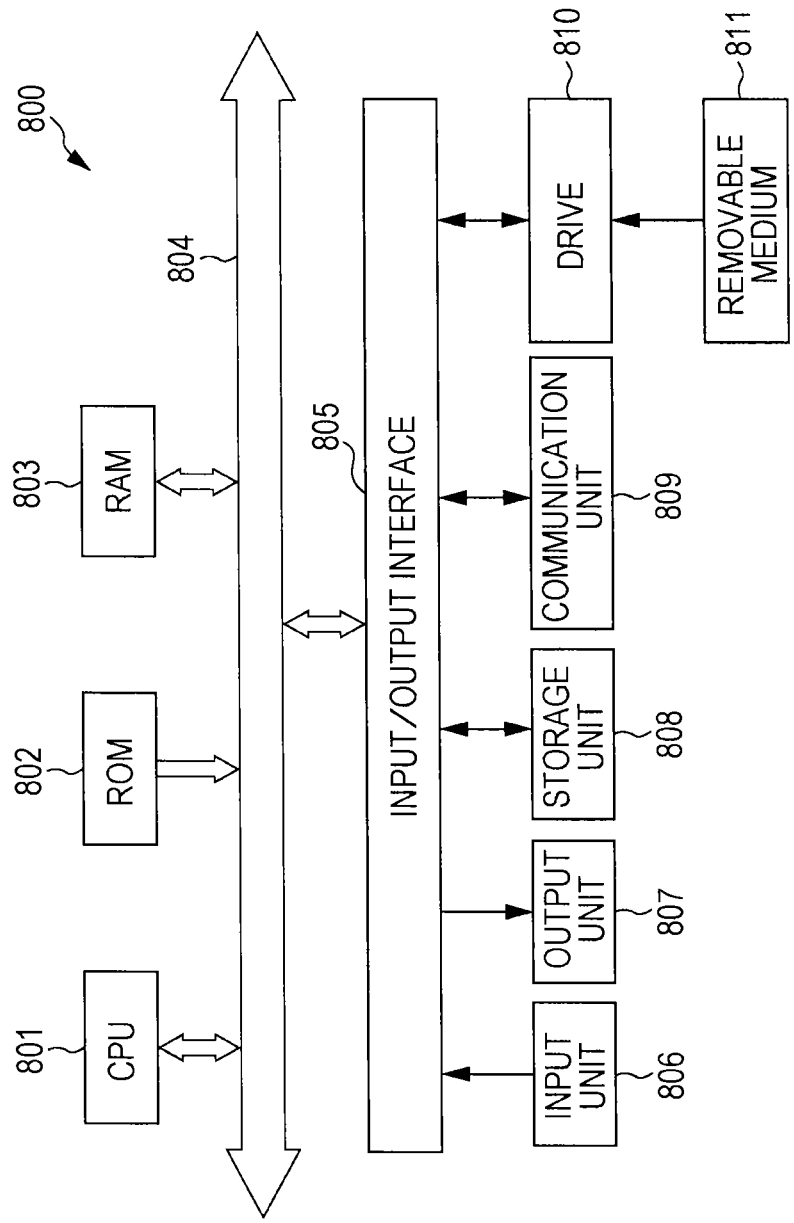
FIG. 62 is a block diagram illustrating an example configuration of hardware of a computer.

FIG. 62 is a block diagram illustrating an example configuration of hardware of a computer 800 configured to execute the series of processes described above in accordance with a program.

In the computer 800, a central processing unit (CPU) 801, a read only memory (ROM) 802, and a random access memory (RAM) 803 are connected to one another via a bus 804.

An input/output interface 805 is also connected to the bus 804. The input/output interface 805 is connected to an input unit 806, an output unit 807, a storage unit 808, a communication unit 809, and a drive 810.

The input unit 806 includes a keyboard, a mouse, a microphone, and the like. The output unit 807 includes a display, a speaker, and the like. The storage unit 808 includes a hard disk, a non-volatile memory, and the like. The communication unit 809 includes a network interface and the like. The drive 810 drives a removable medium 811 such as a magnetic disk, an optical disk, a magneto-optical disk, or a semiconductor memory.

In the computer 800 having the configuration described above, the CPU 801 may load, for example, a program stored in the storage unit 808 into the RAM 803 via the input/output interface 805 and the bus 804, and execute the program, thereby performing the series of processes described above.

The program executed by the computer 800 (or CPU 801) may be provided by being recorded in, for example, the removable medium 811, which may be used as a package medium or the like. The program may also be provided via a wired or wireless transmission medium such as a local area network (LAN), the Internet, or digital satellite broadcasting.

In the computer 800, the program may be installed into the storage unit 808 via the input/output interface 805 in response to the setting of the removable medium 811 in the drive 810. The program may also be received by the communication unit 809 via a wired or wireless transmission medium, and installed into the storage unit 808. Alternatively, the program may be installed into the ROM 802 or the storage unit 808 in advance.

The program executed by the computer 800 may be a program according to which the processes are performed in chronological order as described herein, or may be a program according to which the processes are performed in parallel or at some desired timing such as when it is called.

Example Configuration of Television Apparatus

Figure 63:
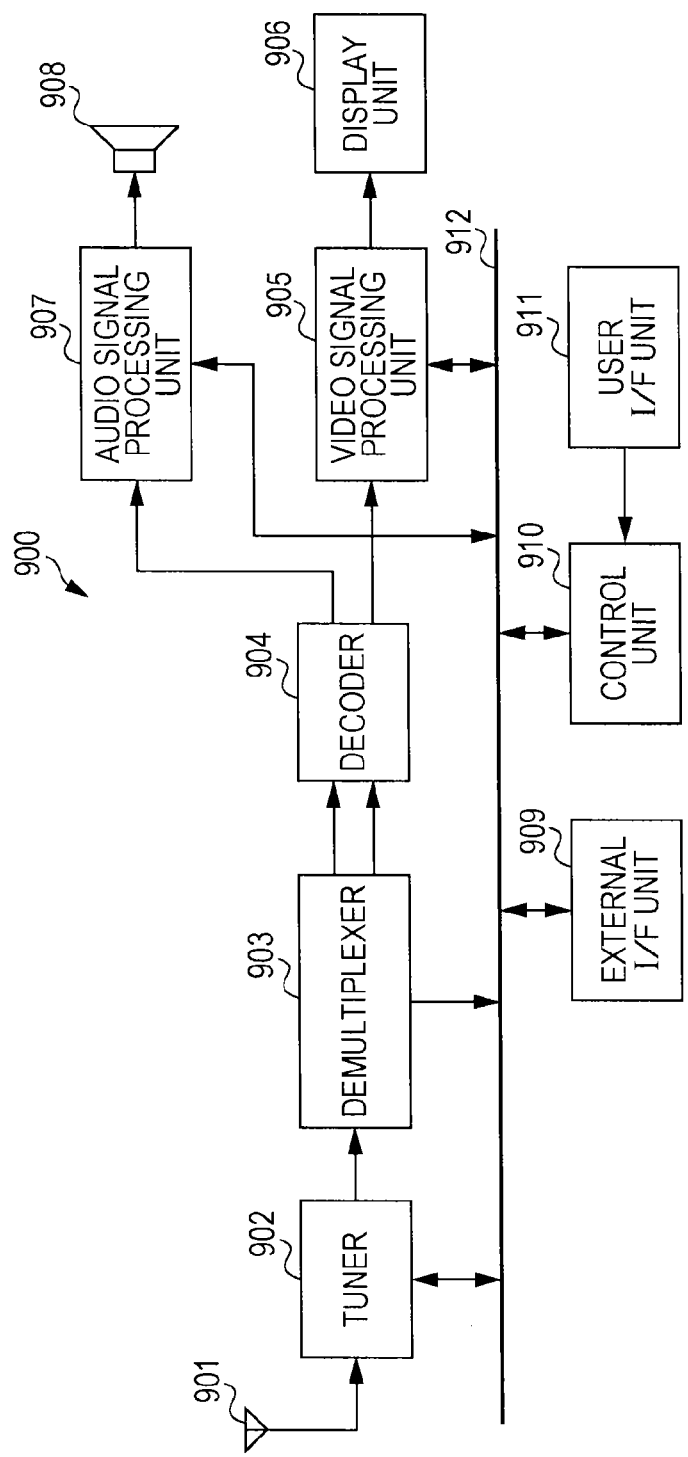
FIG. 63 is a diagram illustrating an exemplary schematic configuration of a television apparatus according to an embodiment of the present technology.

FIG. 63 illustrates an exemplary schematic configuration of a television apparatus 900 according to an embodiment of the present technology. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910, a user interface unit 911, and so forth.

The tuner 902 selects a desired channel using broadcast wave signals received by the antenna 901, and obtains an encoded bit stream through demodulation. The tuner 902 outputs the obtained encoded bit stream to the demultiplexer 903.

The demultiplexer 903 extracts video and audio packets carrying a program to be viewed from the encoded bit stream, and outputs data of the extracted packets to the decoder 904. The demultiplexer 903 further supplies packets of data such as electronic program guide (EPG) to the control unit 910. Scrambled content is descrambled by the demultiplexer 903 or any other suitable component.

The decoder 904 performs a decoding process on the packets to generate video data and audio data, and outputs the video data to the video signal processing unit 905 and the audio data to the audio signal processing unit 907.

The video signal processing unit 905 performs noise removal (or at least reduction), video processing according to the user settings, and the like on the video data. The video signal processing unit 905 generates video data of a program to be displayed on the display unit 906, image data according to a process based on the application supplied via a network, and any other suitable data. The video signal processing unit 905 also generates video data for displaying a menu screen used for the selection of an item and the like, and superimposes the generated video data on the video data of the program. The video signal processing unit 905 generates a drive signal on the basis of the video data generated in the manner described above to drive the display unit 906.

The display unit 906 drives a display device (such as a liquid crystal display element) in accordance with the drive signal supplied from the video signal processing unit 905 to display video or the like of the program.

The audio signal processing unit 907 performs a certain process such as noise removal (or at least reduction) on the audio data, and performs a D/A conversion process and an amplification process on the audio data obtained after the process. The audio signal processing unit 907 supplies the resulting audio data to the speaker 908, thereby providing audio output.

The external interface unit 909 is an interface to be connected to an external device or a network, and transmits and receives data such as video data and audio data.

The user interface unit 911 is connected to the control unit 910. The user interface unit 911 includes an operation switch, a remote control signal receiving unit, and so forth, and supplies an operation signal according to a user operation to the control unit 910.

The control unit 910 includes a CPU, a memory, and so forth. The memory stores a program executed by the CPU, various data necessary for the CPU to perform processes, EPG data, data acquired over a network, and any other desired data. The program stored in the memory is read and executed by the CPU at some certain timing such as when the television apparatus 900 is activated. The CPU executes a program, thereby controlling the individual units so that the television apparatus 900 performs an operation in accordance with a user operation.

The television apparatus 900 includes a bus 912 for connecting the tuner 902, the demultiplexer 903, the video signal processing unit 905, the audio signal processing unit 907, the external interface unit 909, and so forth to the control unit 910.

In the television apparatus 900 having the configuration described above, the decoder 904 is provided with the functions of a decoding apparatus (decoding method) according to an embodiment of the present disclosure. Thus, an encoded stream with a reduced amount of information concerning information specifying a reference picture can be decoded.

Example Configuration of Mobile Phone

Figure 64:
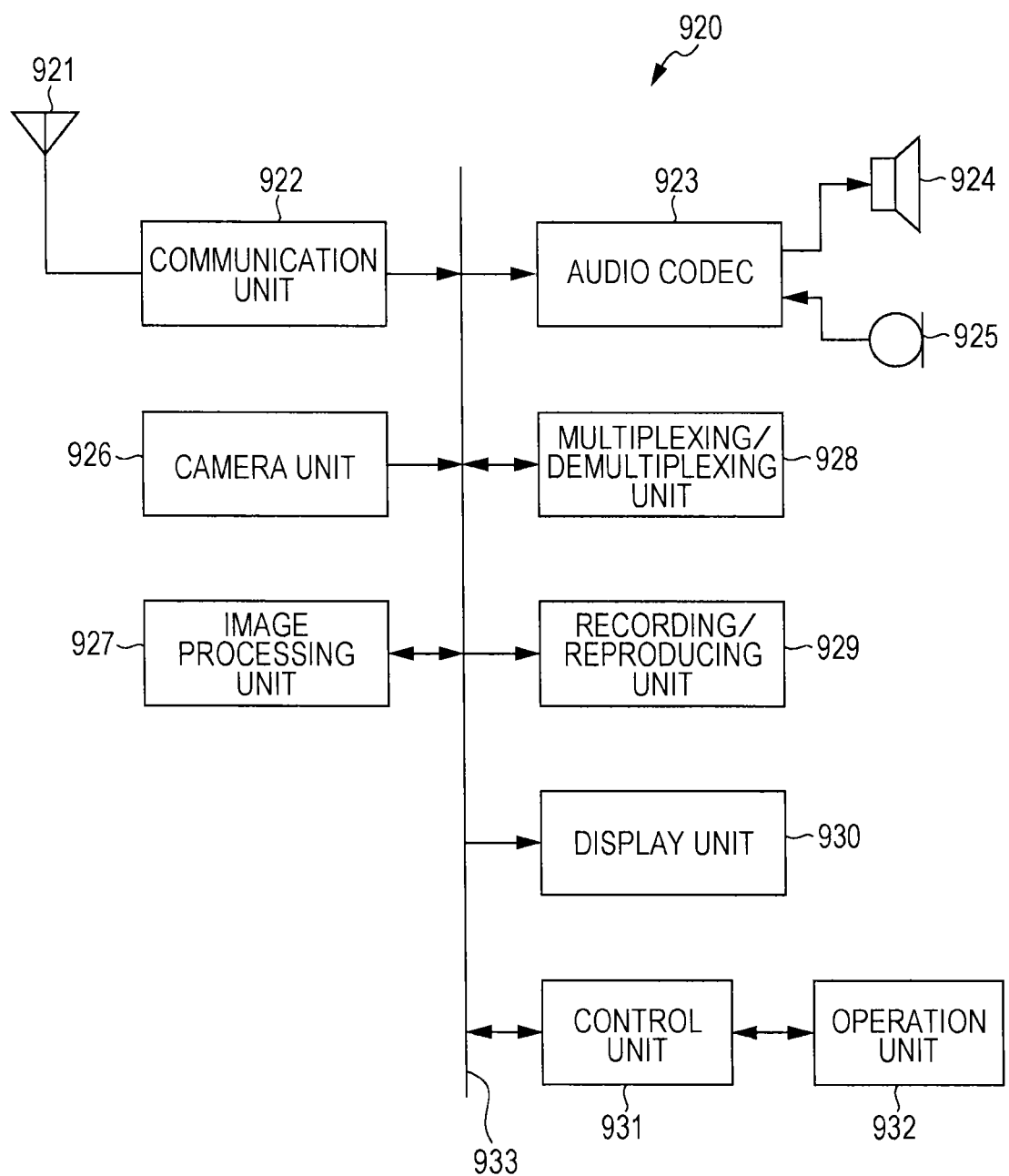
FIG. 64 is a diagram illustrating an exemplary schematic configuration of a mobile phone according to an embodiment of the present technology.

FIG. 64 illustrates an exemplary schematic configuration of a mobile phone 920 according to an embodiment of the present technology. The mobile phone 920 includes a communication unit 922, an audio codec 923, a camera unit 926, an image processing unit 927, a multiplexing/demultiplexing unit 928, a recording/reproducing unit 929, a display unit 930, and a control unit 931. These components are connected to one another via a bus 933.

An antenna 921 is connected to the communication unit 922, and a speaker 924 and a microphone 925 are connected to the audio codec 923. Further, an operation unit 932 is connected to the control unit 931.

The mobile phone 920 performs various operations such as transmission and reception of audio signals, transmission and reception of electronic mails and image data, capturing of images, and recording of data in various modes such as a speech conversation mode and a data communication mode.

In the speech conversation mode, audio signals generated by the microphone 925 are converted into audio data and subjected to data compression by the audio codec 923, and the resulting audio data is supplied to the communication unit 922. The communication unit 922 performs processes such as a modulation process and a frequency conversion process on the audio data to generate transmission signals. The communication unit 922 supplies the transmission signals to the antenna 921 to transmit the transmission signals to a base station (not illustrated). Further, the communication unit 922 performs processes such as amplification, a frequency conversion process, and a demodulation process, on reception signals received by the antenna 921, and supplies the obtained audio data to the audio codec 923. The audio codec 923 expands the audio data and converts the audio data into analog audio signals, and outputs the resulting signals to the speaker 924.

In the case of mail transmission in the data communication mode, the control unit 931 receives text data input in response to an operation of the operation unit 932, and displays the input text on the display unit 930. Further, the control unit 931 generates electronic mail data in accordance with a user instruction or the like made with the operation unit 932, and supplies the generated electronic mail data to the communication unit 922. The communication unit 922 performs processes such as a modulation process and a frequency conversion process on the electronic mail data, and transmits the obtained transmission signals from the antenna 921. The communication unit 922 further performs processes such as amplification, a frequency conversion process, and a demodulation process on the reception signals received by the antenna 921 to restore electronic mail data. The electronic mail data is supplied to the display unit 930 to display the content of the electronic mail.

The mobile phone 920 may also be configured to store received electronic mail data in a storage medium by using the recording/reproducing unit 929. The storage medium may be any rewritable storage medium. Examples of the storage medium include a RAM, a semiconductor memory such as a built-in flash memory, a hard disk, and a removable medium such as a magnetic disk, a magneto-optical disk, an optical disk, a universal serial bus (USB) memory, or a memory card.

In the case of the transmission of image data in the data communication mode, image data generated by the camera unit 926 is supplied to the image processing unit 927. The image processing unit 927 performs an encoding process on the image data to generate encoded data.

The multiplexing/demultiplexing unit 928 multiplexes the encoded data generated by the image processing unit 927 and the audio data supplied from the audio codec 923 using a certain scheme, and supplies the resulting data to the communication unit 922. The communication unit 922 performs processes such as a modulation process and a frequency conversion process on the multiplexed data to obtain transmission signals, and transmits the transmission signals from the antenna 921. Further, the communication unit 922 performs processes such as amplification, a frequency conversion process, and a demodulation process on the reception signals received by the antenna 921 to restore multiplexed data. The restored multiplexed data is supplied to the multiplexing/demultiplexing unit 928. The multiplexing/demultiplexing unit 928 demultiplexes the multiplexed data to obtain encoded data and audio data, and supplies the encoded data to the image processing unit 927 and the audio data to the audio codec 923. The image processing unit 927 performs a decoding process on the encoded data to generate image data. The image data is supplied to the display unit 930 to display a received image. The audio codec 923 converts the audio data into analog audio signals, and supplies the analog audio signals to the speaker 924, thereby outputting received audio.

In the mobile phone 920 having the configuration described above, the image processing unit 927 is provided with the functions of an encoding apparatus and a decoding apparatus (encoding method and decoding method) according to an embodiment of the present disclosure. Thus, an encoded stream with a reduced amount of information concerning information specifying a reference picture can be decoded.

Example Configuration of Recording/Reproducing Apparatus

Figure 65:
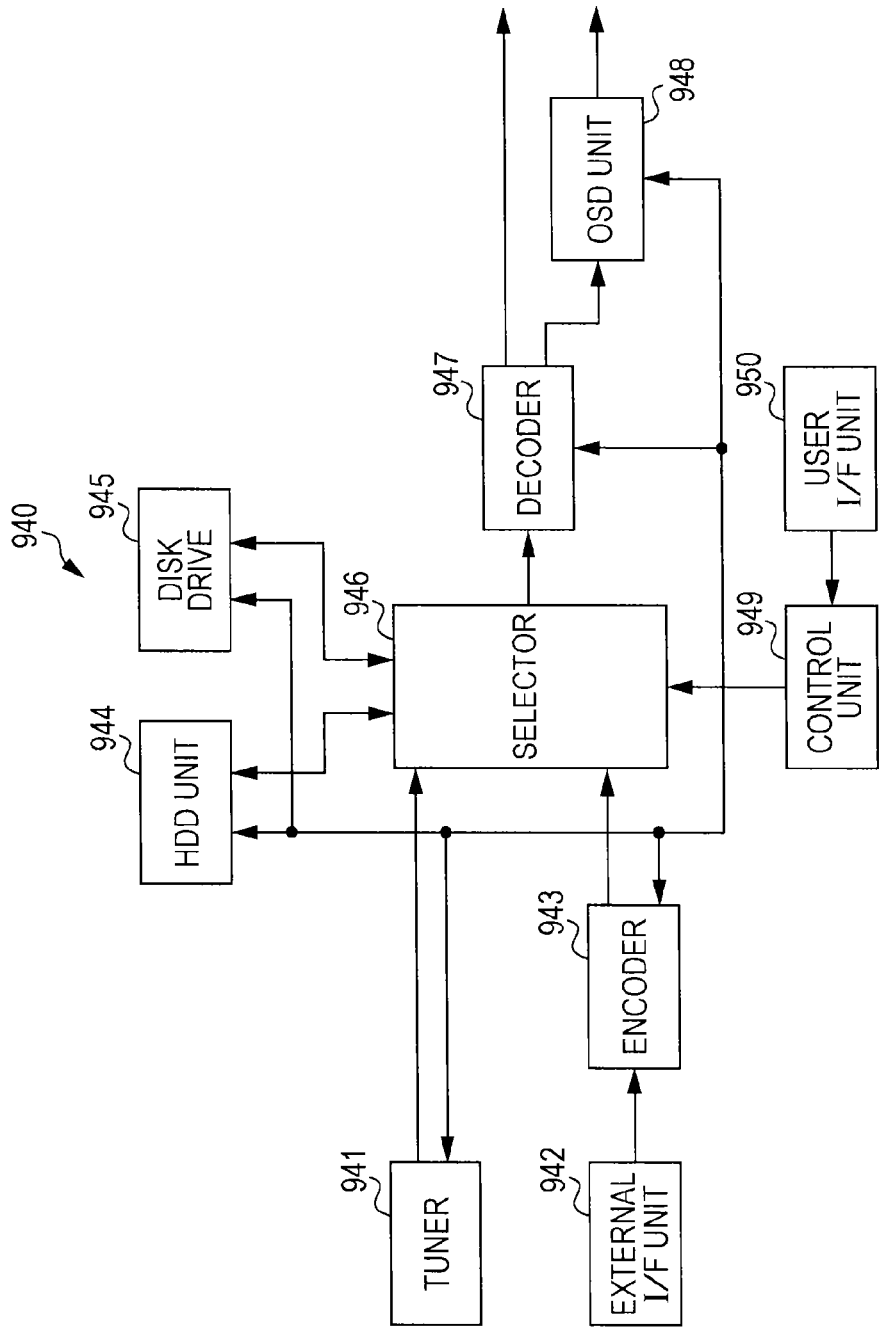
FIG. 65 is a diagram illustrating an exemplary schematic configuration of a recording/reproducing apparatus according to an embodiment of the present technology.

FIG. 65 illustrates an exemplary schematic configuration of a recording/reproducing apparatus 940 according to an embodiment of the present technology. The recording/reproducing apparatus 940 is configured to record, for example, audio data and video data of a received broadcast program on a recording medium and provide the recorded data to a user at some timing in accordance with an instruction made by the user. The recording/reproducing apparatus 940 may also be configured to, for example, acquire audio data and video data from other devices and record the audio data and video data on a recording medium. The recording/reproducing apparatus 940 may also be configured to decode and output audio data and video data recorded on a recording medium, thereby allowing a monitoring device or the like to display an image or output audio.

The recording/reproducing apparatus 940 includes a tuner 941, an external interface unit 942, an encoder 943, a hard disk drive (HDD) unit 944, a disk drive 945, a selector 946, a decoder 947, an on-screen display (OSD) unit 948, a control unit 949, and a user interface unit 950.

The tuner 941 selects a desired channel from broadcasting signals received by an antenna (not illustrated). The tuner 941 demodulates the reception signals of the desired channel to obtain an encoded bit stream, and outputs the encoded bit stream to the selector 946.

The external interface unit 942 includes at least one of an Institute of Electrical and Electronics Engineers (IEEE) 1394 interface, a network interface unit, a USB interface, and a flash memory interface. The external interface unit 942 may be an interface to be connected to an external device, a network, a memory card, and the like, and is configured to receive data to be recorded, such as video data and audio data.

The encoder 943 encodes the video data and audio data supplied from the external interface unit 942, if they are unencoded, using a certain scheme, and outputs an encoded bit stream to the selector 946.

The HDD unit 944 records content data such as video and audio, various programs, other data, and so forth on a built-in hard disk, and reads them from the hard disk for, for example, reproduction.

The disk drive 945 records and reproduces signals onto and from an optical disk set therein. Examples of the optical disk include a digital versatile disc (DVD) (such as DVD-Video, DVD-RAM, DVD-R, DVD-RW, DVD+R, or DVD+RW), and a Blu-ray disc (registered trademark).

The selector 946 selects an encoded bit stream from one of the tuner 941 and the encoder 943 when recording video and audio, and supplies the selected bit stream to one of the HDD unit 944 and the disk drive 945. When reproducing video and audio, the selector 946 supplies an encoded bit stream output from the HDD unit 944 or the disk drive 945 to the decoder 947.

The decoder 947 performs a decoding process on the encoded bit stream. The decoder 947 supplies video data generated through the decoding process to the OSD unit 948. The decoder 947 further outputs audio data generated through the decoding process.

The OSD unit 948 generates video data for displaying a menu screen used for the selection of an item, and outputs the generated video data after superimposing it onto the video data output from the decoder 947.

The user interface unit 950 is connected to the control unit 949. The user interface unit 950 includes an operation switch, a remote control signal receiving unit, and so forth, and supplies operation signals according to a user operation to the control unit 949.

The control unit 949 includes a CPU, a memory, and so forth. The memory stores a program executed by the CPU, and various data necessary for the CPU to perform processes. The program stored in the memory is read and executed by the CPU at some certain timing such as when the recording/reproducing apparatus 940 is activated. The CPU executes a program, thereby controlling the individual units so that the recording/reproducing apparatus 940 performs an operation in accordance with a user operation.

In the recording/reproducing apparatus 940 having the configuration described above, the decoder 947 is provided with the functions of a decoding apparatus (decoding method) according to an embodiment of the present disclosure. Thus, an encoded stream with a reduced amount of information concerning information specifying a reference picture can be decoded.

Example Configuration of Image Capturing Apparatus

Figure 66:
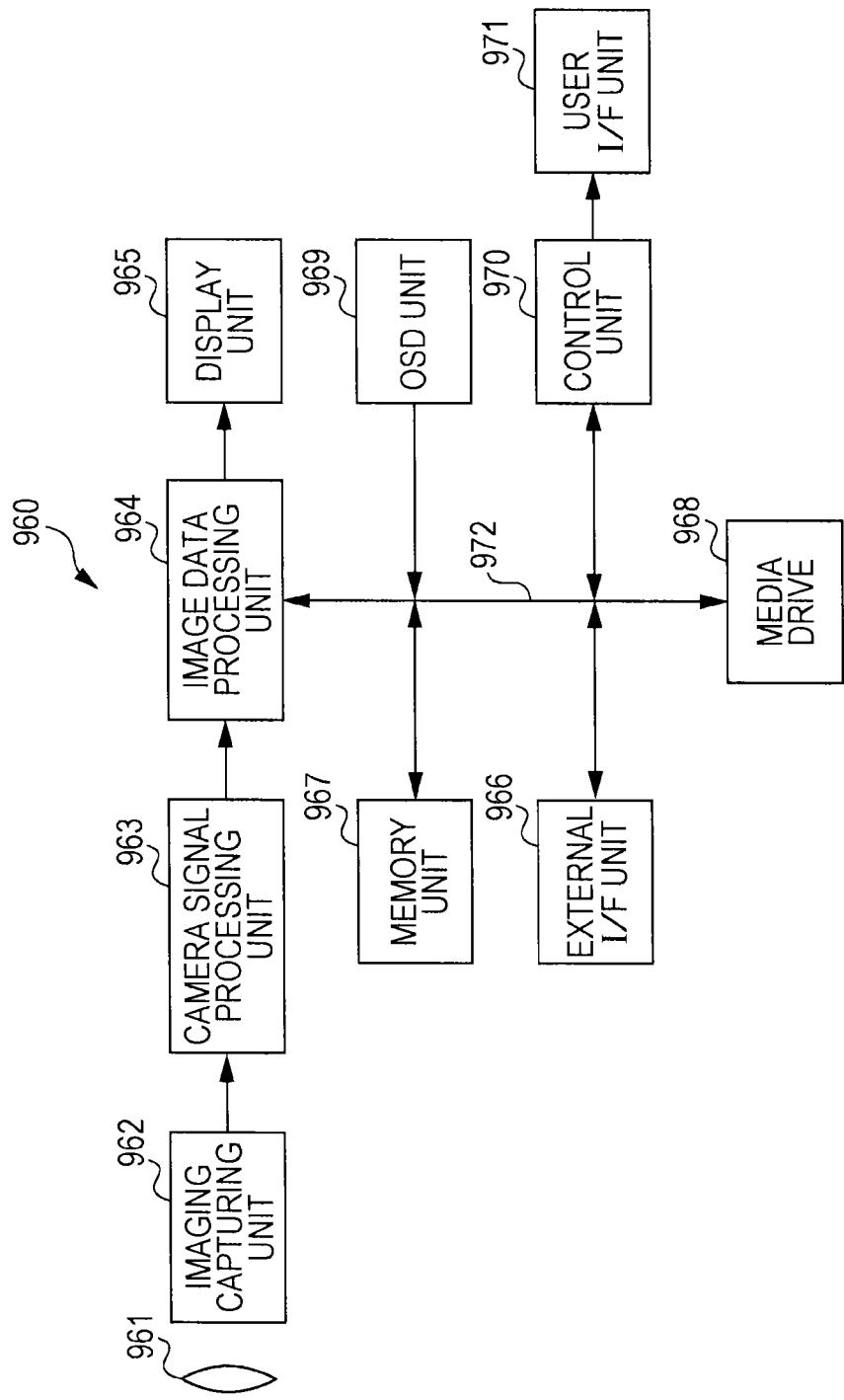
FIG. 66 is a diagram illustrating an exemplary schematic configuration of an image capturing apparatus according to an embodiment of the present technology.

FIG. 66 illustrates an exemplary schematic configuration of an image capturing apparatus 960 according to an embodiment of the present technology. The image capturing apparatus 960 is configured to capture an image of a subject and display the image of the subject on a display unit or record it on a recording medium as image data.

The image capturing apparatus 960 includes an optical block 961, an image capturing unit 962, a camera signal processing unit 963, an image data processing unit 964, a display unit 965, an external interface unit 966, a memory unit 967, a media drive 968, an OSD unit 969, and a control unit

970. A user interface unit 971 is connected to the control unit 970. The image data processing unit 964, the external interface unit 966, the memory unit 967, the media drive 968, the OSD unit 969, the control unit 970, and so forth are connected via a bus 972.

The optical block 961 includes a focus lens, an aperture mechanism, and so forth. The optical block 961 forms an optical image of the subject on an imaging surface of the image capturing unit 962. The image capturing unit 962 includes an image sensor such as a charge-coupled device (CCD) or complementary metal oxide semiconductor (CMOS) image sensor. The image capturing unit 962 performs photoelectric conversion to generate electrical signals corresponding to an optical image, and supplies the generated electrical signals to the camera signal processing unit 963.

The camera signal processing unit 963 performs a variety of camera signal processing operations, such as knee correction, gamma correction, and color correction, on the electrical signals supplied from the image capturing unit 962. The camera signal processing unit 963 supplies the image data subjected to camera signal processing to the image data processing unit 964.

The image data processing unit 964 performs an encoding process on the image data supplied from the camera signal processing unit 963. The image data processing unit 964 supplies encoded data generated through the encoding process to the external interface unit 966 or the media drive 968. The image data processing unit 964 further performs a decoding process on the encoded data supplied from the external interface unit 966 or the media drive 968. The image data processing unit 964 supplies the image data generated through the decoding process to the display unit 965. Further, the image data processing unit 964 supplies the image data supplied from the camera signal processing unit 963 to the display unit 965, and supplies display data acquired from the OSD unit 969 to the display unit 965 after superimposing the display data onto image data.

The OSD unit 969 generates display data such as a menu screen including signs, text, and drawings and icons, and outputs the generated display data to the image data processing unit 964.

The external interface unit 966 includes, for example, a USB input/output terminal, and is connected to a printer to print an image. A drive is connected to the external interface unit 966, if necessary, and a removable medium such as a magnetic disk or an optical disk is set as desired, so that a computer program read from the removable medium is installed, if necessary. Further, the external interface unit 966 has a network interface to be connected to a certain network such as a LAN or the Internet. The control unit 970 is configured to read encoded data from the media drive 968 in accordance with, for example, an instruction given from the user interface unit 971, and supply the read encoded data to another device connected via a network from the external interface unit 966. The control unit 970 is also configured to acquire encoded data and image data supplied from another device over a network via the external interface unit 966, and supply the acquired data to the image data processing unit 964.

Examples of the recording medium which may be driven by the media drive 968 include a computer-readable/writable removable medium such as a magnetic disk, a magneto-optical disk, an optical disk, or a semiconductor memory. The recording medium may be of any type of removable medium, and may be a tape device, a disc, or a memory card. The recording medium may also be a contactless integrated circuit (IC) card or the like.

The media drive 968 and a recording medium may be integrally formed into a single unit, which is implemented as, for example, a non-transportable storage medium such as built-in hard disk drive or a solid state drive (SSD).

The control unit 970 includes a CPU. The memory unit 967 stores a program executed by the control unit 970, various data necessary for the control unit 970 to perform processes, and any other desired data. The program stored in the memory unit 967 is read and executed by the control unit 970 at some certain timing such as when the image capturing apparatus 960 is activated. The control unit 970 executes a program, thereby controlling the individual units so that the image capturing apparatus 960 performs an operation in accordance with a user operation.

In the image capturing apparatus 960 having the configuration described above, the image data processing unit 964 is provided with the functions of an encoding apparatus and a decoding apparatus (encoding method and decoding method) according to an embodiment of the present disclosure. Thus, an encoded stream with a reduced amount of information concerning information specifying a reference picture can be decoded. In addition, an encoded stream with a reduced amount of information concerning information specifying a reference picture can be decoded.

Exemplary Application of Layered Coding

First System

Next, a specific example of use of scalable coded data which has been subjected to scalable coding (or layered coding) will be described. Scalable coding may be used for, for example, the selection of data to be transmitted, as in an example illustrated in FIG. 67.

Figure 67:
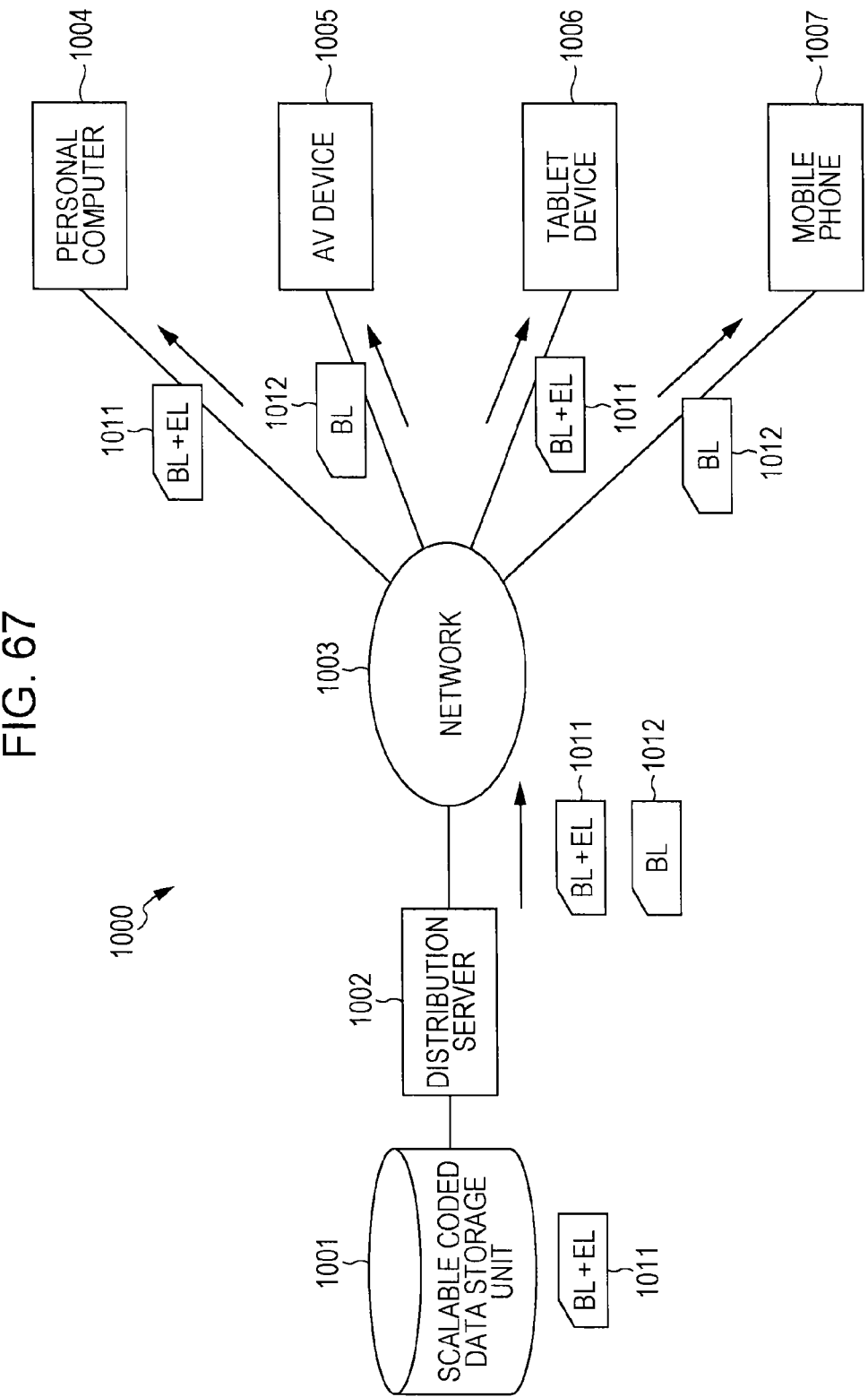
FIG. 67 is a block diagram illustrating an example of utilization of scalable coding.

In a data transmission system 1000 illustrated in FIG. 67, a distribution server 1002 reads scalable coded data stored in a scalable coded data storage unit 1001, and distributes the scalable coded data to terminal devices, such as a personal computer 1004, an audio/video (AV) device 1005, a tablet device 1006, and a mobile phone 1007, via a network 1003.

The distribution server 1002 selects encoded data having desired quality in accordance with certain conditions such as the performance of the terminal device and the communication environment, and transmits the selected encoded data. Even if the distribution server 1002 transmits data having quality higher than necessary, the terminal device may not necessarily obtain a high-quality image, and may cause delay or overflow. In addition, such data may occupy communication bandwidth more than necessary, or may increase the load on the terminal device more than necessary. Conversely, even if the distribution server 1002 transmits data having quality lower than necessary, the terminal device may not necessarily obtain an image with a sufficient quality. Thus, the distribution server 1002 reads the scalable coded data stored in the scalable coded data storage unit 1001, if necessary, as encoded data having quality appropriate for certain conditions such as the performance of the terminal device and communication environment, and transmits the read encoded data.

For example, the scalable coded data storage unit 1001 stores scalable coded data (BL+EL) 1011 which has been subjected to scalable coding. The scalable coded data (BL+EL) 1011 is encoded data including a base layer and an enhancement layer, and is data which is decoded to obtain both base layer pictures and enhancement layer pictures.

The distribution server 1002 selects an appropriate layer in accordance with certain conditions such as the performance of a terminal device that transmits data and the communication environment, and reads the data of the layer. For example, the distribution server 1002 reads high-quality scalable coded data (BL+EL) 1011 from the scalable coded data storage unit 1001, and transmits the read scalable coded data (BL+EL) 1011 as it is to the personal computer 1004 and the tablet device 1006, which are devices having high processing capabilities. In contrast, for example, the distribution server 1002 extracts the data of the base layer from the scalable coded data (BL+EL) 1011, and transmits the extracted data of the base layer to the AV device 1005 and the mobile phone 1007, which are devices having low processing capabilities, as scalable coded data (BL) 1012 having the same content as the scalable coded data (BL+EL) 1011 and having lower quality than the scalable coded data (BL+EL) 1011.

In this manner, the use of scalable coded data facilitates the adjustment of the amount of data, thereby suppressing the occurrence of delay or overflow and suppressing an unnecessary increase in the load on a terminal device or a communication medium. In addition, the scalable coded data (BL+EL) 1011 has reduced redundancy between layers, and therefore has a smaller amount of data than data having individually encoded data of the respective layers. Therefore, the storage area of the scalable coded data storage unit 1001 can be more efficiently utilized.

Since various devices such as the personal computer 1004, the AV device 1005, the tablet device 1006, and the mobile phone 1007 may be used as terminal devices, the hardware performance of terminal devices may differ from one device to another. In addition, since various applications are executable by terminal devices, the software capabilities of the applications may vary. Furthermore, the network 1003 serving as a communication medium may be implemented as any communication line network which can be wired, wireless, or both, such as the Internet or a LAN, and have various data transmission capabilities. Such performance and capabilities may vary with other communication and the like.

In order to address such inconvenience, prior to the start of transmission of data, the distribution server 1002 may communicate with a terminal device to which the data is to be transmitted, and may obtain information concerning the capabilities of the terminal device, such as the hardware performance of the terminal device or the performance of application (software) executed by the terminal device, and also information concerning the communication environment, such as the available bandwidth of the network 1003. The distribution server 1002 may select an appropriate layer on the basis of the obtained information.

The extraction of a layer may be performed by a terminal device. For example, the personal computer 1004 may decode the transmitted scalable coded data (BL+EL) 1011, and display a base layer picture or an enhancement layer picture. Alternatively, for example, the personal computer 1004 may extract the scalable coded data (BL) 1012 of the base layer from the transmitted scalable coded data (BL+EL) 1011, store the extracted scalable coded data (BL) 1012, transfer the extracted scalable coded data (BL) 1012 to another device, or decode the extracted scalable coded data (BL) 1012 to display a base layer picture.

The number of scalable coded data storage units 1001, the number of distribution servers 1002, the number of networks 1003, and the number of terminal devices are arbitrary. While a description has been given of an example in which the distribution server 1002 transmits data to a terminal device, any other exemplary application may be made. The data transmission system 1000 may be applied to any system that selects an appropriate layer, when transmitting encoded data which has been subjected to scalable coding to a terminal device, in accordance with certain conditions such as the capabilities of the terminal device and the communication environment.

Second System

Figure 68:
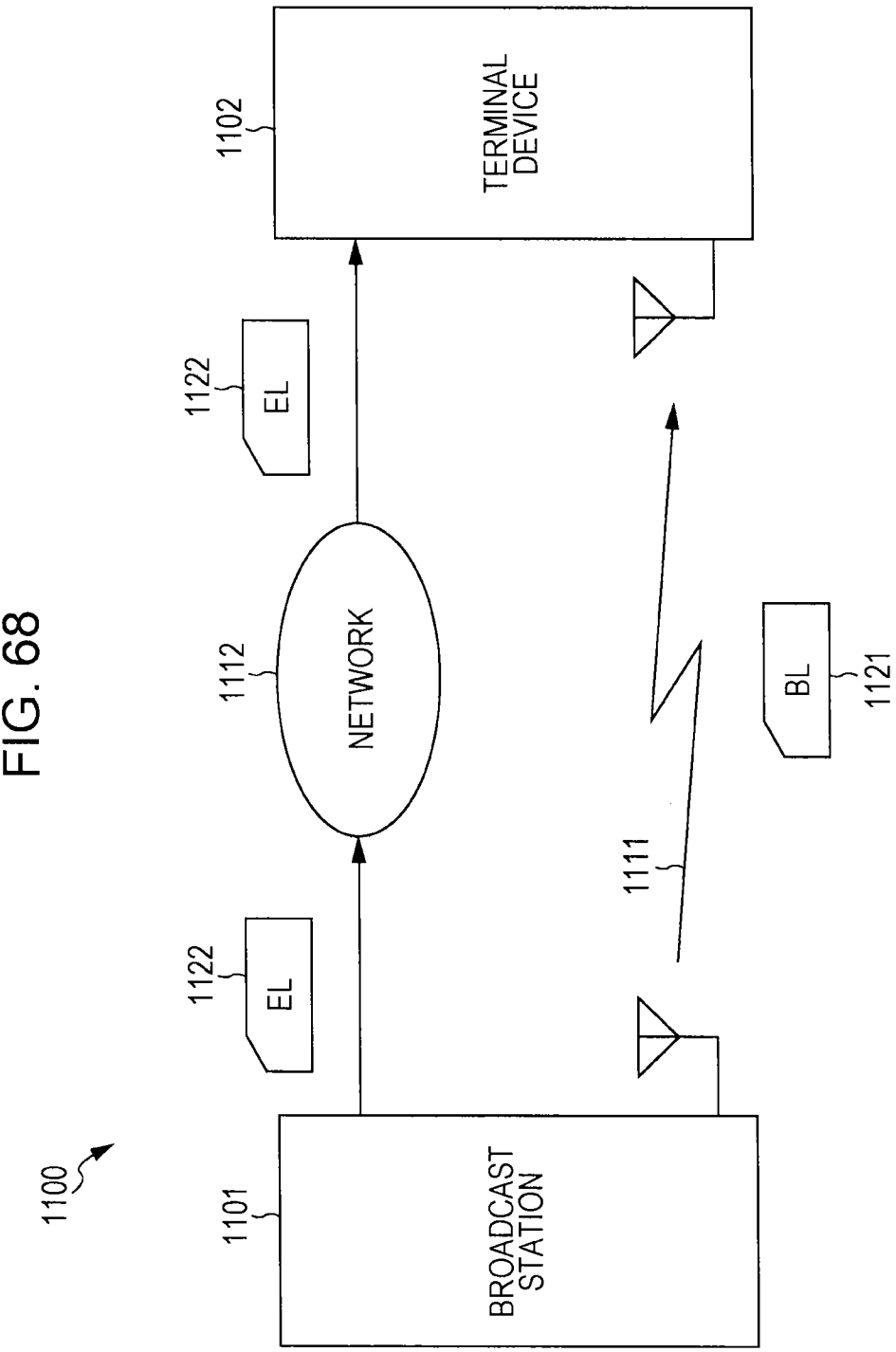
FIG. 68 is a block diagram illustrating another example of utilization of scalable coding.

Scalable coding may also be used for transmission via a plurality of communication media, as in an example illustrated in, for example, FIG. 68.

In a data transmission system 1100 illustrated in FIG. 68, a broadcast station 1101 transmits scalable coded data (BL) 1121 of a base layer via terrestrial broadcasting 1111. The broadcast station 1101 further transmits (e.g. packetizes and transmits) scalable coded data (EL) 1122 of an enhancement layer via a desired network 1112 formed of a communication network which can be wired, wireless, or both.

A terminal device 1102 has a function for receiving the terrestrial broadcasting 1111 from the broadcast station 1101, and receives the scalable coded data (BL) 1121 of the base layer transmitted via the terrestrial broadcasting 1111. The terminal device 1102 further has a communication function for performing communication via the network 1112, and receives the scalable coded data (EL) 1122 of the enhancement layer transmitted via the network 1112.

The terminal device 1102 decodes the scalable coded data (BL) 1121 of the base layer acquired via the terrestrial broadcasting 1111 in accordance with, for example, a user instruction or the like to obtain a base layer picture, stores the scalable coded data (BL) 1121, or transfers the scalable coded data (BL) 1121 to another device.

Further, the terminal device 1102 combines the scalable coded data (BL) 1121 of the base layer acquired via the terrestrial broadcasting 1111 with the scalable coded data (EL) 1122 of the enhancement layer acquired via the network 1112 in accordance with, for example, a user instruction or the like to obtain scalable coded data (BL+EL), and decodes the scalable coded data (BL+EL) to obtain an enhancement layer picture, stores the scalable coded data (BL+EL), or transfers the scalable coded data (BL+EL) to another device.

Accordingly, scalable coded data may be transmitted via, for example, communication media different from layer to layer. Thus, the load can be distributed, and delay or overflow can be suppressed from occurring.

Further, a communication medium to be used for transmission may be selected for each layer in accordance with the situation. For example, the scalable coded data (BL) 1121 of the base layer having a relatively large amount of data may be transmitted via a communication medium having a large bandwidth, and the scalable coded data (EL) 1122 of the enhancement layer having a relatively small amount of data may be transmitted via a communication medium having a narrow bandwidth. Alternatively, for example, the communication medium via which the scalable coded data (EL) 1122 of the enhancement layer is to be transmitted may be switched between the network 1112 and the terrestrial broadcasting 1111 in accordance with the available bandwidth of the network 1112. The same applies to data of any layer.

Control in the manner described above can further suppress an increase in the load of data transmission.

The number of layers is arbitrary, and the number of communication media to be used for transmission is also arbitrary. In addition, the number of terminal devices 1102 to which data is to be distributed is also arbitrary. While a description has been given in the context of broadcasting from the broadcast station 1101 by way of example, any other exemplary application may be made. The data transmission system 1100 may be applied to any system that divides encoded data which has been subjected to scalable coding into a plurality of segments in units of layers and transmits the data segments via a plurality of lines.

Third System

Figure 69:
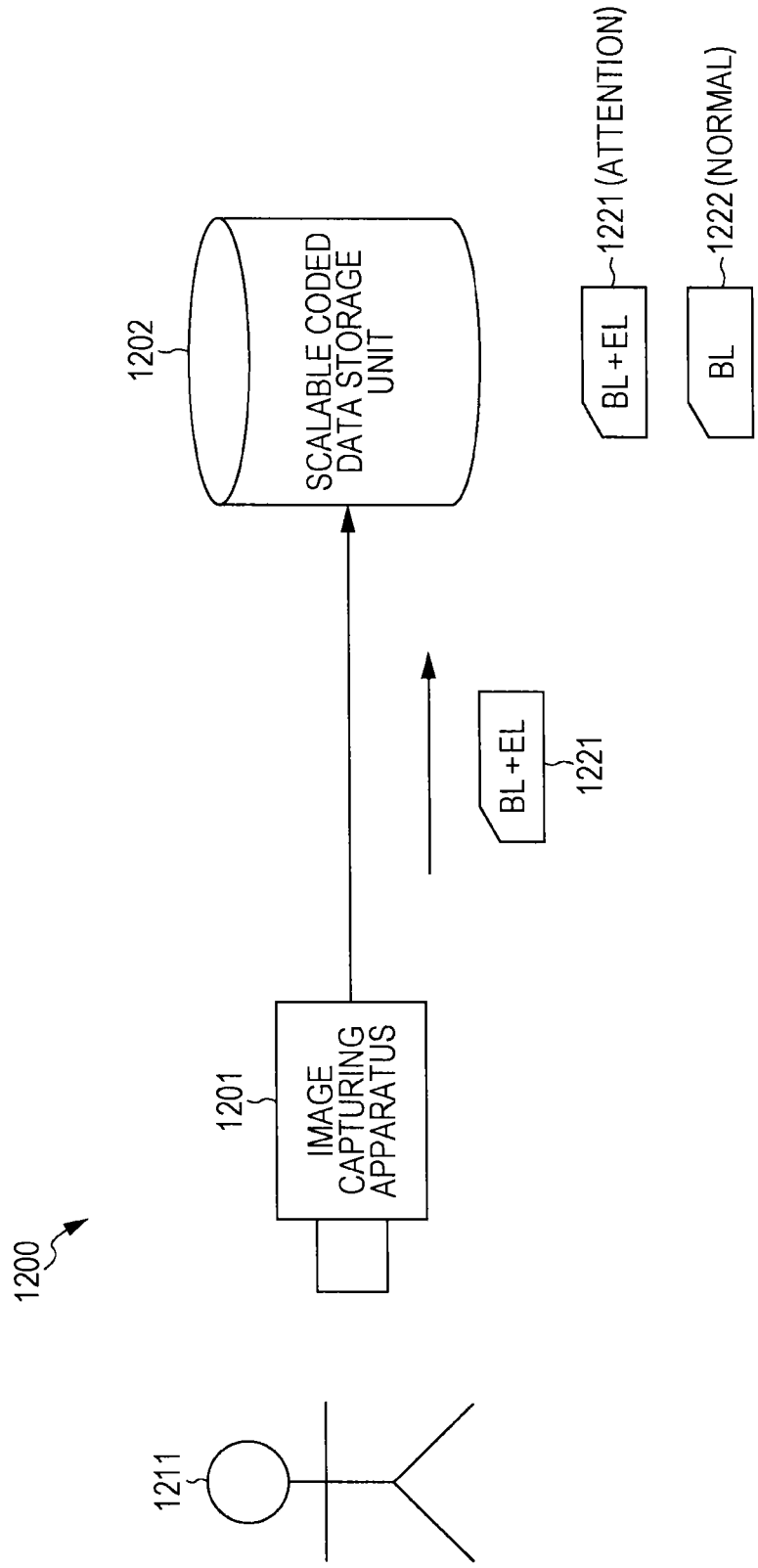
FIG. 69 is a block diagram illustrating still another example of utilization of scalable coding.

Scalable coding may also be used for the storage of encoded data, as in an example illustrated in, for example, FIG. 69.

In an image capturing system 1200 illustrated in FIG. 69, an image capturing apparatus 1201 captures an image of a subject 1211 to obtain image data, performs scalable coding on the obtained image data to generate scalable coded data (BL+EL) 1221, and supplies the generated scalable coded data (BL+EL) 1221 to a scalable coded data storage device 1202.

The scalable coded data storage device 1202 stores the scalable coded data (BL+EL) 1221 supplied from the image capturing apparatus 1201 at the quality appropriate for the situation. For example, in a normal state, the scalable coded data storage device 1202 extracts data of a base layer from the scalable coded data (BL+EL) 1221, and stores the extracted data of the base layer as scalable coded data (BL) 1222 of the base layer having a low quality and a small amount of data. In contrast, for example, in an attention state, the scalable coded data storage device 1202 stores the scalable coded data (BL+EL) 1221 having a high quality and a large amount of data as it is.

Accordingly, the scalable coded data storage device 1202 can save an image at high quality only when necessary. This can suppress an increase in the amount of data while suppressing a reduction in the worth of the image due to a reduction in quality, and can improve use efficiency of the storage area.

For example, the image capturing apparatus 1201 may be a security camera. If an object to be monitored (e.g., intruder) does not appear in a captured image (normal state), it may be probable that the captured image does not have important content. Thus, a reduction in the amount of data is prioritized, and the image data (scalable coded data) of the image is stored at low quality. In contrast, if an object to be monitored appears as the subject 1211 in a captured image (attention state), it may be probable that the captured image has important content. Thus, image quality is prioritized, and the image data (scalable coded data) of the image is stored at high quality.

Either the normal state or the attention state may be determined by, for example, the scalable coded data storage device 1202 by analyzing the image. Alternatively, the image capturing apparatus 1201 may determine the normal state or the attention state, and may transmit the determination result to the scalable coded data storage device 1202.

The determination of either the normal state or the attention state may be based on an arbitrary standard, and an image on which the determination is based may have any content. Conditions other than the content of an image may be used as the determination standard. The state may be changed in accordance with, for example, the magnitude of recorded audio, waveform, or the like, or may be changed at intervals of a predetermined period of time. Alternatively, the state may be changed in accordance with an external instruction such as a user instruction.

While a description has been given of an example of changing between two states, namely, normal state and attention state, the number of states is arbitrary, and the state change may be made between more than two states, such as a normal state, a low-attention state, a middle-attention state, and a high-attention state. Note that the upper limit number of states to be changed depends on the number of layers of scalable coded data.

Further, the image capturing apparatus 1201 may determine the number of layers of scalable coding in accordance with the state. For example, in a normal state, the image capturing apparatus 1201 may generate scalable coded data (BL) 1222 of the base layer having a low quality and a small amount of data, and supply the generated scalable coded data (BL) 1222 to the scalable coded data storage device 1202. For example, in an attention state, the image capturing apparatus 1201 may generate scalable coded data (BL+EL) 1221 of the base layer having a high quality and a large amount of data, and supply the generated scalable coded data (BL+EL) 1221 to the scalable coded data storage device 1202.

While a security camera has been described as an example, the image capturing system 1200 may be used in any application, and the application is not limited to a security camera.

An example has been described herein in which various types of information are multiplexed into an encoded stream and are transmitted from the encoding side to the decoding side. However, the method for transmitting such information is not limited to that in the example. For example, such information may be transmitted or recorded as separate data associated with an encoded bit stream without being multiplexed into the encoded bit stream. The term "associate", as used herein, means allowing a picture (or part of a picture, such as a slice or block) included in a bit stream to be linked to information corresponding to the picture when the picture is decoded. That is, the information may be transmitted on a transmission path different from that for the pictures (or bit stream). Further, the information may be recorded on a recording medium different from that for the pictures (or bit stream) (or recorded in a different recording area of the same recording medium). Furthermore, the information and the pictures (or bit stream) may be associated with each other in arbitrary units such as a plurality of frames, one frame, or a portion in a frame.

An embodiment of the present technology may be applied to an apparatus that is used to transmit and receive image information (bit streams) compressed using an orthogonal transform such as a discrete cosine transform and motion compensation, such as MPEG or H.26x data, via satellite broadcasting, cable television, the Internet, or network media such as mobile phones, or to process the image information on recording media such as an optical disk, a magnetic disk, and a flash memory.

An embodiment of the present technology may also be applied to Hypertext Transfer Protocol (HTTP) streaming, such as MPEG DASH, in which an appropriate piece of encoded data is selected in units of segments from among a plurality of pieces of encoded data prepared in advance and having different resolutions or the like.

In the embodiments of the present technology, the coding scheme may be a coding scheme other than the HEVC scheme.

Embodiments of the present technology are not limited to the foregoing embodiments, and a variety of changes may be made without departing from the scope of the present technology.

The embodiments of the present technology may also provide the following configurations.

(1) An encoding apparatus including:

a prediction picture generation unit configured to generate a prediction picture using a reference picture; and a transmission unit configured to transmit reference disablement information indicating, for all pictures, whether reference picture specification information for a preceding picture that precedes each of the pictures in encoding order is not to be used as the reference picture specification information for the picture, the reference picture specification information being information specifying the reference picture.

(2) The encoding apparatus according to (1), wherein
the transmission unit transmits the reference picture specification information for all the pictures in a case where the reference disablement information indicates, for all the pictures, that the reference picture specification information for the preceding pictures is not to be used as the reference picture specification information for the pictures.

(3) The encoding apparatus according to (1) or (2), wherein
the transmission unit transmits preceding picture specification information specifying the preceding pictures in a case where the reference disablement information does not indicate, for all the pictures, that the reference picture specification information for the preceding pictures is not to be used as the reference picture specification information for the pictures.

(4) The encoding apparatus according to (3), wherein
the transmission unit transmits identicalness information indicating that the preceding picture specification information is identical for all the pictures in a case where the reference disablement information does not indicate, for all the pictures, that the reference picture specification information for the preceding pictures is not to be used as the reference picture specification information for the pictures.

(5) The encoding apparatus according to (4), wherein
the transmission unit transmits preceding picture specification information common to all the pictures in a case where the identicalness information indicates that the preceding picture specification information is identical for all the pictures.

(6) The encoding apparatus according to (4) or (5), wherein
the transmission unit transmits the respective pieces of preceding picture specification information for all the pictures in a case where the identicalness information indicates that the preceding picture specification information is not identical for all the pictures.

(7) An encoding method including:
generating, using an encoding apparatus, a prediction picture using a reference picture; and
transmitting, using the encoding apparatus, reference disablement information indicating, for all pictures, whether reference picture specification information for a preceding picture that precedes each of the pictures in encoding order is not to be used as the reference picture specification information for the picture, the reference picture specification information being information specifying the reference picture.

(8) A decoding apparatus including:
a receiving unit configured to receive reference disablement information indicating, for all pictures, whether reference picture specification information for a preceding picture that precedes each of the pictures in encoding order is not to be used as the reference picture specification information for the picture, the reference picture specification information being information specifying a reference picture used to generate a prediction picture;
a reference picture setting unit configured to generate the reference picture specification information for a picture being decoded in accordance with the reference disablement information received by the receiving unit; and
a prediction picture generation unit configured to generate a prediction picture using the reference picture specified by the reference picture specification information for the picture being decoded which is generated by the reference picture setting unit.

(9) The decoding apparatus according to (8), wherein
the receiving unit receives the reference picture specification information for all the pictures in a case where the reference disablement information indicates, for all the pictures, that the reference picture specification information for the preceding pictures is not to be used as the reference picture specification information for the pictures, and
the reference picture setting unit generates the reference picture specification information for the picture being decoded, by using, as the reference picture specification information for the picture being decoded, the reference picture specification information for the picture being decoded which is received by the receiving unit.

(10) The decoding apparatus according to (8) or (9), wherein
the receiving unit receives preceding picture specification information specifying the preceding pictures in a case where the reference disablement information does not indicate, for all the pictures, that the reference picture specification information for the preceding pictures is not to be used as the reference picture specification information for the pictures, and
the reference picture setting unit generates the reference picture specification information for the picture being decoded, by using, as the reference picture specification information for the picture being decoded, the reference picture specification information for the preceding pictures specified by the preceding picture specification information received by the receiving unit.

(11) The decoding apparatus according to (10), wherein
the receiving unit receives identicalness information indicating whether the preceding picture specification information is identical for all the pictures in a case where the reference disablement information does not indicate, for all the pictures, that the reference picture specification information for the preceding pictures is not to be used as the reference picture specification information for the pictures.

(12) The decoding apparatus according to (11), wherein
the receiving unit receives preceding picture specification information common to all the pictures in a case where the identicalness information indicates that the preceding picture specification information is identical for all the pictures, and
the reference picture setting unit generates the reference picture specification information for the picture being decoded, by using, as the reference picture specification information for the picture being decoded, the reference picture specification information for the preceding picture specified by the common preceding picture specification information received by the receiving unit.

(13) The decoding apparatus according to (11) or (12), wherein
the receiving unit transmits the respective pieces of preceding picture specification information for all the pictures in a case where the identicalness information indicates that the preceding picture specification information is not identical for all the pictures, and
the reference picture setting unit generates the reference picture specification information for the picture being decoded, by using, as the reference picture specification information for the picture being decoded, the reference picture specification information for the preceding picture specified by the preceding picture specification information for the picture being decoded which is received by the receiving unit.

(14) A decoding method including:
receiving, using a decoding apparatus, reference disablement information indicating, for all pictures, whether reference picture specification information for a preceding picture that precedes each of the pictures in encoding order is not to be used as the reference picture specification information for the picture, the reference picture specification information being information specifying a reference picture used to generate a prediction picture;

generating, using the decoding apparatus, the reference picture specification information for a picture being decoded in accordance with the received reference disablement information; and generating, using the decoding apparatus, a prediction picture using the reference picture specified by the generated reference picture specification information for the picture being decoded.

(15) An encoding apparatus including:
a prediction picture generation unit configured to generate a prediction picture using a reference picture; and a transmission unit configured to transmit reference information in a case where a picture being encoded is a picture other than an initial picture in a group of pictures, the reference information being information indicating whether reference picture specification information for a preceding picture that precedes the picture being encoded in encoding order is to be used as the reference picture specification information for the picture being encoded, the reference picture specification information being information specifying the reference picture.

(16) The encoding apparatus according to (15), wherein
the transmission unit transmits preceding picture specification information specifying the preceding picture in a case where the reference information indicates that the reference picture specification information for the preceding picture is to be used as the reference picture specification information for the picture being encoded.

(17) The encoding apparatus according to (16), wherein
the transmission unit transmits the reference picture specification information for the picture being encoded in a case where the reference information indicates that the reference picture specification information for the preceding picture is not to be used as the reference picture specification information for the picture being encoded.

(18) The encoding apparatus according to (17), further including a reference picture information setting unit configured to set a plurality of pieces of reference picture information that include the reference information and the preceding picture specification information or the reference picture specification information, wherein the transmission unit transmits the plurality of pieces of reference picture information set by the reference picture information setting unit, and the transmission unit also transmits, in a case where the picture being encoded is a picture other than an initial picture in a group of pictures, reference picture information specification information specifying reference picture information for the picture being encoded among the plurality of pieces of reference picture information.

(19) The encoding apparatus according to (18), wherein
the reference picture information setting unit sets, as the reference picture information, initial reference picture information including the reference picture specification information, and the transmission unit transmits the reference picture information specification information specifying the initial reference picture information in a case where the picture being encoded is an initial picture in a group of pictures.

(20) An encoding method including:
generating, using an encoding apparatus, a prediction picture using a reference picture; and transmitting, using the encoding apparatus, reference information in a case where a picture being encoded is a picture other than an initial picture in a group of pictures, the reference information being information indicating whether reference picture specification information for a preceding picture that precedes the picture being encoded in encoding order is to be used as the reference picture specification information for the picture being encoded, the reference picture specification information being information specifying the reference picture.

(21) A decoding apparatus including:
a receiving unit configured to receive reference information indicating whether reference picture specification information for a preceding picture that precedes a picture being encoded in encoding order is to be used as the reference picture specification information for the picture being encoded, the reference picture specification information being information specifying a reference picture used to generate a prediction picture, the reference information being transmitted in a case where the picture being encoded is a picture other than an initial picture in a group of pictures;

a reference picture setting unit configured to, in a case where the reference information is received by the receiving unit, generate the reference picture specification information for a picture being decoded in accordance with the reference information, and, in a case where the reference information is not received by the receiving unit, generate the reference picture specification information for the picture being decoded in accordance with reference information indicating that the reference picture specification information for the preceding picture is not to be used as the reference picture specification information for the picture being encoded; and a prediction picture generation unit configured to generate a prediction picture using the reference picture specified by the reference picture specification information generated by the reference picture setting unit.

(22) The decoding apparatus according to (21), wherein
the receiving unit receives preceding picture specification information specifying the preceding picture in a case where the reference information indicates that the reference picture specification information for the preceding picture is to be used as the reference picture specification information for the picture being encoded, and the reference picture setting unit generates the reference picture specification information for the picture being decoded, by using, as the reference picture specification information for the picture being decoded, the reference picture specification information for the preceding picture specified by the preceding picture specification information received by the receiving unit.

(23) The decoding apparatus according to (22), wherein
the receiving unit receives the reference picture specification information for the picture being encoded in a case where the reference information indicates that the reference picture specification information for the preceding picture is not to be used as the reference picture specification information for the picture being encoded, and the reference picture setting unit generates the reference picture specification information for the picture being decoded, by using, as the reference picture specification information for the picture being decoded, the reference picture specification information received by the receiving unit.

(24) The decoding apparatus according to (23), wherein
the receiving unit receives a plurality of pieces of reference picture information that include the reference information and the preceding picture specification information or the reference picture specification information, and also receives reference picture information specification information specifying the reference picture information for the picture being encoded among the plurality of pieces of reference picture information, the reference picture information specification information being transmitted in a case where the picture being encoded is a picture other than an initial picture in a group of pictures, and the reference picture setting unit generates the reference picture specification information for the picture being decoded in accordance with the reference information included in the reference picture information specified by the reference picture information specification information received by the receiving unit.

(25) The decoding apparatus according to (24), wherein the receiving unit receives, as the reference picture information, initial reference picture information including the reference picture specification information, and also receives reference picture information specification information specifying the initial reference picture information, the reference picture information specification information being transmitted in a case where the picture being encoded is an initial picture in a group of pictures, and the reference picture setting unit generates the reference picture specification information for the picture being decoded in accordance with the reference picture specification information included in the initial reference picture information specified by the reference picture information specification information received by the receiving unit.

(26) A decoding method including:

receiving, using a decoding apparatus, reference information indicating whether reference picture specification information for a preceding picture that precedes a picture being encoded in encoding order is to be used as the reference picture specification information for the picture being encoded, the reference picture specification information being information specifying a reference picture used to generate a prediction picture, the reference information being transmitted in a case where the picture being encoded is a picture other than an initial picture in a group of pictures;

in a case where the reference information is received, generating, using the decoding apparatus, the reference picture specification information for a picture being decoded in accordance with the reference information, and, in a case where the reference information is not received, generating, using the decoding apparatus, the reference picture specification information for the picture being decoded in accordance with reference information indicating that the reference picture specification information for the preceding picture is not to be used as the reference picture specification information for the picture being encoded; and generating, using the decoding apparatus, a prediction picture using the reference picture specified by the generated reference picture specification information.

(27) An encoding apparatus including:

an encoding unit configured to encode an image using a reference picture to generate encoded data;

a setting unit configured to set information concerning the reference picture in accordance with a type of slice in a picture of the image; and a transmission unit configured to transmit the encoded data generated by the encoding unit and the information concerning the reference picture set by the setting unit.

(28) The encoding apparatus according to (27), further including a generation unit configured to generate a prediction picture by performing weighted prediction on the reference picture, wherein the encoding unit encodes the image using the prediction picture generated by the generation unit, and the information concerning the reference picture is information indicating whether or not the weighted prediction is to be performed.

(29) The encoding apparatus according to (28), wherein in a case where a P-slice is included in a picture of the image, the setting unit sets, as the information concerning the reference picture, information indicating whether or not the weighted prediction is to be performed on the P-slice.

(30) The encoding apparatus according to (28) or (29), wherein in a case where a B-slice is included in a picture of the image, the setting unit sets, as the information concerning the reference picture, information indicating whether or not the weighted prediction is to be performed on the B-slice.

(31) The encoding apparatus according to (27), wherein in a case where a slice other than an I-slice is included in a picture of the image, the setting unit sets information concerning the reference picture in forward prediction.

(32) The encoding apparatus according to (27) or (31), wherein in a case where a B-slice is included in a picture of the image, the setting unit sets information concerning the reference picture in backward prediction.

(33) The encoding apparatus according to any one of (27) to (32), wherein in a case where all the slices in a picture of the image have the same type, the transmission unit transmits a slice type indicating the type of an initial slice in the picture.

(34) An encoding method including:

encoding, using an encoding apparatus, an image using a reference picture to generate encoded data;

setting, using the encoding apparatus, information concerning the reference picture in accordance with a type of slice in a picture of the image; and transmitting, using the encoding apparatus, the generated encoded data and the set information concerning the reference picture.

(35) A decoding apparatus including:

a receiving unit configured to receive encoded data of an image and information concerning a reference picture used to encode the image, the information being set in accordance with a type of slice in a picture of the image; and a decoding unit configured to decode the encoded data received by the receiving unit using the reference picture in accordance with the information concerning the reference picture received by the receiving unit.

(36) The decoding apparatus according to (35), further including a generation unit configured to generate a prediction picture by performing weighted prediction on the reference picture in accordance with the information concerning the reference picture received by the receiving unit, wherein the decoding unit decodes the encoded data using the prediction picture generated by the generation unit, and the information concerning the reference picture is information indicating whether or not the weighted prediction is to be performed.

(37) The decoding apparatus according to (36), wherein in a case where a P-slice is included in a picture in the image, the receiving unit receives, as the information concerning the reference picture, information indicating whether or not the weighted prediction is to be performed on the P-slice.

(38) The decoding apparatus according to (36) or (37), wherein in a case where a B-slice is included in a picture of the image, the receiving unit receives, as the information concerning the reference picture, information indicating whether or not the weighted prediction is to be performed on the B-slice.

(39) The decoding apparatus according to (35), wherein in a case where a slice other than an I-slice is included in a picture of the image, the receiving unit receives information concerning the reference picture in forward prediction.

(40) The decoding apparatus according to (35) or (39), wherein in a case where a B-slice is included in a picture of the image, the receiving unit receives information concerning the reference picture in backward prediction.

(41) The decoding apparatus according to any one of (35) to (40), wherein in a case where all the slices in a picture of the image have the same type, the receiving unit receives a slice type indicating the type of an initial slice in the picture.

(42) A decoding method including:

receiving, using a decoding apparatus, encoded data of an image and information concerning a reference picture used to encode the image, the information being set in accordance with a type of slice in a picture of the image; and decoding, using the decoding apparatus, the received encoded data using the reference picture in accordance with the received information concerning the reference picture.

The present disclosure contains subject matter related to that disclosed in Japanese Priority Patent Application JP 2012-147883 filed in the Japan Patent Office on Jun. 29, 2012 and Japanese Priority Patent Application JP 2012-218097 filed in the Japan Patent Office on Sep. 28, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   circuitry configured to:
      determine whether a current picture is an initial picture in a group of pictures or not,
      extract reference information indicating whether reference picture specification information for a preceding picture that precedes the current picture is to be used as the reference picture specification information for the current picture, according to whether the current picture is the initial picture in the group of pictures or not, wherein the reference picture specification information being information specifying a reference picture used to generate a prediction picture,
      in a case where the reference information is extracted, generate the reference picture specification information for the current picture in accordance with the reference information, and
      generate a prediction picture using the reference picture specified by the reference picture specification information generated.

2. The information processing apparatus according to claim 1, wherein the circuitry is configured to:
   extract preceding picture specification information specifying the preceding picture in a case where the reference information indicates that the reference picture specification information for the preceding picture is to be used as the reference picture specification information for the current picture, and
   generate the reference picture specification information for the current picture, by using, as the reference picture specification information for the current picture, the reference picture specification information for the preceding picture specified by the preceding picture specification information extracted.

3. The information processing apparatus according to claim 2, wherein the circuitry is configured to:
   extract the reference picture specification information for the current picture in a case where the reference information indicates that the reference picture specification information for the preceding picture is not to be used as the reference picture specification information for the current picture, and
   generate the reference picture specification information for the current picture, by using, as the reference picture specification information for the current picture, the reference picture specification information received.

4. The information processing apparatus according to claim 3, wherein the preceding picture specification information is expressed by a first value obtained by subtracting coding number of the preceding picture from the coding number of the current picture.

5. The information processing apparatus according to claim 4, wherein the preceding picture specification information is expressed by a second value obtained by subtracting 1 from the first value.

6. The information processing apparatus according to claim 5, wherein the circuitry is configured to:
   extract the reference information and the preceding picture specification information in a short-term reference picture set.

7. The information processing apparatus according to claim 6, wherein the syntax is included in a sequence parameter set.

8. The information processing apparatus according to claim 7, wherein the syntax is included in a slice header.

9. The information processing apparatus according to claim 5, wherein the one syntax is included in a slice header and another syntax is included in a sequence parameter set.

10. The information processing apparatus according to claim 8, wherein the circuitry is configured to:
    determine whether or not index i of the short-term reference picture set is equal to 0 to determine whether the current picture is a picture other than the initial picture in the group of pictures.

11. The information processing apparatus according to claim 10, wherein the circuitry is configured to:
    increment the index i by 1 and to compare the index i with number of the short-term reference picture set.

12. The information processing apparatus according to claim 10, wherein the circuitry is configured to increment the index i by 1 and to compare the index i with number of the short-term reference picture set.

13. The information processing apparatus according to claim 1, wherein the information processing apparatus further comprising a tuner configured to select a desired channel using received broadcast wave signals and obtain an encoded bit stream through demodulation.

14. The information processing apparatus according to claim 1, wherein the information processing apparatus further comprising a demultiplexer configured to extract video and audio packets carrying a program to be viewed from an encoded bit stream, supply packets of electronic program guide (EPG) data to control circuitry, and descramble scrambled content.

15. The information processing apparatus according to claim 1, wherein the information processing apparatus further comprising video signal processing circuitry configured to
- perform noise removal or reduction and video processing according to user settings on video data,
- generate video data of a program to be displayed and video data for displaying a menu screen used for selection of an item, and
- superimpose the generated video data for displaying the menu on the video data of the program.

16. The information processing apparatus according to claim 1, wherein the information processing apparatus further comprising display circuitry configured to drive a display device in accordance with a drive signal supplied from video signal processing circuitry.

17. The information processing apparatus according to claim 1, wherein the information processing apparatus further comprising an antenna to receive broadcast wave signals.

18. The information processing apparatus according to claim 1, wherein the information processing apparatus further comprising audio signal processing circuitry configured to perform noise removal or reduction on audio data, perform a D/A conversion process and an amplification process on the audio data, and supply the audio data to a speaker.

19. An information processing method of an information processing apparatus comprising:
- determining, by circuitry of the information processing apparatus, whether a current picture is an initial picture in a group of pictures or not;
- extracting reference information indicating whether reference picture specification information for a preceding picture that precedes the current picture is to be used as the reference picture specification information for the current picture, according to whether the current picture is the initial picture in the group of pictures or not, wherein the reference picture specification information being information specifying a reference picture used to generate a prediction picture;
- in a case where the reference information is extracted, generating the reference picture specification information for the current picture in accordance with the reference information; and
- generating, by the circuitry of the information processing apparatus, a prediction picture using the reference picture specified by the reference picture specification information generated.

20. The information processing method according to claim 19, further comprising
- extracting preceding picture specification information specifying the preceding picture in a case where the reference information indicates that the reference picture specification information for the preceding picture is to be used as the reference picture specification information for the current picture, and
- generating the reference picture specification information for the current picture, by using, as the reference picture specification information for the current picture, the reference picture specification information for the preceding picture specified by the preceding picture specification information extracted.

21. The information processing method according to claim 20, further comprising
- extracting the reference picture specification information for the current picture in a case where the reference information indicates that the reference picture specification information for the preceding picture is not to be used as the reference picture specification information for the current picture, and
- generating the reference picture specification information for the current picture, by using, as the reference picture specification information for the current picture, the reference picture specification information received.

22. The information processing method according to claim 21, wherein the preceding picture specification information is expressed by a first value obtained by subtracting coding number of the preceding picture from the coding number of the current picture.

23. The information processing method according to claim 22, wherein the preceding picture specification information is expressed by a second value obtained by subtracting 1 from the first value.

24. The information processing method according to claim 23, further comprising extracting the reference information and the preceding picture specification information in a short-term reference picture set.

25. The information processing method according to claim 24, wherein the syntax is included in a sequence parameter set.

26. The information processing method according to claim 25, wherein the syntax is included in a slice header.

27. The information processing method according to claim 23, wherein the one syntax is included in a slice header and another syntax is included in a sequence parameter set.

28. The information processing method according to claim 26, further comprising determining whether or not index i of the short-term reference picture set is equal to 0 to determine whether the current picture is a picture other than the initial picture in the group of pictures.

29. The information processing method according to claim 28, further comprising incrementing the index i by 1 and comparing the index i with number of the short-term reference picture set.

30. The information processing method according to claim 28, further comprising incrementing the index i by 1 and comparing the index i with number of the short-term reference picture set.

* * * * *